United States Patent
Sahu et al.

(10) Patent No.: US 9,805,214 B2
(45) Date of Patent: Oct. 31, 2017

(54) METHOD AND DEVICE FOR ENCRYPTING OR DECRYPTING CONTENT

(71) Applicant: SAMSUNG ELECTRONICS CO., LTD., Suwon-si (KR)

(72) Inventors: Samir Kant Sahu, Suwon-si (KR); Jae-sick Shin, Siheung-si (KR); Hun-je Yeon, Seoul (KR); Mohammad Zuberul Islam, Suwon-si (KR); Min-suk Choi, Suwon-si (KR); Nam-suk Lee, Suwon-si (KR); Hak-su Jeong, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 122 days.

(21) Appl. No.: 14/806,839

(22) Filed: Jul. 23, 2015

(65) Prior Publication Data
US 2016/0034707 A1    Feb. 4, 2016

(30) Foreign Application Priority Data

Jul. 31, 2014  (KR) ........................ 10-2014-0098478
Jan. 7, 2015   (KR) ........................ 10-2015-0002023
Feb. 17, 2015  (KR) ........................ 10-2015-0024018

(51) Int. Cl.
*H04L 9/32* (2006.01)
*G06F 21/62* (2013.01)
(Continued)

(52) U.S. Cl.
CPC .......... *G06F 21/6245* (2013.01); *G06F 21/31* (2013.01); *G06F 21/32* (2013.01); *G06F 21/60* (2013.01); *H04L 9/0819* (2013.01); *H04L 9/0861* (2013.01); *H04L 9/0866* (2013.01); *H04L 9/0894* (2013.01); *H04L 9/3234* (2013.01); *H04W 12/02* (2013.01); *H04L 63/04* (2013.01); *H04L 63/0853* (2013.01); *H04L 63/0861* (2013.01); *H04W 12/06* (2013.01)

(58) Field of Classification Search
CPC ..... H04L 63/0428; H04L 63/08; H04L 63/10; H04L 2209/24; H04L 63/0876
USPC ....................................................... 713/168
See application file for complete search history.

(56) References Cited

U.S. PATENT DOCUMENTS 6,363,485 B1   3/2002 Adams et al.
7,378,939 B2   5/2008 Sengupta et al.
(Continued)

FOREIGN PATENT DOCUMENTS

JP   2014-67419 A    4/2014
WO   2014/036689 A1  3/2014

OTHER PUBLICATIONS

Communication dated Oct. 26, 2015 issued by the International Searching Authority in counterpart International Application No. PCT/KR2015/007437.

(Continued)

*Primary Examiner* — Kambiz Zand
*Assistant Examiner* — Stephen Sanders
(74) *Attorney, Agent, or Firm* — Sughrue Mion, PLLC

(57) ABSTRACT

A wearable device includes a user information obtainer configured to obtain user information, a controller configured to selectively generate, in response to a user being authenticated based on the user information, an encryption key for encryption of content of an external device; and a communicator configured to transmit the encryption key to the external device.

18 Claims, 57 Drawing Sheets

(51) Int. Cl.
*G06F 21/60* (2013.01)
*H04L 9/08* (2006.01)
*G06F 21/31* (2013.01)
*G06F 21/32* (2013.01)
*H04W 12/02* (2009.01)
*H04L 29/06* (2006.01)
*H04W 12/06* (2009.01)

(56) References Cited

U.S. PATENT DOCUMENTS

| | | |
|---|---|---|
| 7,605,714 B2 | 10/2009 | Thompson et al. |
| 2010/0293570 A1 | 11/2010 | Teraoka et al. |
| 2011/0305337 A1 | 12/2011 | Devol et al. |
| 2013/0024701 A1 | 1/2013 | Hwang et al. |
| 2013/0268767 A1 | 10/2013 | Schrecker |
| 2014/0196156 A1 | 7/2014 | Lection et al. |
| 2014/0257047 A1* | 9/2014 | Sillay ............ A61B 5/11 600/301 |
| 2014/0337621 A1* | 11/2014 | Nakhimov ........ G06F 1/163 713/168 |
| 2015/0056920 A1* | 2/2015 | Huttunen .......... H04B 7/26 455/41.2 |

OTHER PUBLICATIONS

Communication dated Dec. 8, 2015 issued by the European Patent Office in counterpart European Patent Application No. 15179208.2.

* cited by examiner

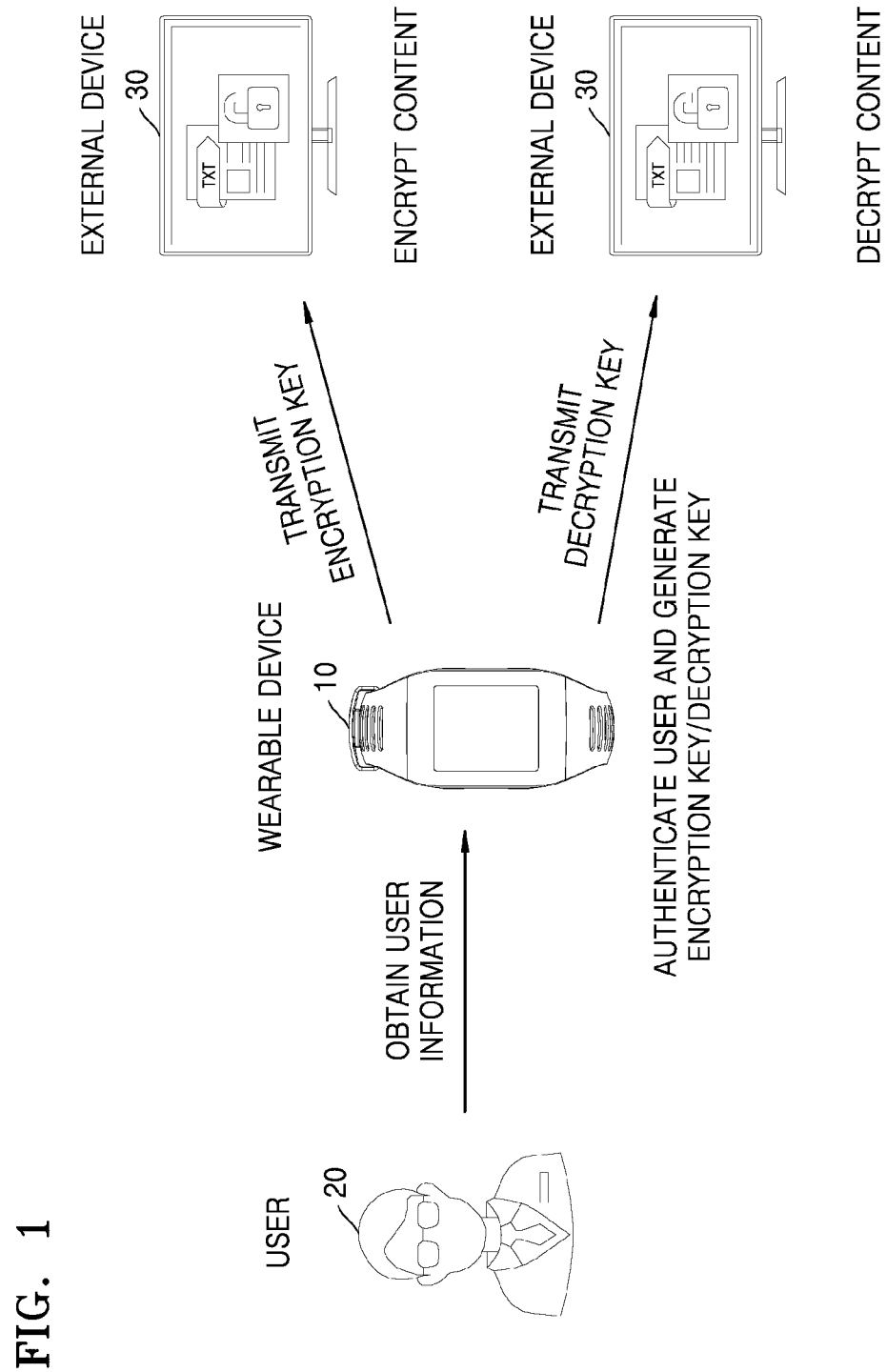

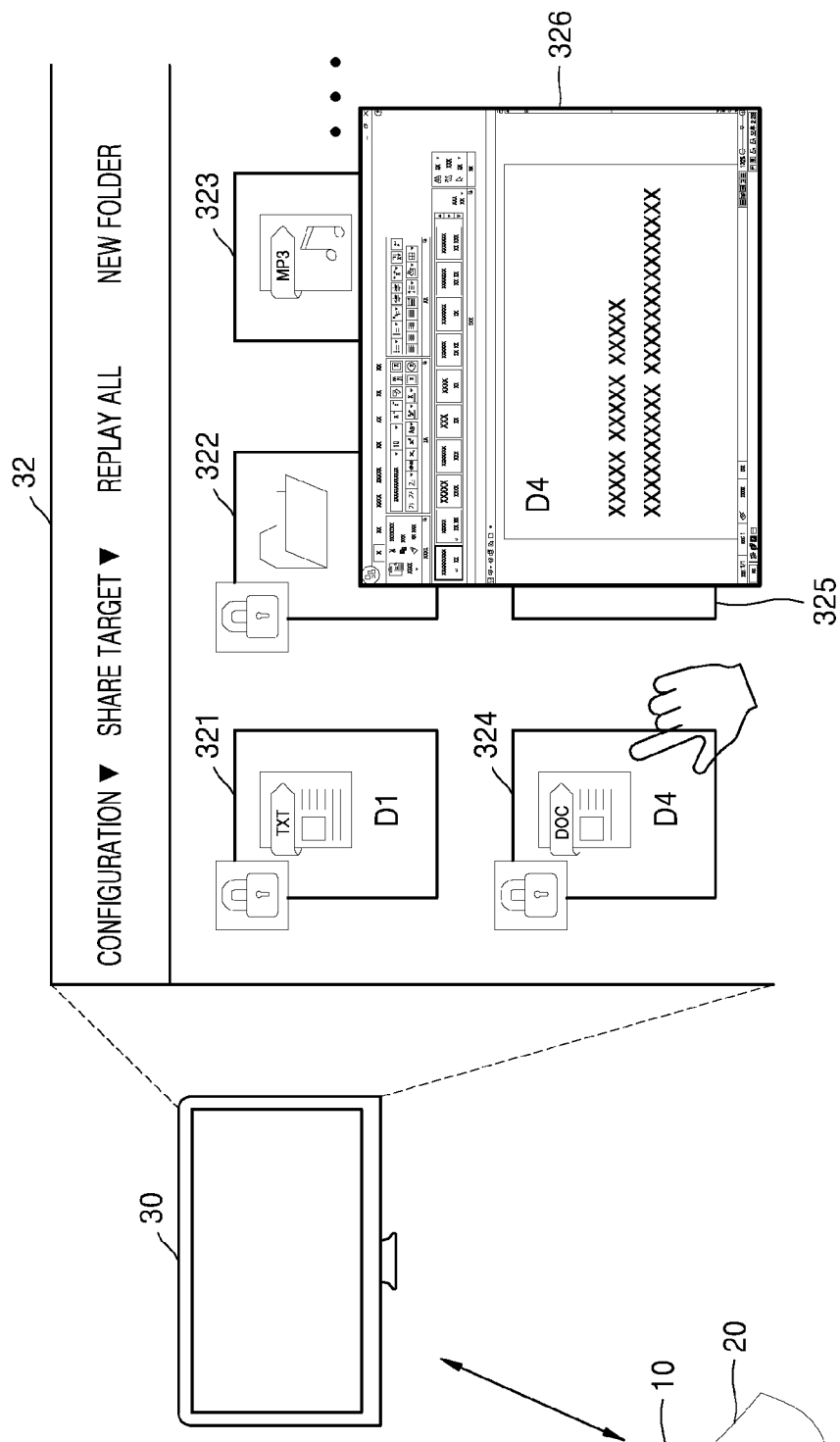

METHOD AND DEVICE FOR ENCRYPTING OR DECRYPTING CONTENT

CROSS-REFERENCE TO RELATED APPLICATIONS

This application claims priority from Korean Patent Application No. 10-2014-0098478, filed on Jul. 31, 2014, Korean Patent Application No. 10-2015-0002023, filed on Jan. 7, 2015, and Korean Patent Application No. 10-2015-0024018, filed on Feb. 17, 2015 in the Korean Intellectual Property Office, the disclosures of which are incorporated herein in their entireties by reference.

BACKGROUND

1. Field

Apparatuses and methods consistent with one or more exemplary embodiments relate to a method and device for encrypting or decrypting content.

2. Description of the Related Art

Important data related to a user's privacy may be stored in content in a device, and there is an increasing demand for protecting the user's privacy. Accordingly, a technology for encrypting and decrypting content has been developed.

However, since a user has to perform a procedure to encrypt content or to decrypt content which is separate from other procedures related to the content, there is an increasing demand for simplifying a content encrypting procedure and a content decrypting procedure.

SUMMARY

One or more exemplary embodiments may provide a method and device for encrypting or decrypting content.

One or more exemplary embodiments may also provide a non-transitory computer-readable recording medium having recorded thereon a program for executing the method, by using a computer.

Additional aspects will be set forth in part in the description which follows and, in part, will be apparent from the description, or may be learned by practice of the presented exemplary embodiments.

According to an aspect of an exemplary embodiment, a wearable device includes a user information obtainer configured to obtain user information; a controller configured to selectively generate, in response to a user being authenticated based on the user information, an encryption key for encryption of content of an external device; and a communicator configured to transmit the encryption key to the external device.

The controller may be further configured to calculate a distance between the wearable device and the external device, and in response to determining that the distance is equal to or less than a predetermined distance, the controller may generate the encryption key.

The communicator may be further configured to receive, from the external device, a notification indicating that the content is stored in the external device, and the controller may be further configured to generate the encryption key in response to the notification being received.

The communicator may be configured to receive, from the external device, a notification indicating that a program for executing the content is executed in the external device, and the controller may be further configured to generate the encryption key in response to the notification being received.

In response to the user being authenticated, the controller may be configured to determine whether to permit the user to access the external device.

The encryption key may include an encryption key used in a symmetric-key algorithm, or may include an encryption key used in an asymmetric-key algorithm.

The user information may include biological information of the user.

The biological information may include information about one of a fingerprint, an iris, a retina, a vein, a skeletal part, or the face of the user.

The user information may include account information of the user.

The wearable device may further include a memory configured to store the encryption key.

According to an aspect of another exemplary embodiment, a method of generating an encryption key, the method being performed by a wearable device, includes operations of obtaining user information; authenticating a user of the wearable device based on the user information; selectively generating, in response to the user being authenticated by the authenticating, the encryption key for encryption of content in an external device; and transmitting the encryption key to the external device.

The method may further include an operation of calculating a distance between the wearable device and the external device, and the operation of generating may be performed when the distance is equal to or less than a predetermined distance.

The method may further include an operation of receiving, from the external device, notification indicating that the content is stored in the external device, and the performing of the generating may be performed in response to receiving the notification.

The method may further include an operation of receiving, from the external device, a notification indicating that a program for executing the content is executed in the external device, and the operation of performing the generating may be performed in response to receiving the notification.

The method may further include an operation of, in response to the user being authenticated by the authenticating, determining whether to permit the user to access the external device.

The encryption key may include an encryption key used in a symmetric-key algorithm, or may include an encryption key used in an asymmetric-key algorithm.

The user information may include biological information of the user.

The biological information may include information about one of a fingerprint, an iris, a retina, a vein, a skeletal part, or the face of the user.

The user information may include account information of the user.

According to an aspect of another exemplary embodiment, a non-transitory computer-readable recording medium includes a recorded program for executing the method by using a computer.

BRIEF DESCRIPTION OF THE DRAWINGS

These and/or other aspects will become apparent and more readily appreciated from the following description of the exemplary embodiments, taken in conjunction with the accompanying drawings in which:

FIG. 1 illustrates an example in which a wearable device generates an encryption key or a decryption key, according to an exemplary embodiment;

FIGS. 2A and 2B illustrate a relation between the wearable device and encryption and decryption of content, according to an exemplary embodiment;

DETAILED DESCRIPTION

Reference will now be made in detail to exemplary embodiments, examples of which are illustrated in the accompanying drawings. In this regard, the present exemplary embodiments should be considered in a descriptive sense only and not for purposes of limiting the scope of the inventive concept. All differences that can be easily derived, by an expert in the art, from the descriptions and the exemplary embodiments will be construed as being included in the scope of the inventive concept.

Throughout the specification, it will also be understood that when an element is referred to as being "connected to" another element, the element can be directly connected to the other element, or electrically connected to the other element while intervening elements may also be present. Also, when a part "includes" or "comprises" an element, unless there is a particular description contrary thereto, the part can further include other elements, not excluding the other elements.

Throughout the specification, the term "gesture" indicates an action of a user which is performed on a screen of a terminal so as to control the terminal. For example, the gesture may include a tap gesture, a touch & hold gesture, a double tap gesture, a drag gesture, a panning gesture, a flick gesture, a drag & drop gesture, a hand shaking gesture, or the like.

Throughout the specification, the expression "output to a screen of a device" indicates that a specific screen is displayed on the screen of the device. Thus, the expression "output to a screen of a device" may be synonymous with the expression "displayed on the screen of the device", although it not required to be.

As used herein, the term "and/or" includes any and all combinations of one or more of the associated listed items. Expressions such as "at least one of," when preceding a list of elements, modify the entire list of elements and do not modify the individual elements of the list.

Hereinafter, one or more exemplary embodiments will be described in detail with reference to the attached drawings.

FIG. 1 illustrates an example in which a wearable device 10 generates an encryption key or a decryption key, according to an exemplary embodiment.

FIG. 1 illustrates the wearable device 10, a user 20 of the wearable device 10, and an external device 30.

Figure 53:
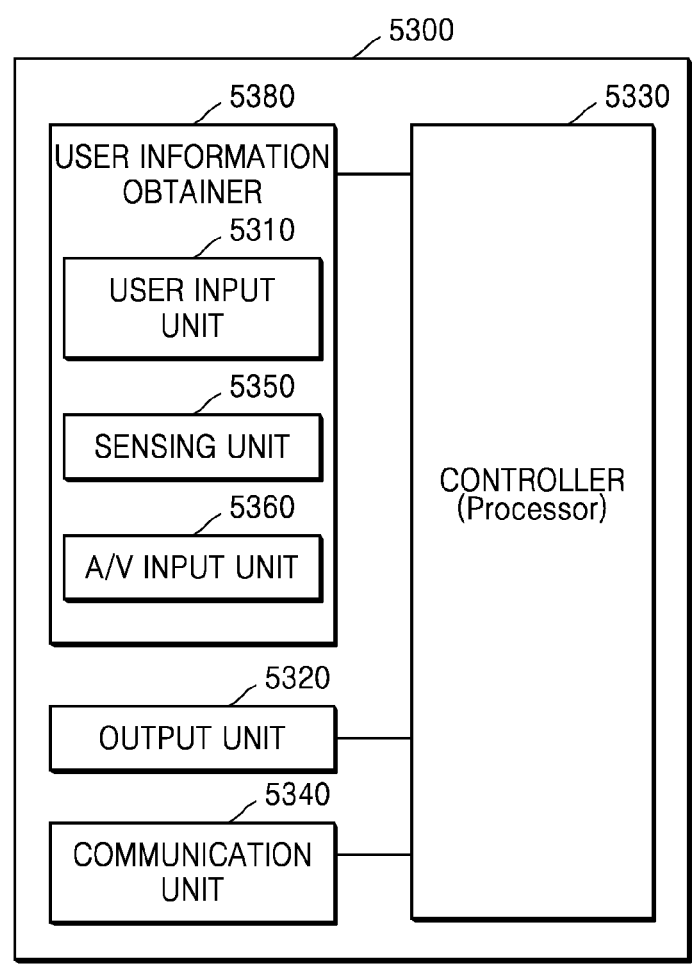
FIGS. 53 and 54 illustrate structures of examples of the wearable device or the external device, according to one or more exemplary embodiments.
Figure 54:
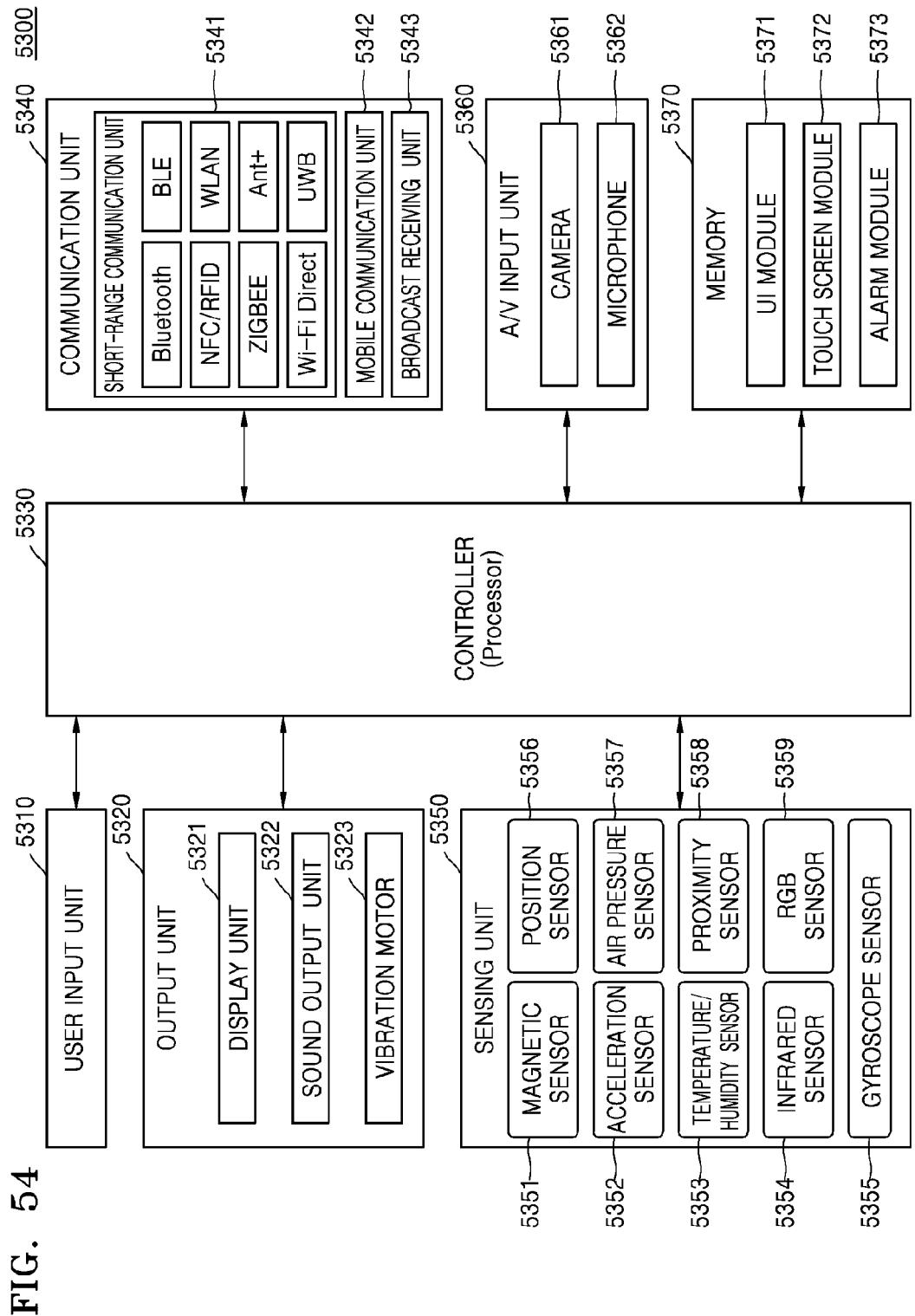

Referring to FIGS. 1, 53, and 54, the wearable device 10 obtains user information from the user 20. According to an exemplary embodiment, the user information indicates information required for the wearable device 10 to identify the user 20 (e.g., to authenticate the user 20).

For example, the user information may include biological information of the user 20. In more detail, the biological information of the user 20 may include information about at least one of a fingerprint, an iris, a retina, a vein, a skeletal part, and the face of the user 20. The wearable device 10 may obtain the biological information of the user 20 by using a user information obtainer 5380. For example, the wearable device 10 may obtain information about the fingerprint, the vein, or the skeletal part of the user 20 by using a sensor included in a sensing unit 5350, and may obtain information about the iris, the retina, or the face of the user 20 by using a camera included in an audio/video (A/V) input unit 5360. However, the wearable device 10 may obtain the biological information of the user 20 by using other methods, other than the aforementioned ways.

The wearable device 10 is a device that may be attached to a body of the user 20 and may perform a computing operation. Also, the wearable device 10 may exchange data with an external device. The wearable device 10 may be embodied in various forms including a watch, glasses, a bracelet, a ring, a necklace, shoes, a sticker, etc., that may be attached to the body of the user 20.

One or more exemplary embodiments of the wearable device 10 may be applied to a mobile device that may be moved while held by the user 20 or that may be moved as a belonging of the user 20, with the user 20. The mobile device may include various mobile devices such as a smartphone, a tablet, a notebook, a personal digital assistant (PDA), a camera, an electronic photo frame, a navigation device, etc.

In an exemplary embodiment, the mobile device may obtain user information, and when a user is authenticated based on the obtained user information, the mobile device may generate an encryption key for encryption of content of an external device. Afterward, the mobile device may transmit the generated encryption key to the external device. In another exemplary embodiment, the mobile device may obtain user information, and when a user is authenticated based on the obtained user information, the mobile device may generate a decryption key for decryption of content of an external device. Afterward, the mobile device may transmit the generated decryption key to the external device.

As another example, the user information may include account information of the user 20. In more detail, the account information of the user 20 may include a unique identification (ID) and password of the user 20. The wearable device 10 may obtain the account information of the user 20 by using the user information obtainer 5380. For example, the wearable device 10 may obtain the ID and password from the user 20 via a user input unit 5310.

The wearable device 10 authenticates the user 20, based on the obtained user information. For example, the wearable device 10 may authenticate the user 20 by comparing the obtained user information with pre-registered information. In other words, if the obtained user information matches the pre-registered information, the wearable device 10 may determine that the user 20 is authenticated. Examples in which the wearable device 10 authenticates the user 20, based on the obtained user information, will be described at later with reference to FIGS. 8 through 15.

Before the wearable device 10 obtains the user information for user authentication, the wearable device 10 may previously register user information.

For example, the wearable device 10 may register the user information by obtaining the user information and by storing the user information in a memory 5370 of the wearable device 10.

As another example, the wearable device 10 may register user information by obtaining the user information and by transmitting the user information to a server. According to an exemplary embodiment, the server may store the user information, and may transmit the user information to the wearable device 10, according to a request from the wearable device 10 (e.g., when the wearable device 10 performs the user authentication).

As the user 20 is authenticated, the wearable device 10 generates an encryption key. According to an exemplary embodiment, the encryption key is a key used in encryption of content of an external device 30. For example, the wearable device 10 may generate an encryption key used in a symmetric-key algorithm or may generate an encryption key used in an asymmetric-key algorithm.

Alternatively, the wearable device 10 may randomly generate an encryption key or may generate an encryption key based on biological information of the user 20. For example, the wearable device 10 may transform the biological information of the user 20 (e.g., information about at least one of a fingerprint, an iris, a retina, a vein, a skeletal part, and the face of the user 20) into a template, by using a predetermined mathematical algorithm. The template may be data (a bitstream) that is obtained by encoding the biological information that is extracted by using a predetermined sensor.

The wearable device 10 may set a result as the encryption key, wherein the result is obtained by using the template as a factor of a predetermined function (e.g., a cryptographic hash function). Alternatively, the template may be partly used as the factor of the function. The aforementioned examples of generating the encryption key use the biological information. However, one or more exemplary embodiments are not limited thereto, and various methods of generating the encryption key may be used.

For example, a predetermined calculation (e.g., an XOR operation) using a preset value of a particular length (e.g., 128 bits) may be applied to the template, and only a value from among result values, which corresponds to the particular length, may be set as the encryption key. Alternatively, Password Based Key Derivation Function 2 (PBKDF2) may be used.

The content includes an object that may be stored in the external device 30 and may be reproduced by the external device 30.

For example, the content may include a text document or a multimedia document. According to an exemplary embodiment, the text document or the multimedia document may include an object to which an operation is performed in a Microsoft word program, a Microsoft Excel program, a Microsoft PowerPoint program, or the like that are installed in the external device 30. According to an exemplary embodiment, the operation includes reading, editing, deleting, etc., of the text document or the multimedia document.

As another example, the content may include a photo, an image, a video, music, etc. For example, the content may include an object to which an operation is performed in a photo executing program, an image executing program, a video executing program, a music executing program, etc., that are installed in the external device 30. According to an exemplary embodiment, the operation includes reading, editing, deleting, etc., of the content.

As another example, the content includes a program. For example, the content may include the program that is installed in the external device 30 and is capable of executing the text document, the multimedia document, the photo, the image, the video, or the music.

The wearable device 10 transmits the encryption key to the external device 30. Then, the external device 30 encrypts the content by using the encryption key. According to an exemplary embodiment, the wearable device 10 may transmit the encryption key to the external device 30 by using a wireless or wired communication method. For example, the wearable device 10 may transmit the encryption key to the external device 30 via a data cable that is connected to the external device 30. Also, the wearable device 10 may transmit the encryption key to the external device 30 via wireless communication including near field communication (NFC), ZigBee, Bluetooth, ultra-wideband (UWB), or the like.

Also, the wearable device 10 may directly encrypt the content by using the encryption key. According to an exemplary embodiment, the external device 30 may transmit the content to the wearable device 10, and the wearable device 10 may encrypt the content. Then, the wearable device 10 may transmit the encrypted content to the external device 30. The exchange of the content between the wearable device 10 and the external device 30 may be performed by using the aforementioned wireless or wired communication method.

Even though it has been described that the wearable device 10 generates the encryption key according to a result of the user authentication, the wearable device 10 may read, according to the result of the user authentication, the encryption key that is stored in the memory 5370.

When the user 20 is authenticated, the wearable device 10 generates a decryption key. According to an exemplary embodiment, the decryption key is a key used in decryption of the content of the external device 30. When the user 20 attempts to execute the encrypted content stored in the external device 30, the wearable device 10 may generate the decryption key according to the result of the user authentication. For example, the wearable device 10 may generate a decryption key used in the symmetric-key algorithm or may generate a decryption key used in the asymmetric-key algorithm.

The wearable device 10 may transmit the generated decryption key to the external device 30, and the external device 30 may decrypt the encrypted content by using the decryption key. Alternatively, the wearable device 10 may directly decrypt the encrypted content by using the decryption key. The data exchange between the wearable device 10 and the external device 30 may be performed by using the aforementioned wireless or wired communication method. The wearable device 10 reads, according to the result of the user authentication, the decryption key that is stored in the memory 5370.

That is, the wearable device 10 may generate a key for encryption of the content of the external device 30, and may generate another key for decryption of the content that is encrypted by the wearable device 10. Therefore, the content that is encrypted by the wearable device 10 may be decrypted by using only the decryption key generated by the wearable device 10.

Hereinafter, encryption and decryption of content of the external device 30 are described below with reference to FIGS. 2A and 2B.

Figure 2A:
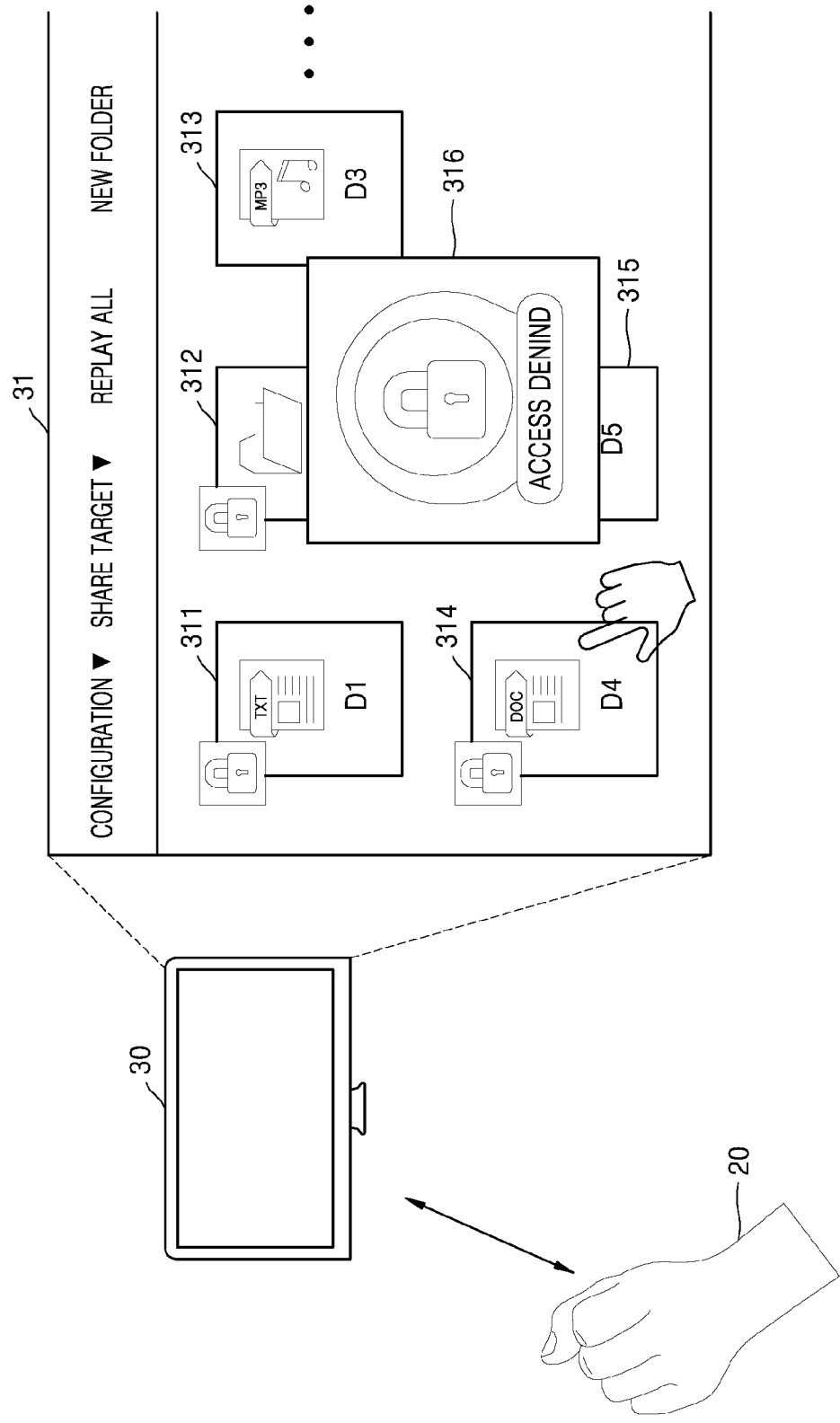

FIGS. 2A and 2B illustrate a relation between the wearable device 10 and encryption and decryption of content, according to an exemplary embodiment.

FIG. 2A illustrates an example of a screen 31 that is output by the external device 30, when the user 20 does not wear the wearable device 10. From among contents 311, 312, 313, 314, and 315 stored in the external device 30, the contents 311, 312, and 314 may be encrypted, and the contents 313 and 315 may not be encrypted. According to an exemplary embodiment, it is assumed that content encryption was performed by using the encryption key generated by the wearable device 10.

When the user 20 who does not wear the wearable device 10 attempts to execute the encrypted content 314, the external device 30 may not execute the content 314 and may output an image 316 indicating that the execution of the content 314 is denied. In other words, if the user 20 does not wear the wearable device 10, decryption of the encrypted content 311, 312, and 314 is not performed.

FIG. 2B illustrates an example of a screen 32 that is output by the external device 30, when the user 20 wears the wearable device 10. As in FIG. 2A, from among contents 321, 322, 323, 324, and 325 stored in the external device 30, the contents 321, 322, and 324 may be encrypted, and the contents 323 and 325 may not be encrypted. Also, it is assumed that content encryption was performed by using the encryption key generated by the wearable device 10.

When the user 20, who is wearing the wearable device 10, attempts to execute the encrypted content 324, the external device 30 may execute the content 324, and may output an execution screen 326 related to the content 324. In other words, while the user 20 wears the wearable device 10, the wearable device 10 may perform user authentication, and thus, the wearable device 10 may generate a decryption key.

FIGS. 2A and 2B illustrate the decryption of the content, but encryption of the content may be performed in a same manner. In other words, while the user 20 wears the wearable device 10, the wearable device 10 may perform the user authentication, and thus, the wearable device 10 may generate an encryption key.

The encryption key or the decryption key generated by the wearable device 10 may be transmitted to the external device 30, and the external device 30 may encrypt or may decrypt the content.

Alternatively, the wearable device 10 may encrypt or may decrypt the content by using the encryption key or the decryption key. For example, when the external device 30 transmits the content to the wearable device 10, the wearable device 10 may encrypt or may decrypt the content, and may transmit the encrypted content or the decrypted content to the external device 30.

Even though it has been described that the wearable device 10 generates the encryption key or the decryption key according to a result of the user authentication, the wearable device 10 may read, according to the result of the user authentication, the encryption key or the decryption key that is stored in the memory 5370.

Referring to FIGS. 1 through 2B, the wearable device 10 generates the encryption key or the decryption key that is used in encryption or decryption of the content stored in the external device 30, but one or more exemplary embodiments are not limited thereto. In other words, the wearable device 10 may generate an encryption key or a decryption key for content to be transmitted to an external apparatus. According to an exemplary embodiment, the external apparatus may be a cloud server or another apparatus other than the external device 30.

For example, when the external device 30 transmits content to the cloud server, the wearable device 10 may generate an encryption key used in encryption of the content. According to an exemplary embodiment, the wearable device 10 may transmit the encryption key to the external device 30, and the external device 30 may encrypt the content and then may transmit the encrypted content to the cloud server. Also, when the wearable device 10 transmits the encryption key to the cloud server, and the external device 30 transmits the content to the cloud server, the cloud server may encrypt the content by using the encryption key.

As another example, when the external device 30 receives encrypted content from the cloud server, the wearable device 10 may generate a decryption key used in decryption of the encrypted content. According to an exemplary embodiment, the wearable device 10 may transmit the decryption key to the external device 30, and then the external device 30 may decrypt the encrypted content received from the cloud server. Alternatively, the wearable device 10 may transmit the decryption key to the cloud server, and then the cloud server may decrypt the encrypted content by using the decryption key and may transmit the decrypted content to the external device 30.

Referring to FIGS. 1 through 2B, the wearable device 10 generates the encryption key or the decryption key, but one or more exemplary embodiments are not limited thereto. In other words, each of a plurality of wearable devices may generate an encryption key or a decryption key, and content may be encrypted or may be decrypted, based on a plurality of the encryption keys or a plurality of the decryption keys.

For example, an encryption or decryption level of content may vary according to importance or a security level of the content. If content is encrypted by using a single encryption key, the content may be easily decrypted by a third party that is not intended by the user 20, compared to content that is encrypted by using a plurality of encryption keys. Thus, if each of the wearable devices generates the encryption key, and the content is encrypted by using the plurality of the encryption keys, the security level of the content may be increased.

For example, the wearable devices may generate encryption keys, respectively, and the content may be encrypted based on the encryption keys. If it is assumed that a first wearable device generates a first encryption key, and a second wearable device generates a second encryption key, the content may be primarily encrypted by using the first encryption key, and may be secondarily encrypted by using the second encryption key.

As another example, the wearable devices may generate portions of an encryption key, respectively, and the content may be encrypted by using the encryption key that is obtained by combining the portions. If it is assumed that the first wearable device generates a portion of an encryption key, and the second wearable device generates the rest of the encryption key, the content may be encrypted by using the encryption key that is obtained by combining the portions that were generated by the first and second wearable devices.

The content that is encrypted by using the encryption keys that are generated by using the wearable devices may be decrypted by using decryption keys that are generated by using the wearable devices.

For example, it is assumed that content is primarily encrypted by using a first encryption key, and is secondarily encrypted by using a second encryption key. According to an exemplary embodiment, the encrypted content may be primarily decrypted by using a second decryption key generated by the second wearable device, and may be secondarily decrypted by using a first decryption key generated by the first wearable device.

As another example, it is assumed that content was encrypted by using an encryption key that is a combination of portions that were generated by first and second wearable devices. According to an exemplary embodiment, the first wearable device may generate a portion of a decryption key, the second wearable device may generate the rest of the decryption key, and then the content may be decrypted by using the decryption key that is obtained by combining the portions generated by the first and second wearable devices.

As another example, the content to be transmitted to the cloud server, by the external device 30, may be previously encrypted by using an encryption key. For example, the content may be previously encrypted by the external device 30 by using the encryption key received from the wearable device 10. Alternatively, the content may be previously encrypted by the external device 10 and then may be transmitted from the external device 10.

In this circumstance, if the external device 30 transmits the content to the cloud server, the external device 30 may decrypt the encrypted content and then may transmit the content to the cloud server. For example, the external device 30 may receive a decryption key from the wearable device 10, may decrypt the encrypted content by using the decryption key, and may transmit the content to the cloud server. Alternatively, when user authentication is performed in the wearable device 10, the external device 30 may decrypt the encrypted content by using a pre-stored decryption key and may transmit the content to the cloud server.

The external device 30 may transmit, based on user input, decrypted content to the cloud server. For example, when the external device 30 transmits the content to the cloud server, the external device 30 may output a pop-up window so as to ask the user whether to decrypt the content. In this case, in response to user input permitting decryption of the content, the external device 30 may decrypt the content and may transmit the decrypted content to the cloud server.

Hereinafter, examples in which the wearable device 10 generates an encryption key are described with reference to FIGS. 3 through 27.

Figure 3:
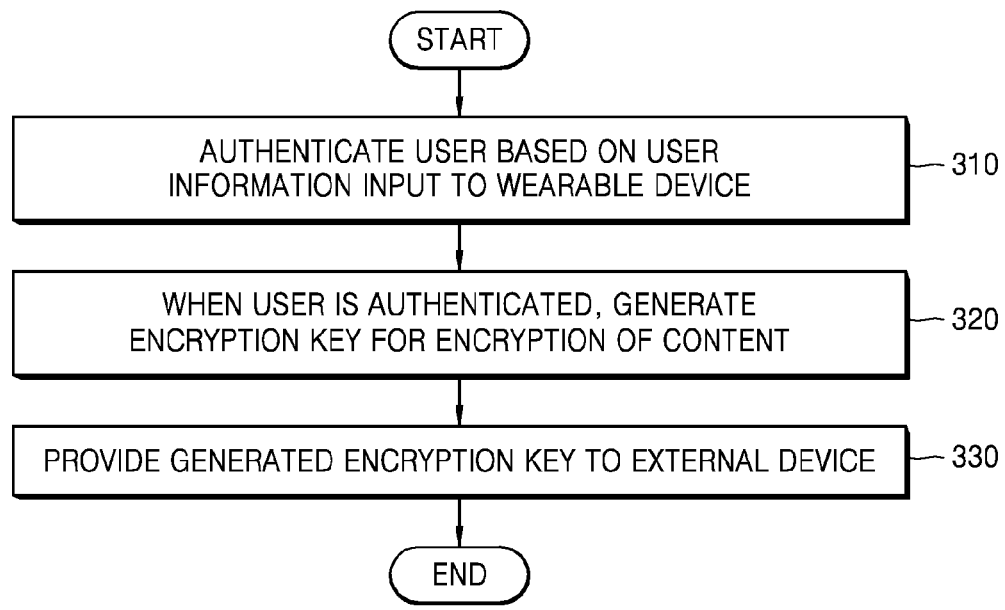
FIG. 3 is a flowchart illustrating an example in which the wearable device generates an encryption key according to a result of user authentication, according to an exemplary embodiment.

FIG. 3 is a flowchart illustrating an example in which the wearable device 10 generates an encryption key according to a result of user authentication, according to an exemplary embodiment.

The exemplary embodiment of FIG. 3 includes operations that are processed in chronological order by the wearable device 10 shown in FIG. 1. Thus, for descriptions that refer to operations of the wearable device 10 shown in FIG. 1, the descriptions may also be applied to the flowchart of FIG. 3.

In operation 310, the wearable device 10 authenticates a user, based on user information that is input to the wearable device 10. The wearable device 10 may authenticate the user by comparing the input user information with pre-stored user information.

The wearable device 10 may perform user authentication, based on at least one of biological information, and an ID and password.

The wearable device 10 may authenticate the user 20 just before the wearable device 10 generates the encryption key or may authenticate the user 20 regardless of generation of the encryption key. In other words, while the wearable device 10 generates the encryption key according to a result of the user authentication, if the encryption key still has not been generated, there may be no time limit for the wearable device 10 to perform the user authentication.

For example, the wearable device 10 may generate the encryption key, and may perform the user authentication before the wearable device 10 transmits the generated encryption key to the external device 30. Alternatively, when a program that provides content is executed or is ended in the external device 30, the wearable device 10 may automatically perform the user authentication within a preset time period. Alternatively, when the wearable device 10 is connected with the external device 30 for communication, the wearable device 10 may automatically perform the user authentication within a preset time period. Alternatively, when the wearable device 10 determines that a distance between the wearable device 10 and the external device 30 is equal to or less than a predetermined distance, the wearable device 10 may automatically perform the user authentication within a preset time period.

As described above, if the user authentication is performed before the encryption key is transmitted to the external device 30, the user 20 may feel that a content encryption time is decreased.

In operation 320, when the user is authenticated, the wearable device 10 generates an encryption key for encryption of content in the external device 30. For example, the wearable device 10 may generate an encryption key used in a symmetric-key algorithm or may generate an encryption key used in an asymmetric-key algorithm. As the user is authenticated, the wearable device 10 may read an encryption key that is pre-stored in the memory 5370.

In operation 330, the wearable device 10 transmits the generated encryption key to the external device 30. Then, the external device 30 may encrypt the content by using the received encryption key. Alternatively, the wearable device 10 may directly encrypt the content by using the encryption key.

Figure 4:
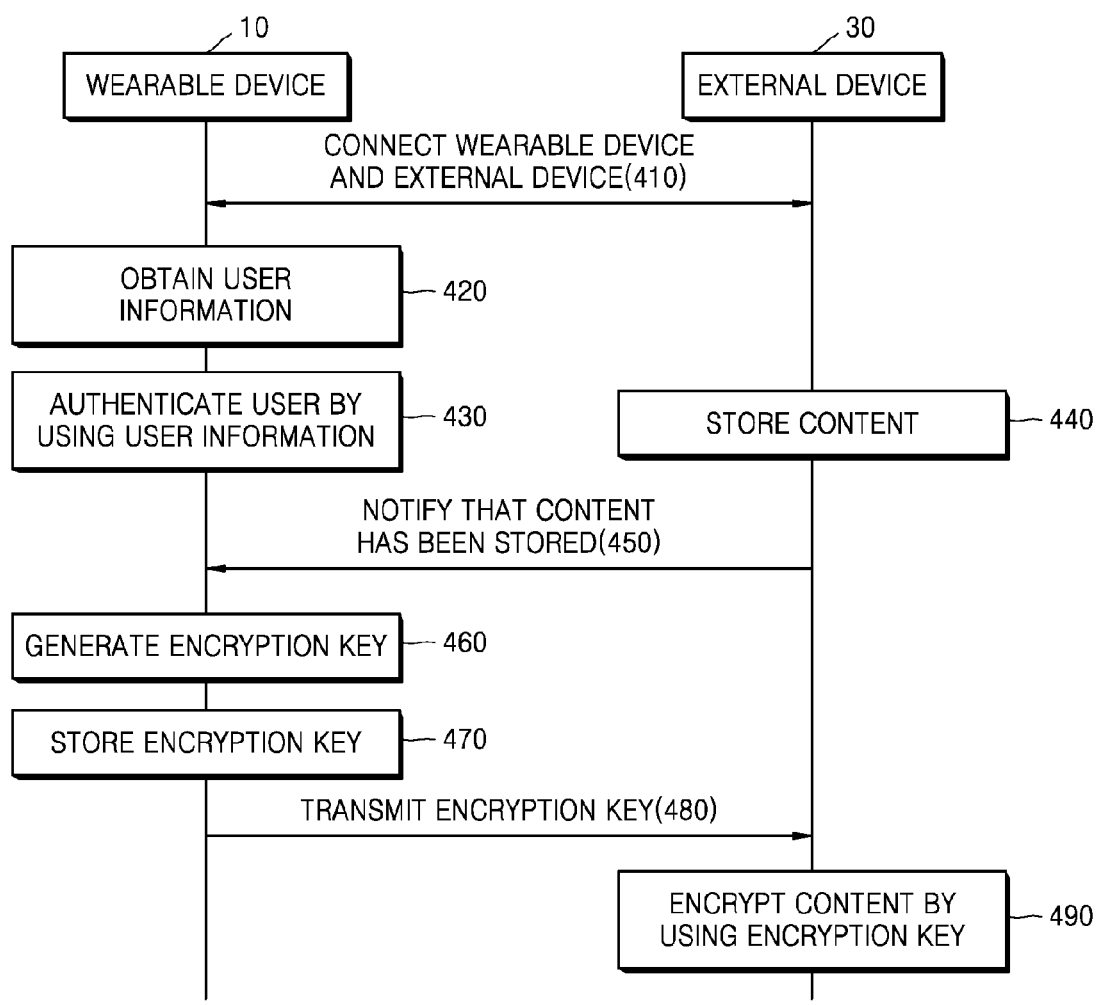
FIG. 4 is a flowchart illustrating an example in which the wearable device generates an encryption key, and an external device encrypts content, according to an exemplary embodiment.

FIG. 4 is a flowchart illustrating an example in which the wearable device 10 generates an encryption key, and the external device 30 encrypts content, according to an exemplary embodiment.

The exemplary embodiment of FIG. 4 includes operations that are processed in chronological order by the wearable device 10 and the external device 30 shown in FIG. 1. Thus, for description that refer to operations of the wearable device 10 and the external device 30 shown in FIG. 1, the descriptions may also be applied to the flowchart of FIG. 4.

In operation 410, the wearable device 10 and the external device 30 are connected to each other. According to an exemplary embodiment, the connection refers to data exchange being possible therebetween. For example, the wearable device 10 and the external device 30 may be connected to each other by using a wireless or wired communication method, and examples of the wireless and wired communication methods are described above with reference to FIG. 1.

If a plurality of devices are connectable to the wearable device 10, the wearable device 10 may select one of the plurality of devices and may maintain a connection with the selected device.

Hereinafter, an example in which the wearable device 10 maintains a connection with one of the plurality of devices is described with reference to FIGS. 5 through 7.

Figure 5:
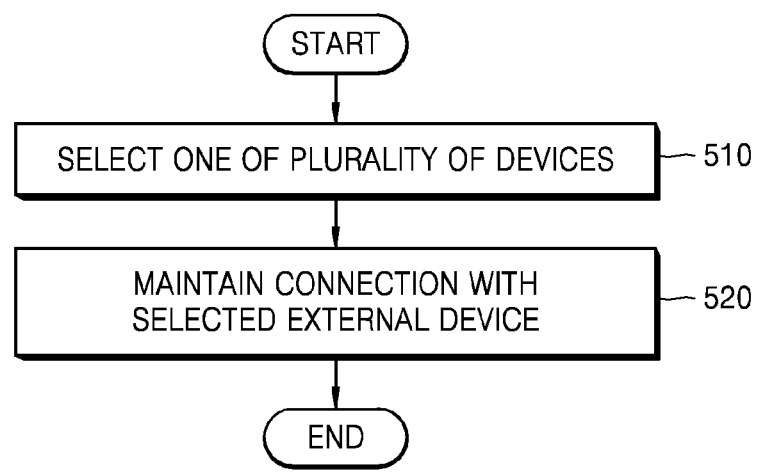
FIG. 5 is a flowchart illustrating an example in which the wearable device maintains a connection with one of a plurality of devices, according to an exemplary embodiment.

FIG. 5 is a flowchart illustrating an example in which the wearable device 10 maintains a connection with one of the plurality of devices, according to an exemplary embodiment.

The exemplary embodiment of FIG. 5 includes operations that are processed in chronological order by the wearable device 10 shown in FIG. 1. Thus, for descriptions that refer to operations of the wearable device 10 shown in FIG. 1, the descriptions may also be applied to the flowchart of FIG. 5.

In operation 510, the wearable device 10 selects one of the plurality of devices. If the wearable device 10 is connected to the external device 30 by using a wireless communication method, the wearable device 10 may search for devices that are connectable to the wearable device 10. For example, it is assumed that the wearable device 10 and the external device 30 are connected via Bluetooth, and the wearable device 10 may first search for neighboring devices by using its Bluetooth module. Then, if a plurality of devices are found, the wearable device 10 may select one of the found devices.

For example, the wearable device 10 may select one of the found devices, according to user input. As another example, the wearable device 10 may select one of the found devices, according to a history indicating information about pre-selected devices.

Hereinafter, an example in which the wearable device 10 selects one of a plurality of devices is described with reference to FIGS. 6 and 7. In the exemplary embodiment of FIGS. 6 and 7, the wearable device 10 and the external device 30 are connected to each other via Bluetooth, but one or more exemplary embodiments are not limited thereto. Examples in which the wearable device 10 and the external device 30 are connectable to each other are described above with reference to FIG.

Figure 6:
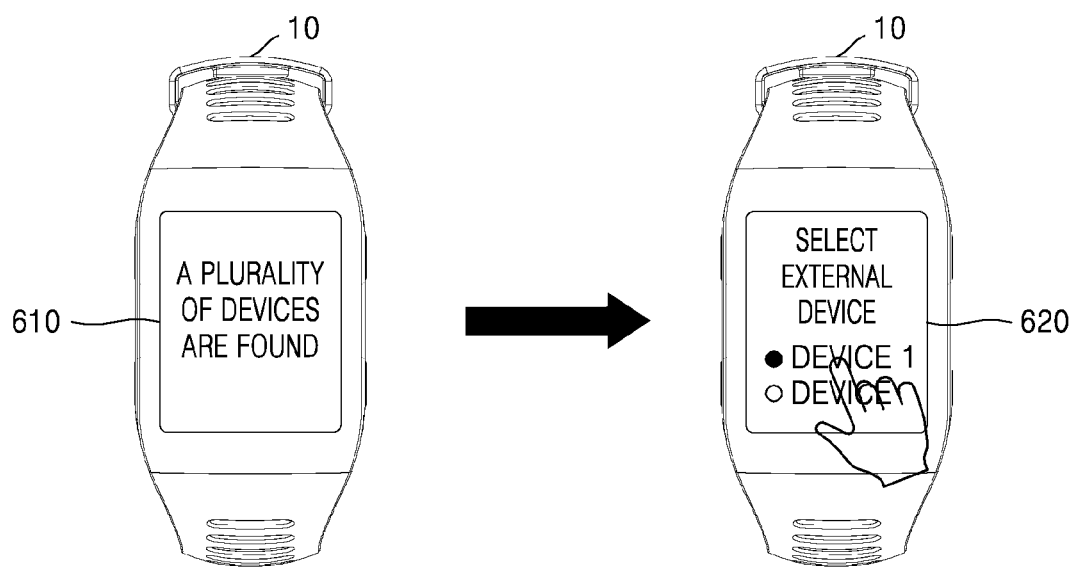
FIG. 6 illustrates an example in which the wearable device selects one of a plurality of devices, according to an exemplary embodiment.

FIG. 6 illustrates an example in which the wearable device 10 selects one of a plurality of devices, according to an exemplary embodiment.

If the plurality of devices are connectable to the wearable device 10, the wearable device 10 may output a pop-up window 610 indicating that the plurality of devices are found. For example, the wearable device 10 may search for neighboring devices by using a Bluetooth module of the wearable device 10, and if the plurality of devices are found, the wearable device 10 may display the pop-up window 610.

Afterward, the wearable device 10 may output a pop-up window 620 that requests the user 20 to select one of the plurality of devices. For example, if two devices are found by the wearable device 10, the wearable device 10 may mark names (refer to 'DEVICE 1' and 'DEVICE 2' in FIG. 6) of the found devices on the pop-up window 620, and the user 20 may select one of the found devices.

Figure 7:
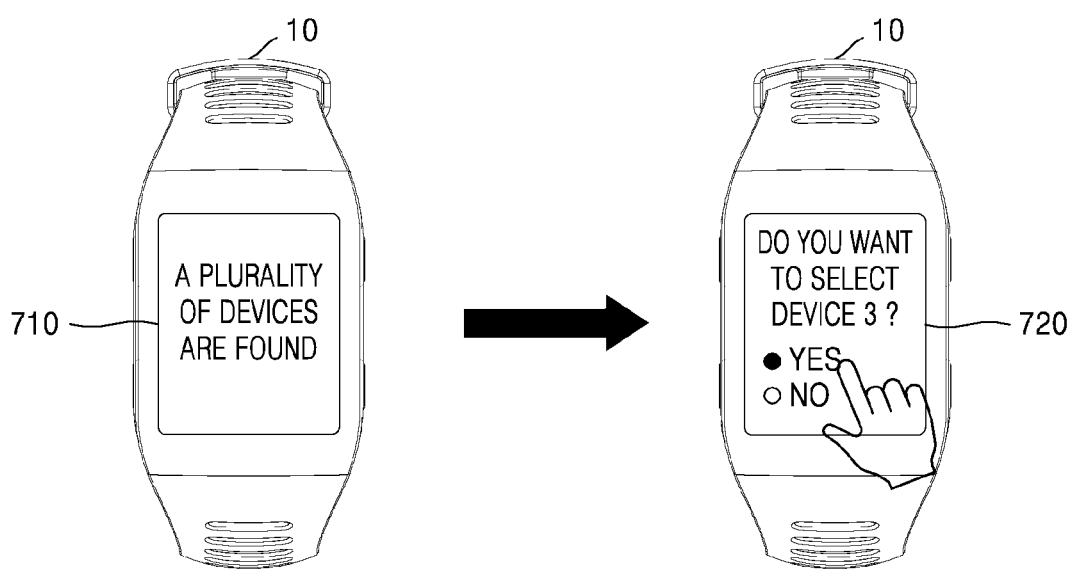
FIG. 7 illustrates an example in which the wearable device selects one of a plurality of devices, according to another exemplary embodiment.

FIG. 7 illustrates an example in which the wearable device 10 selects one of a plurality of devices, according to another exemplary embodiment.

If the plurality of devices are connectable to the wearable device 10, the wearable device 10 may output a pop-up window 710 indicating that the plurality of devices are found. For example, the wearable device 10 may search for neighboring devices by using a Bluetooth module of the wearable device 10, and if the plurality of devices are found, the wearable device 10 may display the pop-up window 710.

Afterward, the wearable device 10 may select one of the plurality of devices, by referring to a selection history. For example, if it is assumed that the wearable device 10 had selected 'DEVICE 3', the wearable device 10 may store, in the memory 5370, a history including information indicating that 'DEVICE 3' had been selected. Afterward, if the plurality of devices including 'DEVICE 3' are found, the wearable device 10 may automatically select 'DEVICE 3'.

The wearable device 10 may output a pop-up window 720 so as to ask the user 20 whether to connect to 'DEVICE 3', and the user 20 may input information so as to allow the wearable device 10 to connect to 'DEVICE 3'.

Referring back to FIG. 5, in operation 520, the wearable device 10 maintains a connection with the selected external device 30. In other words, the wearable device 10 maintains a status in which data is exchanged with the external device 30.

According to the descriptions with reference to FIG. 5, the wearable device 10 is connected to one external device 30, but one or more exemplary embodiments are not limited thereto. In other words, the wearable device 10 may be connected to a plurality of devices, and may transmit an encryption key to each of the plurality of connected devices or may receive content from each of the plurality of connected devices.

Referring back to FIG. 4, in operation 420, the wearable device 10 obtains user information. For example, the user information may be biological information of the user 20 or account information of the user 20.

In operation 430, the wearable device 10 authenticates the user 20 by using the user information. For example, the wearable device 10 may authenticate the user 20 by determining whether the obtained user information matches with pre-stored user information.

The wearable device 10 may authenticate the user 20 just before the wearable device 10 generates the encryption key, or may authenticate the user 20 regardless of generation of the encryption key. That is, while the wearable device 10 generates the encryption key according to a result of the user authentication, if the encryption key has still not been generated, there is no time limit for the wearable device 10 to perform the user authentication.

Hereinafter, examples in which the wearable device 10 authenticates the user 20 are described with reference to FIGS. 8 through 15.

Figure 8:
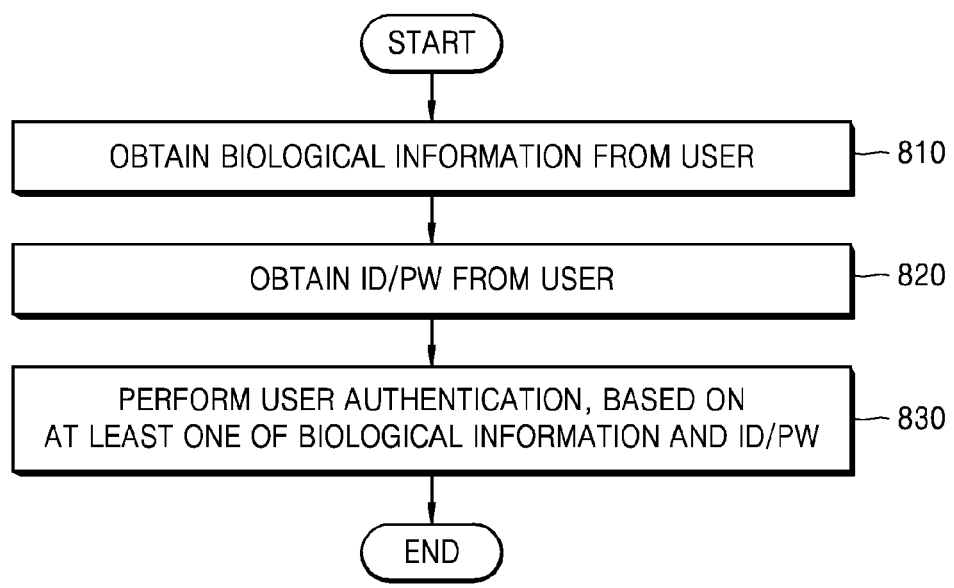
FIG. 8 is a flowchart illustrating an example in which the wearable device authenticates a user, according to an exemplary embodiment.

FIG. 8 is a flowchart illustrating an example in which the wearable device 10 authenticates the user 20, according to an exemplary embodiment.

The exemplary embodiment of FIG. 8 includes operations that are processed in chronological order by the wearable device 10 shown in FIG. 1. Thus, for descriptions that refer to operations of the wearable device 10 shown in FIG. 1, the descriptions may also be applied to the flowchart of FIG. 8.

In operation 810, the wearable device 10 obtains biological information from the user 20.

In operation 820, the wearable device 10 obtains an ID and password from the user 20.

In operation 830, the wearable device 10 performs user authentication, based on at least one of the biological information and the ID and password. That is, the wearable device 10 may perform the user authentication by using the biological information or by using the ID and password. Alternatively, the wearable device 10 may perform the user authentication by using all of the biological information and the ID and password.

Figure 9:
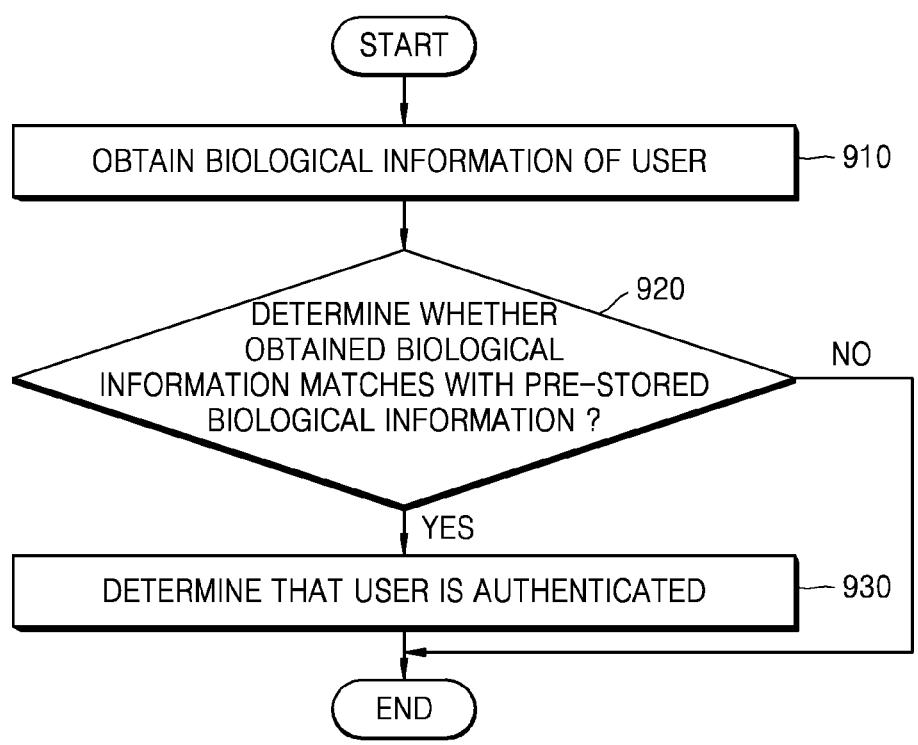
FIG. 9 is a flowchart illustrating an example in which the wearable device authenticates the user by using biological information of the user, according to an exemplary embodiment.

FIG. 9 is a flowchart illustrating an example in which the wearable device 10 authenticates the user 20 by using biological information of the user 20, according to an exemplary embodiment.

In operation 910, the wearable device 10 obtains the biological information of the user 20. According to an exemplary embodiment, the biological information may be information about at least one of a fingerprint, an iris, a retina, a vein, a skeletal part, and the face of the user 20. For example, the wearable device 10 may obtain information about the fingerprint, the vein, or the skeletal part of the user 20 by using the sensor included in the sensing unit 5350, and may obtain information about the iris, the retina, or the face of the user 20 by using the camera included in the A/V input unit 5360.

In operation 920, the wearable device 10 determines whether the obtained biological information matches with pre-stored biological information. In other words, the wearable device 10 may store biological information of the user 20 in the memory 5370, and may determine whether biological information obtained later from the user 20 matches with the biological information stored in the memory 5370.

If the wearable device 10 determines that the obtained biological information matches with the pre-stored biological information, the wearable device 10 proceeds to operation 930, and if not, the wearable device 10 ends a procedure.

In operation 930, the wearable device 10 determines that the user 20 is authenticated.

Figure 10:
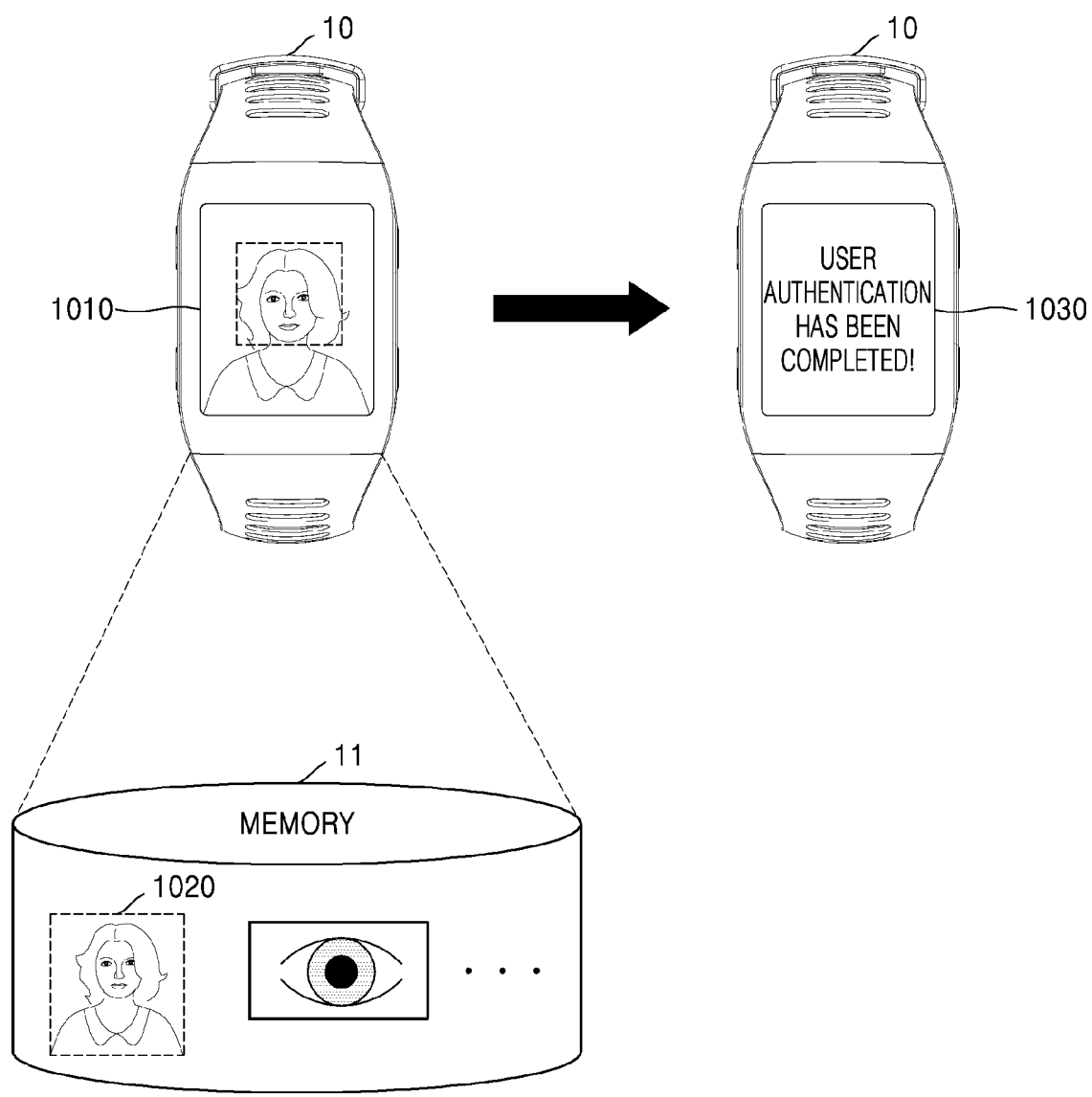
FIG. 10 is a flowchart illustrating an example in which the wearable device authenticates the user by using face information of the user, according to an exemplary embodiment.

FIG. 10 is a flowchart illustrating an example in which the wearable device 10 authenticates the user 20 by using face information of the user 20, according to an exemplary embodiment.

The wearable device 10 obtains the face information of the user 20. For example, the wearable device 10 may obtain a face image 1010 of the user 20 by using a camera arranged at the wearable device 10.

The wearable device 10 searches for, from user information in a memory 11, an image 1020 of the user 20 that corresponds to the face image 1010. According to an exemplary embodiment, the image 1020 includes information corresponding to positions of eyes, a nose, a mouth, or a face contour that is shown in the face image 1010.

Each person has unique characteristics of his or her face. For example, positions of eyes, a nose, and a mouth, or distances among the eyes, the nose, and the mouth, may vary for each person. Also, a contour of the face or where the eyes, the nose, and the mouth are disposed on the face may vary for each person. Therefore, even if the person changes a hair style or puts on makeup, a characteristic of the face is not changed.

The wearable device 10 extracts a characteristic from the face image 1010, and extracts a characteristic from the image 1020 stored in the memory 11. Then, the wearable device 10 searches for the image 1020 of the user 20 that corresponds to the face image 1010 and is from among a plurality of pieces of information stored in the memory 11, while the wearable device 10 compares the extracted characteristics. Alternatively, the wearable device 10 may previously convert a facial characteristic of the user 20 into data, may store the data, and may compare the stored data with the characteristic that is extracted from the face image 1010.

As a result of the search, if the image 1020 that corresponds to the face image 1010 is stored in the memory 11 (alternatively, if data that corresponds to the characteristic extracted from the face image 1010 is stored in the memory 11), the wearable device 10 determines that the user 20 is authenticated. In this case, the wearable device 10 may output a pop-up window 1030 indicating that user authentication has been completed.

Figure 11:
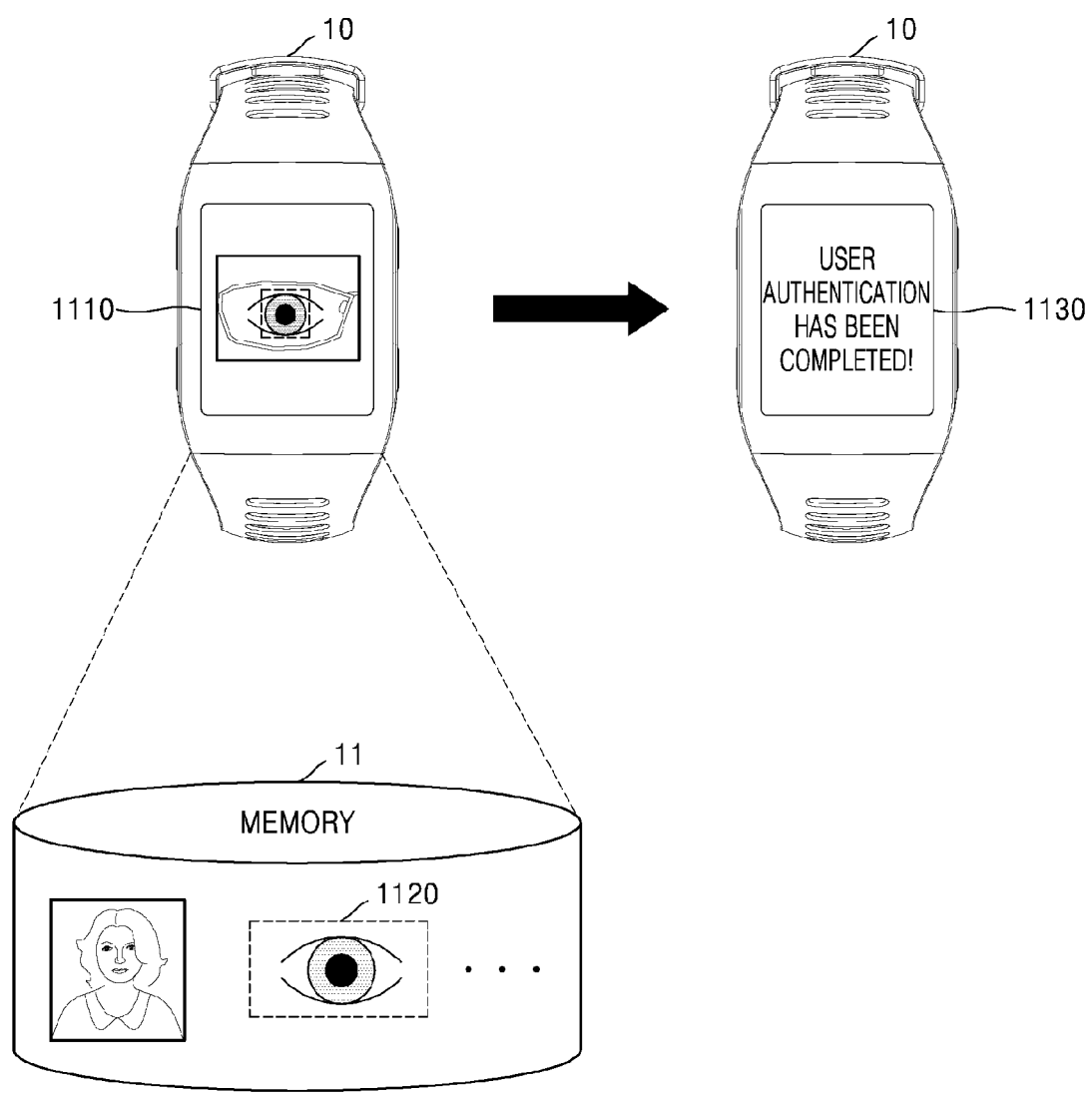
FIG. 11 is a flowchart illustrating an example in which the wearable device authenticates the user by using iris information or retina information of the user, according to an exemplary embodiment.

FIG. 11 is a flowchart illustrating an example in which the wearable device 10 authenticates the user 20 by using iris information or retina information of the user 20, according to an exemplary embodiment.

The wearable device 10 obtains face information of the user 20. For example, the wearable device 10 may obtain an iris image or a retina image of the user 20 by using the camera arranged at the wearable device 10. Hereinafter, it is assumed that the wearable device obtains an iris image 1110 of the user 20.

The wearable device 10 searches for, from user information in the memory 11, an image 1120 of the user 20 that corresponds to the iris image 1110. According to an exemplary embodiment, the image 1120 includes information corresponding to a pattern of an iris shown in the iris image 1110.

Each person has a unique iris pattern. In other words, a pattern of an iris of a user A is different from a pattern of an iris of a user B. Therefore, the wearable device 10 may identify the user 20 by recognizing a pattern of an iris of the user 20.

The wearable device 10 extracts a characteristic from the iris image 1110, and extracts a characteristic from the image 1120 stored in the memory 11. Then, the wearable device 10 searches for the image 1120 of the user 20 that corresponds to the iris image 1110 and is from among a plurality of pieces of information stored in the memory 11, while the wearable device 10 compares the extracted characteristics. Alternatively, the wearable device 10 may previously convert an iris pattern of the user 20 into data, may store the data, and may compare the stored data with the characteristic that is extracted from the iris image 1110.

As a result of the search, if the image 1120 that corresponds to the iris image 1110 is stored in the memory 11 (alternatively, if data that corresponds to the characteristic extracted from the iris image 1110 is stored in the memory 11), the wearable device 10 determines that the user 20 is authenticated. In this case, the wearable device 10 may output a pop-up window 1130 indicating that user authentication has been completed.

Figure 12:
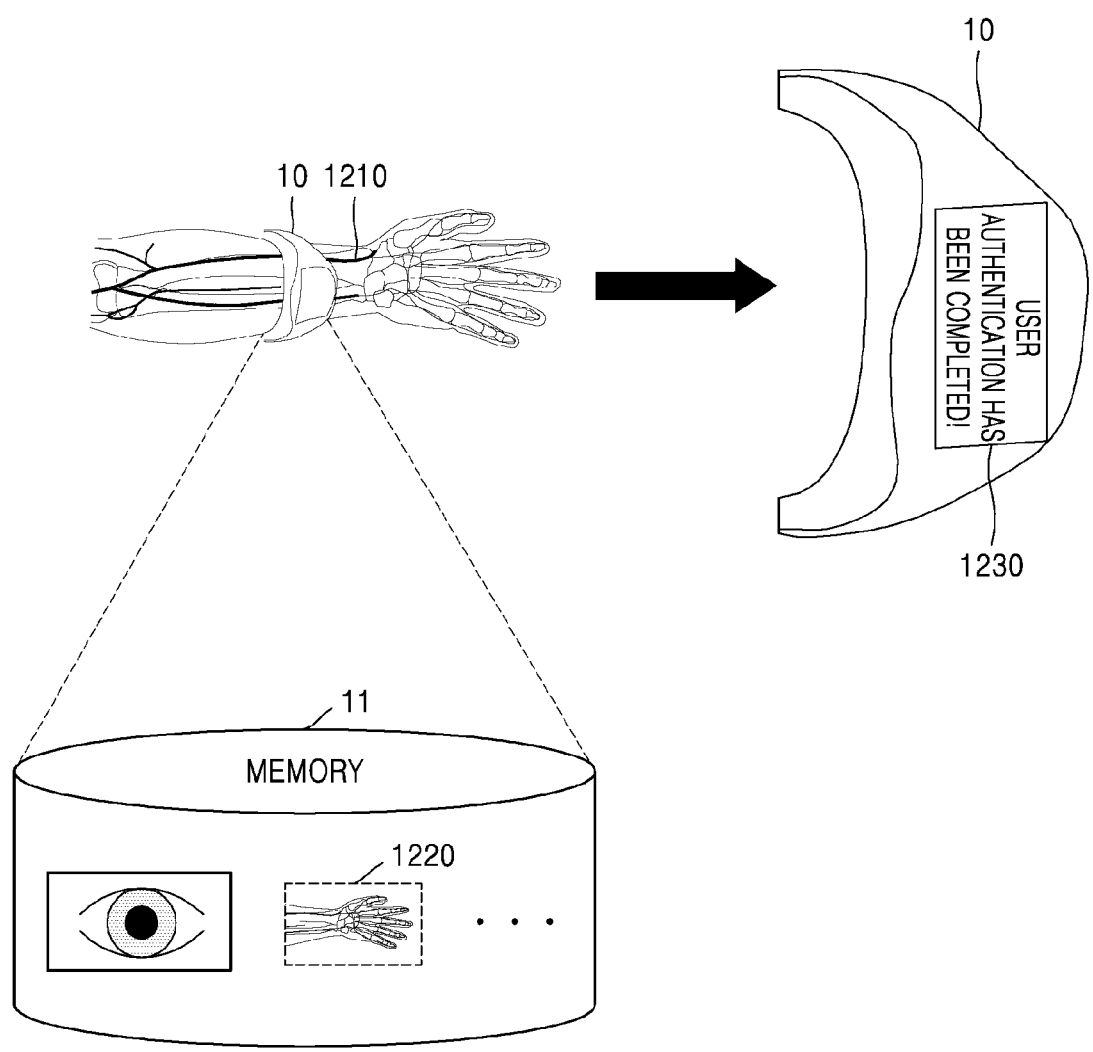
FIG. 12 is a flowchart illustrating an example in which the wearable device authenticates the user by using vein information of the user, according to an exemplary embodiment.

FIG. 12 is a flowchart illustrating an example in which the wearable device 10 authenticates the user 20 by using vein information of the user 20, according to an exemplary embodiment.

The wearable device 10 obtains the vein information of the user 20. For example, the wearable device 10 may obtain a vein image 1210 of the user 20 by using the sensor included in the sensing unit 5350.

The wearable device 10 searches for, from user information in the memory 11, an image 1220 of the user 20 that corresponds to the vein image 1210. According to an exemplary embodiment, the image 1220 includes information corresponding to a pattern (or a shape) of a vein shown in the vein image 1210.

Each person has a unique vein pattern. Also, a shape of a vein distributed in each person varies. Therefore, the wearable device 10 may identify the user 20 by recognizing a vein pattern or a shape of the vein of the user 20.

The wearable device 10 extracts a characteristic from the vein image 1210, and extracts a characteristic from the image 1220 stored in the memory 11. Then, the wearable device 10 searches for the image 1220 of the user 20 that corresponds to the vein image 1210 and is from among a plurality of pieces of information stored in the memory 11, while the wearable device 10 compares the extracted characteristics. Alternatively, the wearable device 10 may previously convert a vein pattern of the user 20 into data, may store the data, and may compare the stored data with the characteristic that is extracted from the vein image 1210.

As a result of the search, if the image 1220 that corresponds to the vein image 1210 is stored in the memory 11 (alternatively, if data that corresponds to the characteristic extracted from the vein image 1210 is stored in the memory 11), the wearable device 10 determines that the user 20 is authenticated. In this case, the wearable device 10 may output a pop-up window 1230 indicating that user authentication has been completed.

Figure 13:
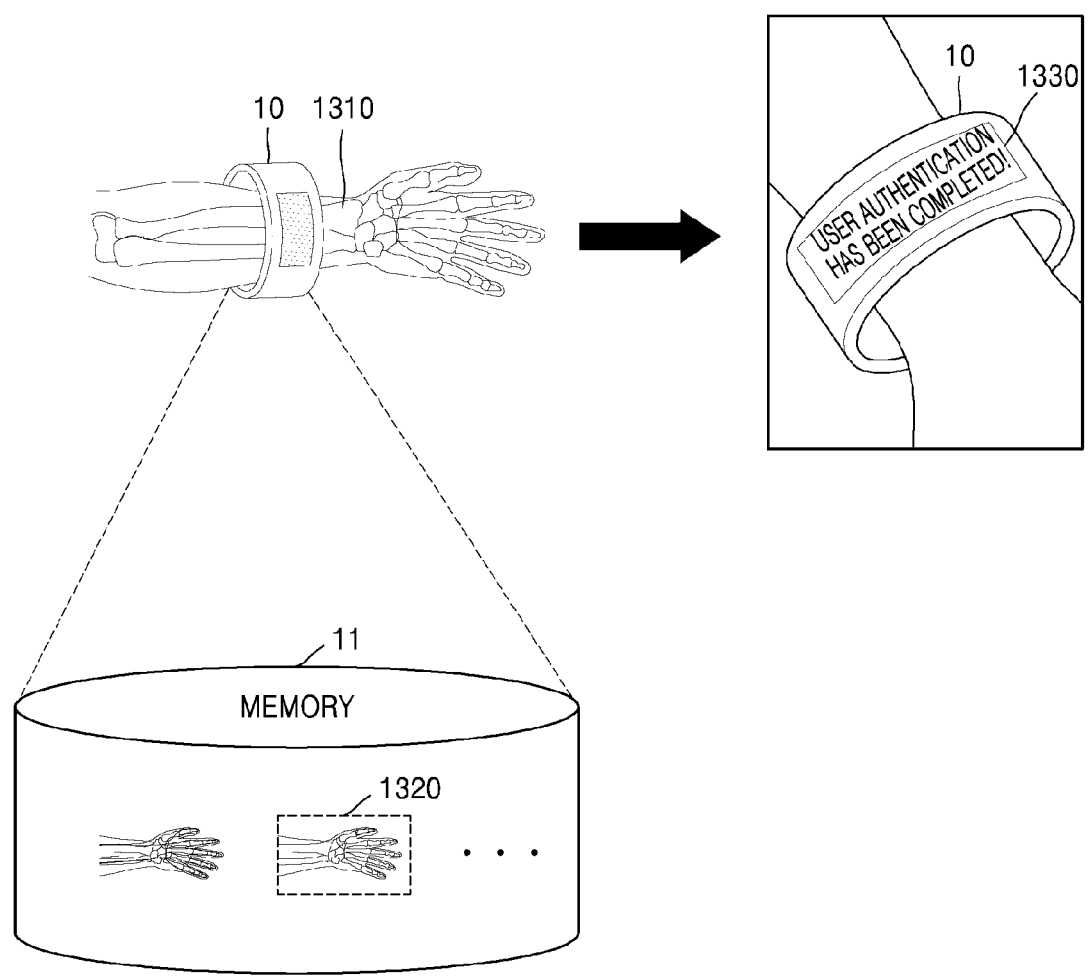
FIG. 13 is a flowchart illustrating an example in which the wearable device authenticates the user by using skeletal information of the user, according to an exemplary embodiment.

FIG. 13 is a flowchart illustrating an example in which the wearable device 10 authenticates the user 20 by using skeletal information of the user 20, according to an exemplary embodiment.

The wearable device 10 obtains the skeletal information of the user 20. For example, the wearable device 10 may obtain a skeletal image 1310 of the user 20 by using the sensor included in the sensing unit 5350.

The wearable device 10 searches for, from user information in the memory 11, an image 1320 of the user 20 that corresponds to the skeletal image 1310. According to an exemplary embodiment, the image 1320 includes information about shapes, arrangement, or sizes of bones shown in the skeletal image 1310.

The wearable device 10 extracts a characteristic from the skeletal image 1310, and extracts a characteristic from the image 1320 stored in the memory 11. Then, the wearable device 10 searches for the image 1320 of the user 20 that corresponds to the skeletal image 1310 and is from among a plurality of pieces of information stored in the memory 11, while the wearable device 10 compares the extracted characteristics. Alternatively, the wearable device 10 may previously convert a characteristic of a skeletal part of the user 20 into data, may store the data, and may compare the stored data with the characteristic that is extracted from the skeletal image 1310.

As a result of the search, if the image 1320 that corresponds to the skeletal image 1310 is stored in the memory 11 (alternatively, if data that corresponds to the characteristic extracted from the skeletal image 1310 is stored in the memory 11), the wearable device 10 determines that the user 20 is authenticated. In this case, the wearable device 10 may output a pop-up window 1330 indicating that user authentication has been completed.

Although not illustrated in FIGS. 10 through 13, the wearable device 10 may obtain fingerprint information of the user 20 by using the sensor, may compare the obtained fingerprint information with pre-stored fingerprint information of the user 20, and thus, may authenticate the user 20.

Figure 14:
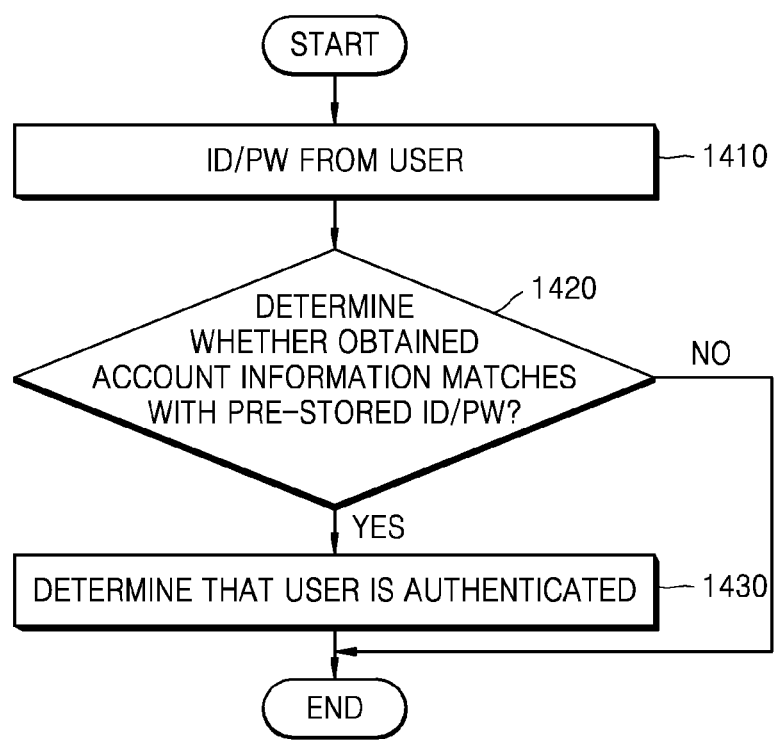
FIG. 14 is a flowchart illustrating an example in which the wearable device authenticates the user by using account information of the user, according to an exemplary embodiment.

FIG. 14 is a flowchart illustrating an example in which the wearable device 10 authenticates the user 20 by using account information of the user 20, according to an exemplary embodiment.

In operation 1410, the wearable device 10 obtains the account information of the user 20. Here, the account information may indicate a unique ID and password (e.g., "PW") of the user 20. For example, the wearable device 10 may receive the ID and the password from the user 20 via the user input unit 5310.

In operation 1420, the wearable device 10 determines whether the obtained account information matches with pre-stored information. That is, the wearable device 10 may store the ID and password of the user 20 in the memory 5370, and may determine whether an ID and password obtained later from the user 20 match with the ID and password stored in the memory 5370.

If the wearable device 10 determines that the obtained account information matches with the pre-stored information, the wearable device 10 proceeds to operation 1430, and if not, the wearable device 10 ends a procedure.

In operation 1430, the wearable device 10 determines that the user 20 is authenticated.

Also, as in the aforementioned various methods, in a case where, after the user 20 is authenticated, when the wearable device 10 generates the encryption key for encryption of the content and transmits the encryption key to the external device 30, the wearable device 10 may use the ID and password, which were input by the user 20, as an ID and password for execution of the content.

In this case, when the wearable device 100 transmits the ID and password to the external device 30 while the user 20 does not wear the wearable device 100, the external device 30 may execute the content by using the received ID and password.

Figure 15:
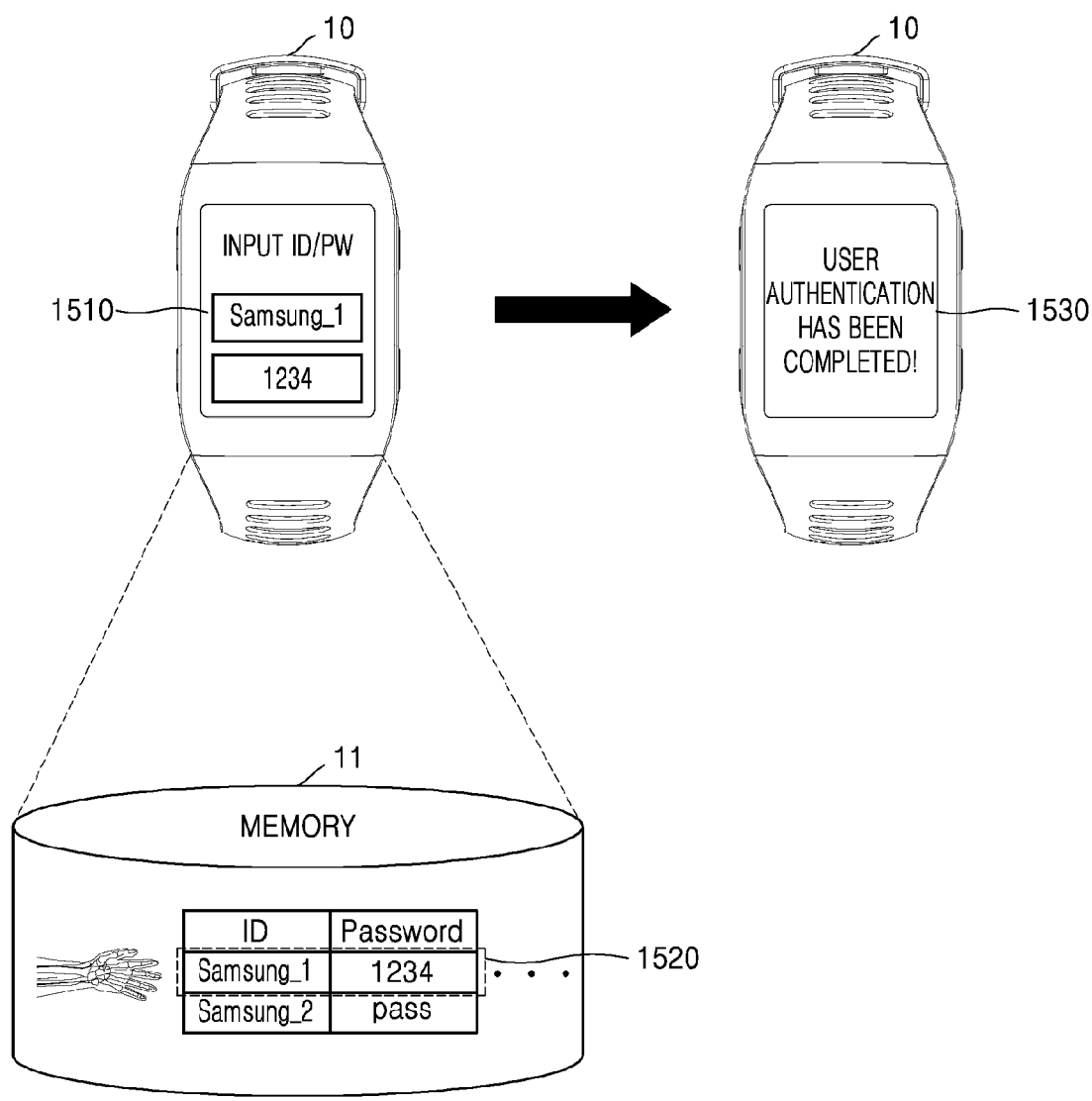
FIG. 15 illustrates an example in which the wearable device authenticates the user by using an identification (ID) and password of the user, according to an exemplary embodiment.

FIG. 15 illustrates an example in which the wearable device 10 authenticates the user 20 by using an ID and password of the user 20, according to an exemplary embodiment.

The wearable device 10 outputs a pop-up window 1510 to the user 20 so as to request the user 20 to input an ID and password, and the user 20 inputs an ID 'Samsung_1' and password '1234' via the user input unit 5310.

The wearable device 10 compares the ID 'Samsung_1' and password '1234', which are input by the user 20, with an ID and password 1520 stored in the memory 11. If the wearable device 10 determines that the input ID and password match with the stored ID and password 1520, the wearable device 10 determines that the user 20 is authenticated. In this case, the wearable device 10 may output a pop-up window 1530 indicating that the user authentication has been completed.

Referring back to FIG. 4, in operation 440, the external device 30 stores content.

According to an exemplary embodiment, the content indicates an object to be encrypted. Examples of the content are described above with reference to FIG. 1.

A time for the external device 30 to store the content is not dependent on when the wearable device 10 authenticates the user 20. In other words, the external device 30 may store the content after the wearable device 10 performs user authentication, or the wearable device 10 may perform the user authentication after the external device 30 stores the content.

In operation 450, the external device 30 notifies the wearable device 10 that the content has been stored.

In operation 460, the wearable device 10 generates an encryption key for encryption of the content. For example, the wearable device 10 may generate an encryption key used in a symmetric-key algorithm or may generate an encryption key used in an asymmetric-key algorithm. Referring to FIG. 4, when the wearable device 10 receives notification about the stored content from the external device 30, the wearable device 10 may automatically generate the encryption key without receiving input from the user 20, but one or more exemplary embodiments are not limited thereto. That is, the wearable device 10 may generate the encryption key according to selection of the user 20. An example in which the user selects whether to encrypt content (e.g., whether to generate an encryption key) is described later with reference to FIGS. 16 and 17.

In operation 470, the wearable device 10 stores the generated encryption key. Also, the wearable device 10 may not separately store but may immediately delete the generated encryption key.

In operation 480, the wearable device 10 transmits the encryption key to the external device 30.

Hereinafter, examples in which the wearable device 10 generates an encryption key and transmits the generated encryption key to the external device 30 are described with reference to FIGS. 16 through 19.

Figure 16:
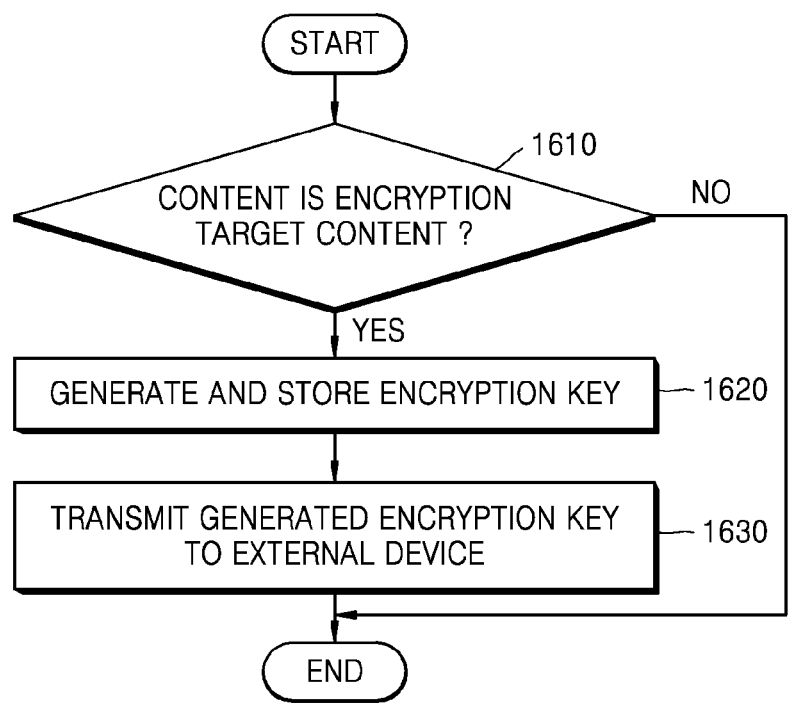
FIG. 16 is a flowchart of an example in which the wearable device generates an encryption key and transmits the generated encryption key to the external device, according to an exemplary embodiment.

FIG. 16 is a flowchart of an example in which the wearable device 10 generates an encryption key and transmits the generated encryption key to the external device 30, according to an exemplary embodiment.

In operation 1610, the wearable device 10 determines whether content stored in the external device 30 is encryption target content. As described above with reference to operation 450 in FIG. 4, the external device 30 may notify the wearable device 10 that the content is stored. Upon receipt of the notification, the wearable device 10 may determine whether the content stored in the external device 30 is encryption target content.

As described above with reference to FIG. 4, when the wearable device 10 receives the notification about storage of the content from the external device 30, the wearable device 10 may generate an encryption key without determining whether the content is the encryption target content. Alternatively, if the wearable device 10 receives the notification about storage of the content from the external device 30 before the wearable device 10 generates the encryption key, the wearable device 10 may determine whether the content is the encryption target content, and may generate the encryption key according to a result of the determination. Therefore, contents stored in the external device 30 may be selectively encrypted.

If the wearable device 10 determines that the content related to the storage notification from the external device 30 is the encryption target content, the wearable device 10 proceeds to operation 1620, and if not, the wearable device 10 ends a procedure.

In operation 1620, the wearable device 10 generates the encryption key to be used in encryption of the content. Then, the wearable device 10 stores the generated encryption key.

In operation 1630, the wearable device 10 transmits the generated encryption key to the external device 30.

Hereinafter, the exemplary embodiment of FIG. 16 is described in detail with reference to FIG. 17.

Figure 17:
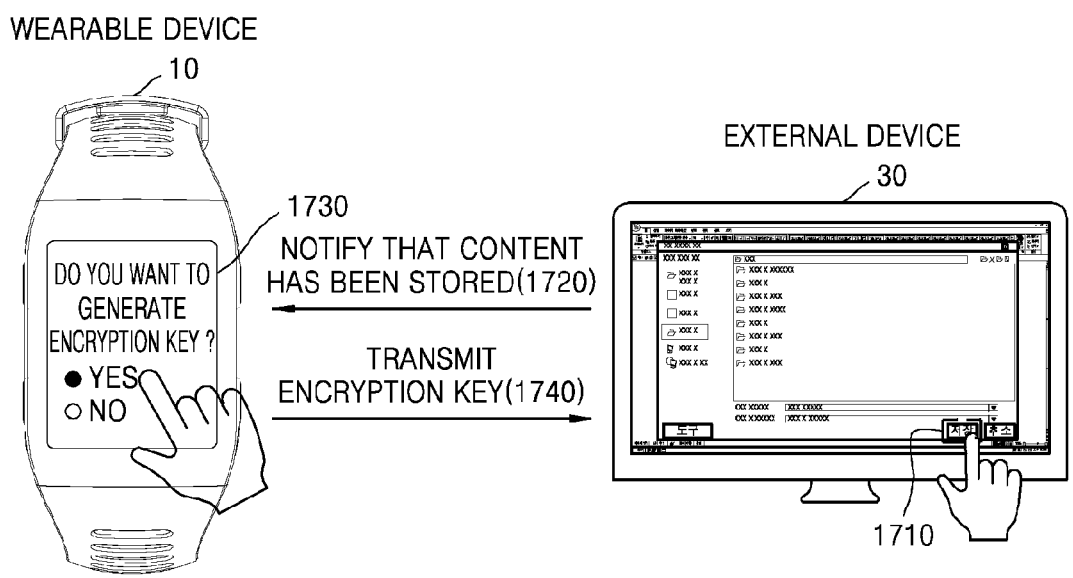
FIG. 17 illustrates an example of a condition by which the wearable device generates an encryption key for the user, according to an exemplary embodiment.

FIG. 17 illustrates an example of a condition by which the wearable device 10 generates an encryption key for the user 20, according to an exemplary embodiment.

First, the external device 30 stores content. For example, when the external device 30 receives user input requesting to store the content, the external device 30 may store the content. For example, if the user 20 selects a 'store' object 1710 that is output to a screen of the external device 30, the content may be stored. According to an exemplary embodiment, the object 1710 may include an icon, a pop-up window, or the like.

As another example, the external device 30 may automatically store content at regular intervals. In other words, even if there is no request from the user 20, the external device 30 may automatically store executed content at regular intervals.

When the content is stored, the external device 30 notifies the wearable device 10 that the content has been stored in operation 1720.

When the notification is received from the external device 30, the wearable device 10 may output a pop-up window 1730 so as to ask the user 20 whether to encrypt the content. That is, the wearable device 10 may output the pop-up window 1730 so as to ask the user 20 whether to generate an encryption key. According to an exemplary embodiment, if the wearable device 10 receives, via the user input unit 5310, a user input of requesting to generate the encryption key, the wearable device 10 generates the encryption key. Then, the wearable device 10 transmits the generated encryption key to the external device 30 in operation 1740.

Alternatively, the wearable device 10 may not ask the user 20 whether to generate the encryption key. In other words, if the wearable device 10 receives the notification about the storage of the content from the external device 30, the wearable device 10 may immediately generate the encryption key and may transmit the generated encryption key to the external device 30.

Figure 18:
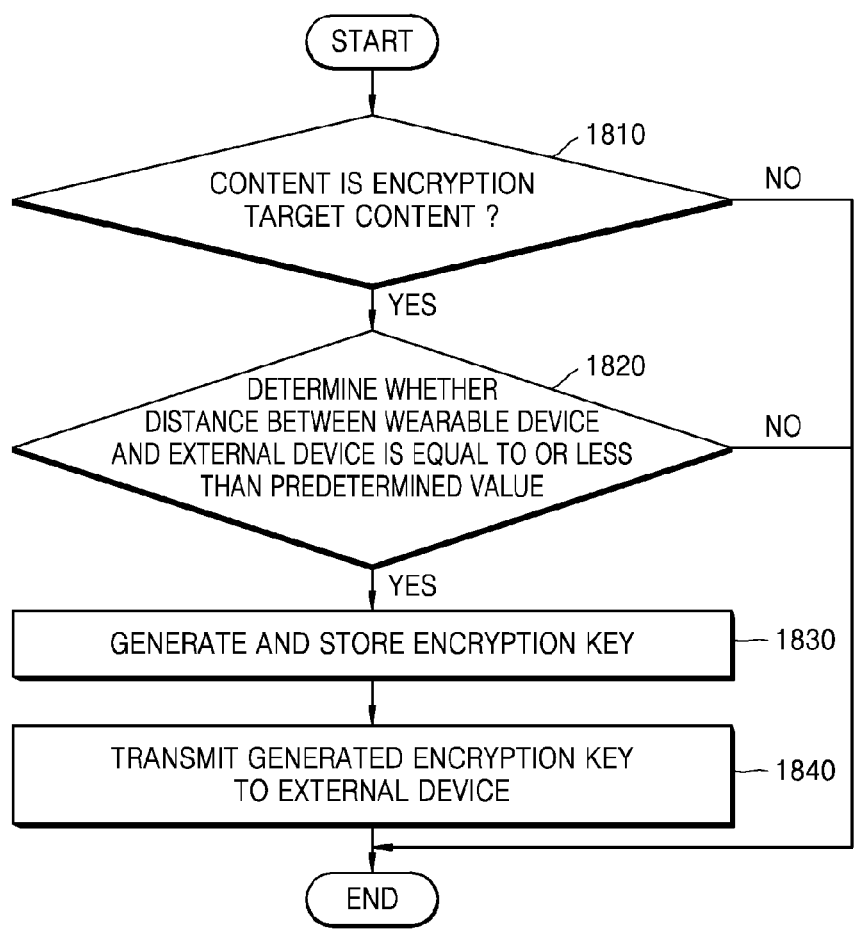
FIG. 18 is a flowchart of an example in which the wearable device generates an encryption key and transmits the generated encryption key to the external device, according to another exemplary embodiment.

FIG. 18 is a flowchart of an example in which the wearable device 10 generates an encryption key and transmits the generated encryption key to the external device 30, according to another exemplary embodiment.

Operations 1810, 1830, and 1840 in FIG. 18 are the same as operations 1610 through 1630 in FIG. 16, and thus, detailed descriptions thereof are omitted here.

In operation 1820, the wearable device 10 determines whether a distance between the wearable device 10 and the external device 30 is equal to or less than a predetermined value. In other words, the wearable device 10 calculates the distance between the wearable device 10 and the external device 30, and determines whether the distance is equal to or less than the predetermined value.

When the user 20 executes content by using the external device 30, in general, the user 20 and the external device 30 are adjacent to each other by having a small distance therebetween. Thus, a distance between the user 20 and the external device 30 may be a standard by which the user 20 determines whether to execute the content by using the external device 30.

Since the wearable device 10 according to the present exemplary embodiment may obtain biological information so as to perform user authentication, in this case, it is assumed that the user 20 currently wears the wearable device 10. Therefore, if the distance between the wearable device 10 and the external device 30 is equal to or less than the predetermined value, the user 20 and the external device 30 may be located adjacent to each other.

Accordingly, by determining whether the distance between the wearable device 10 and the external device 30 is equal to or less than the predetermined value, it is possible to prevent the encryption key or a decryption key from being generated by another person other than the user 20.

Hereinafter, the exemplary embodiment of FIG. 18 is described in detail with reference to FIG. 19.

Figure 19:
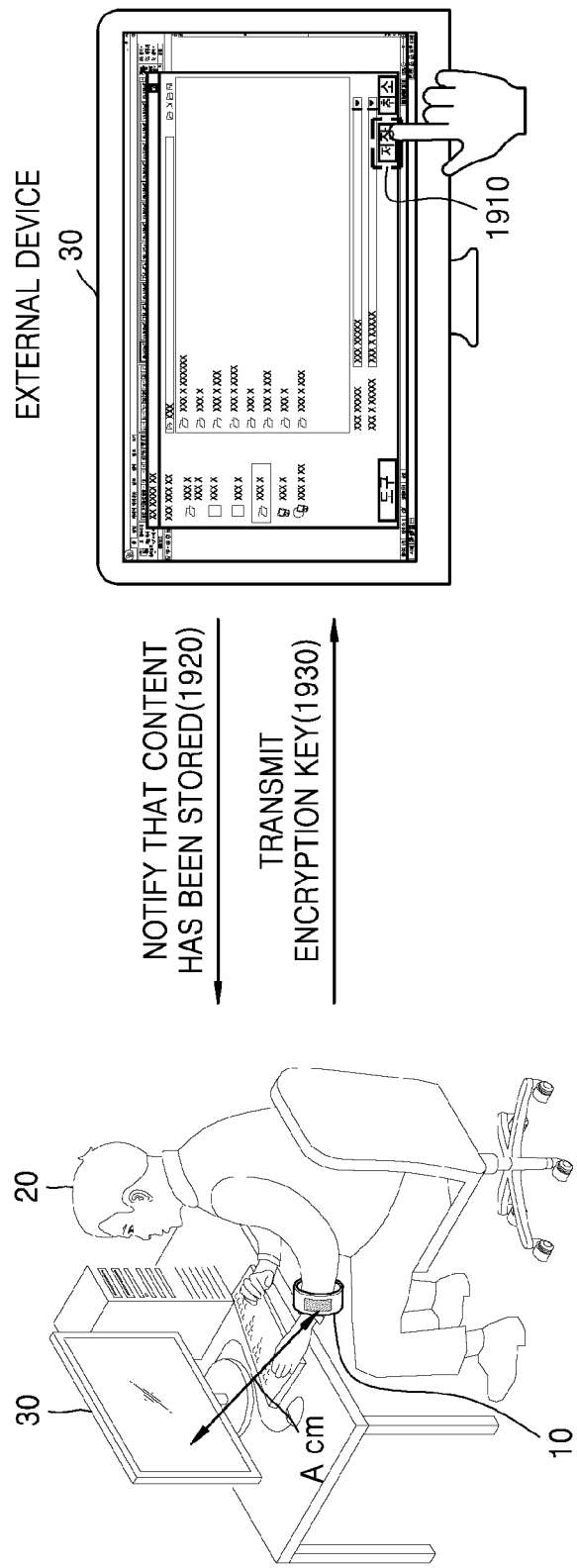
FIG. 19 illustrates an example of a condition by which the wearable device generates an encryption key, according to another exemplary embodiment.

FIG. 19 illustrates an example of a condition by which the wearable device 10 generates an encryption key, according to another exemplary embodiment.

First, the external device 30 stores content. For example, when the external device 30 receives user input requesting the external device 30 to store the content, the external device 30 may store the content. For example, if the user 20 selects a 'store' object 1910 that is output to a screen of the external device 30, the content may be stored. According to an exemplary embodiment, the 'store' object 1910 may include an icon, a pop-up window, or the like.

As another example, the external device 30 may automatically store content at regular intervals. In other words, even if there is no request from the user 20, the external device 30 may automatically store executed content at regular intervals.

When the content is stored, the external device 30 notifies the wearable device 10 that the content has been stored in operation 1920.

When the notification is received from the external device 30, the wearable device 10 calculates a distance between the wearable device 10 and the external device 30. For example, the wearable device 10 may output a specific signal, may receive a signal that is the specific signal reflected from the external device 30, and may calculate the distance between the wearable device 10 and the external device 30 by using the received signal.

Alternatively, the wearable device 10 may calculate the distance between the wearable device 10 and the external device 30 by using a strength of a signal received from the external device 30, and a Received Signal Strength Indicator (RSSI) value that corresponds to the strength of the signal. For example, when it is assumed that the wearable device 10 and the external device 30 are connected by using a wireless communication method (e.g., Bluetooth, Wi-Fi, etc.), the wearable device 10 may calculate a strength of a radio signal received from the external device 30. Then, the wearable device 10 may calculate the distance between the wearable device 10 and the external device 30 by using an RSSI value that corresponds to the strength of the radio signal.

Afterward, the wearable device 10 determines whether the calculated distance is equal to or less than a predetermined value. For example, when it is assumed that the distance between the wearable device 10 and the external device 30 is A cm, the wearable device 10 determines whether A cm is equal to or less than the predetermined value.

If the wearable device 10 determines that A cm is equal to or less than the predetermined value, the wearable device 10 generates an encryption key, and transmits the encryption key to the external device 30 in operation 1930.

Alternatively, the wearable device 10 may not calculate the distance between the wearable device 10 and the external device 30. In other words, if the wearable device 10 receives notification about storage of the content from the external device 30, the wearable device 10 may immediately generate the encryption key and may transmit the encryption key to the external device 30.

As described above with reference to FIGS. 18 and 19, if the distance between the wearable device 10 and the external device 30 is equal to or less than the predetermined value, the wearable device 10 may generate the encryption key, but one or more exemplary embodiments are not limited thereto. That is, if the wearable device 10 and the external device 30 are connected to each other, the wearable device 10 may generate the encryption key without calculating the distance between the wearable device 10 and the external device 30.

Referring back to FIG. 4, in operation 490, the external device 30 encrypts the content by using the encryption key. For example, the external device 30 may encrypt the content by using a symmetric-key algorithm or an asymmetric-key algorithm. Also, the external device 30 may store the encrypted content.

Referring to the aforementioned description with reference to FIGS. 4 through 19, after the external device 30 stores the content, the wearable device 10 generates the encryption key and transmits the encryption key to the external device 30. However, one or more exemplary embodiments are not limited thereto. In other words, when the external device 30 executes a program for executing the content, the wearable device 10 may generate the encryption key. Alternatively, when the external device 30 exits the program for executing the content, the wearable device 10 may generate the encryption key.

Hereinafter, examples about a time for the wearable device 10 to generate an encryption key are described with reference to FIGS. 20 through 23.

Figure 20:
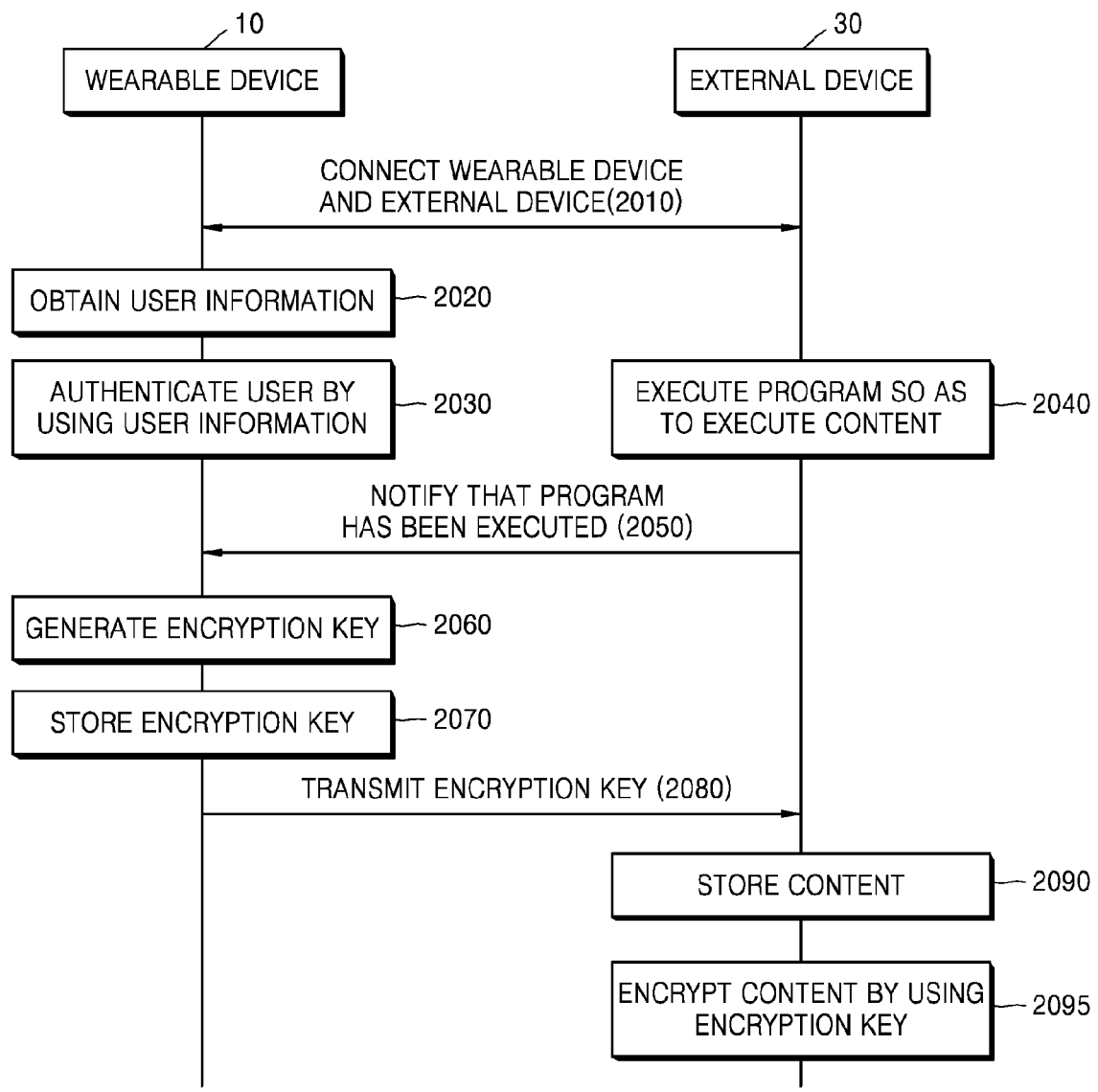
FIG. 20 is a flowchart illustrating an example in which the wearable device generates an encryption key, and the external device encrypts content, according to another exemplary embodiment.

FIG. 20 is a flowchart illustrating an example in which the wearable device 10 generates an encryption key, and the external device 30 encrypts content, according to another exemplary embodiment.

The exemplary embodiment of FIG. 20 includes operations that are processed in chronological order by the wearable device 10 and the external device 30 shown in FIG. 1. Thus, for descriptions that refer to operations of the wearable device 10 and the external device 30 shown in FIG. 1, the descriptions may also be applied to the flowchart of FIG. 20.

Comparing the flowchart of FIG. 20 with the flowchart of FIG. 4, a time for the wearable device 10 to generate the encryption key varies. In other words, in the flowchart of FIG. 4, the wearable device 10 generates the encryption key after the external device 30 stores the content. On the other hand, in the flowchart of FIG. 20, the wearable device 10 generates the encryption key after the external device 30 executes a program. According to an exemplary embodiment, the program refers to a program that is used by the external device 30 so as to execute the content.

In operation 2010, the wearable device 10 and the external device 30 are connected to each other. According to an exemplary embodiment, a connection indicates that data exchange is possible therebetween. For example, the wearable device 10 and the external device 30 may be connected to each other by using a wireless or wired communication method, and examples of the wireless and wired communication methods are described above with reference to FIG. 1.

In operation 2020, the wearable device 10 obtains user information. For example, the user information may be biological information of the user 20 or account information of the user 20.

In operation 2030, the wearable device 10 authenticates the user 20 by using the user information. For example, the wearable device 10 may authenticate the user 20 by determining whether the obtained user information matches with pre-stored user information.

The wearable device 10 may authenticate the user 20 just before the wearable device 10 generates the encryption key, or may authenticate the user 20 regardless of generation of the encryption key. That is, while the wearable device 10 generates the encryption key according to a result of the user authentication, if the encryption key has still not been generated, there is no time limit for the wearable device 10 to perform the user authentication.

In operation 2040, the external device 30 executes the program so as to execute the content. A time for the external device 30 to execute the program is not dependent on a time for the wearable device 10 to authenticate the user 20. In other words, the external device 30 may execute the program after the wearable device 10 authenticates the user 20, or the wearable device 10 may authenticate the user 20 after the external device 30 executes the program.

In operation 2050, the external device 30 notifies the wearable device 10 that the program has been executed.

In operation 2060, the wearable device 10 generates the encryption key for encryption of the content. For example, the wearable device 10 may generate an encryption key used in a symmetric-key algorithm or may generate an encryption key used in an asymmetric-key algorithm. Referring to FIG. 20, when the wearable device 10 receives notification about the executed program from the external device 30, the wearable device 10 automatically generates the encryption key without receiving input from the user 20, but one or more exemplary embodiments are not limited thereto. That is, the wearable device 10 may generate the encryption key according to selection of the user 20. According to an exemplary embodiment, the selection of the user 20 refers to the user 20 selecting whether to encrypt the content (e.g., whether to generate the encryption key).

In operation 2070, the wearable device 10 stores the encryption key. The wearable device 10 may not separately store but may immediately delete the generated encryption key.

In operation 2080, the wearable device 10 transmits the encryption key to the external device 30.

In operation 2090, the external device 30 stores the content. That is, the external device 30 stores the content that is executed by the program. The stored content may be non-encrypted content.

In operation 2095, the external device 30 encrypts the content by using the encryption key. For example, the external device 30 may encrypt the content by using the symmetric-key algorithm or the asymmetric-key algorithm. Also, the external device 30 may store encrypted content.

In operations 2090 through 2095, the external device 30 stores non-encrypted original content and then encrypts the original content. Afterward, the external device 30 may store the encrypted content. In other words, the non-encrypted original content and the encrypted content may be stored in the external device 30.

Although not illustrated in FIG. 20, the external device 30 may encrypt the content and then may store the encrypted content. In other words, operation 2090 and operation 2095 may be switched.

Hereinafter, an example in which the wearable device 10 generates an encryption key when the external device 30 executes a program is described in detail with reference to FIG. 21.

Figure 21:
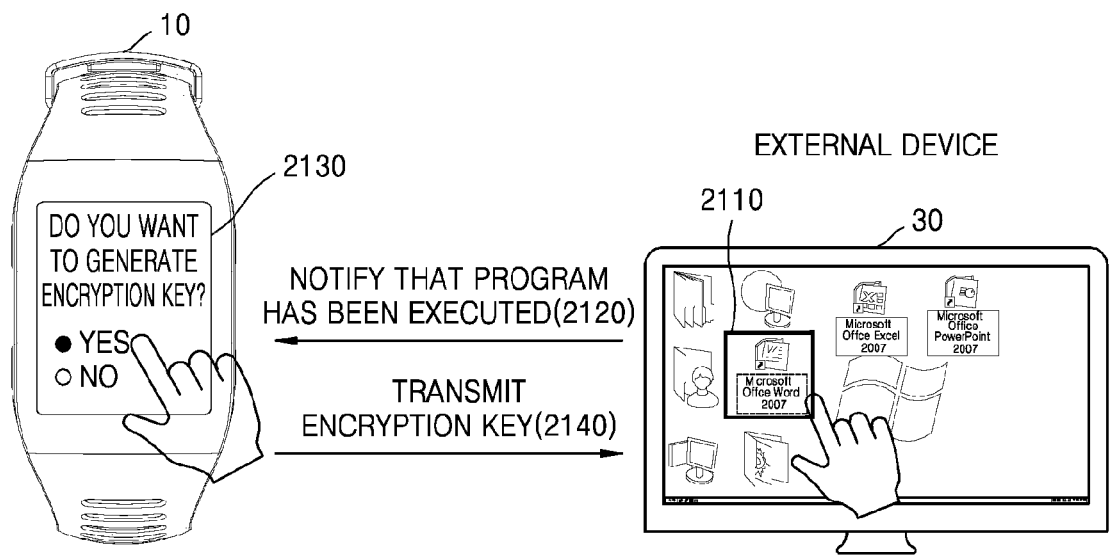
FIG. 21 illustrates an example in which the wearable device generates the encryption key when the external device executes a program, according to an exemplary embodiment.

FIG. 21 illustrates the example in which the wearable device 10 generates the encryption key when the external device 30 executes the program, according to an exemplary embodiment.

First, the external device 30 executes the program. For example, if content is a document file, the external device 30 may execute a document file executing program. According to an exemplary embodiment, the document file executing program may indicate, but is not limited to, MS-Office word, Google DOCS, or the like.

When the user 20 selects an object 2110 that is output to a screen of the external device 30, the program may be executed. According to an exemplary embodiment, the object 2110 may include an icon, a pop-up window, or the like.

When the program is executed, the external device 30 notifies the wearable device 10 that the program has been executed in operation 2120.

When the notification is received from the external device 30, the wearable device 10 may output a pop-up window 2130 so as to ask the user 20 whether to generate an encryption key. When the wearable device 10 receives, via the user input unit 5310, user input requesting to generate the encryption key, the wearable device 10 generates the encryption key. Then, the wearable device 10 transmits the generated encryption key to the external device 30 in operation 2140.

Alternatively, the wearable device 10 may not ask the user 20 whether to generate the encryption key. In other words, if the wearable device 10 receives the notification about the execution of the program from the external device 30, the wearable device 10 may immediately generate the encryption key and may transmit the generated encryption key to the external device 30.

Figure 22A:
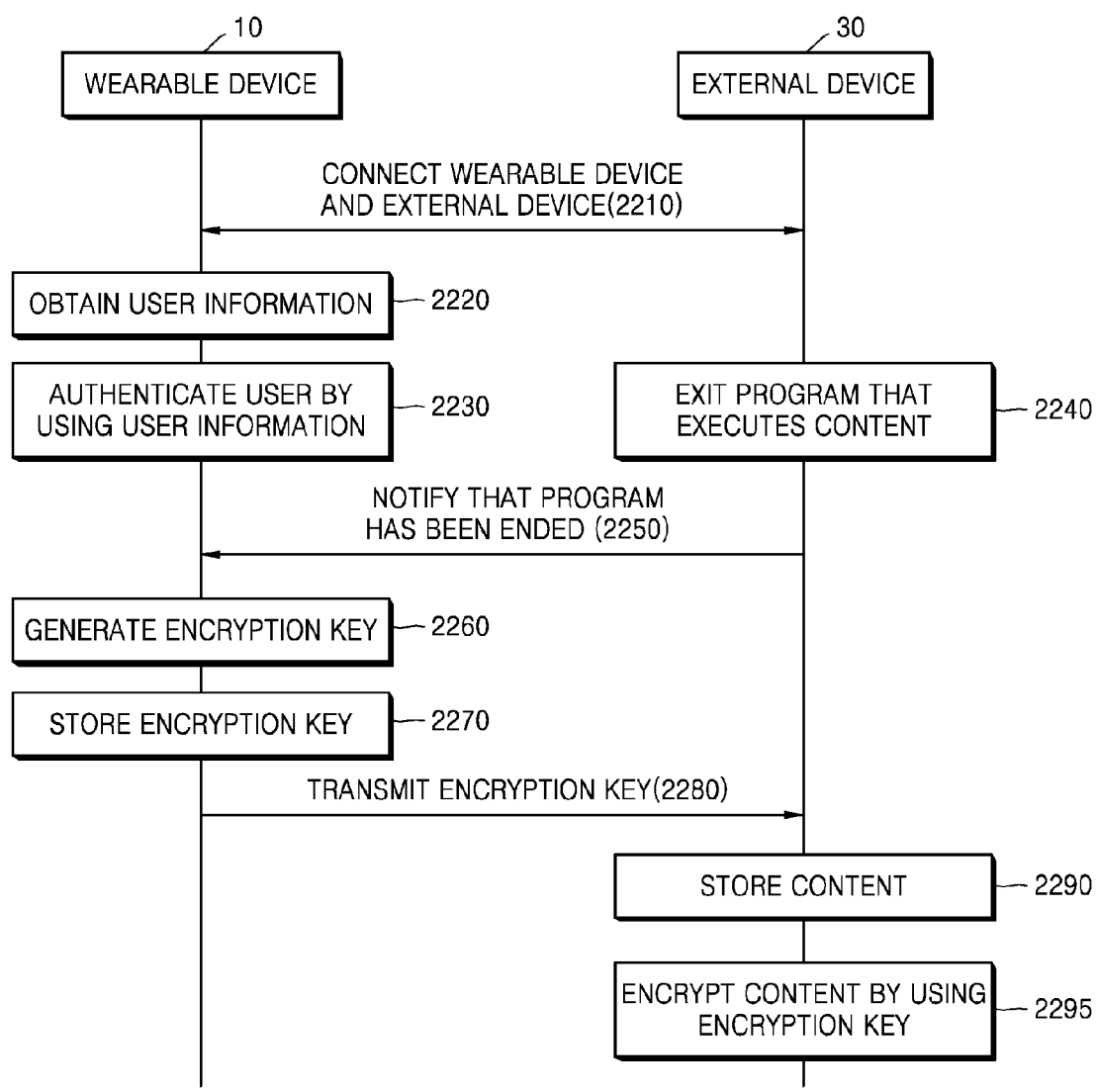
FIG. 22A is a flowchart illustrating an example in which the wearable device generates an encryption key and the external device encrypts content, according to another exemplary embodiment.

FIG. 22A is a flowchart illustrating an example in which the wearable device 10 generates an encryption key and the external device 30 encrypts content, according to another exemplary embodiment.

The exemplary embodiment of FIG. 22A includes operations that are processed in chronological order by the wearable device 10 and the external device 30 shown in FIG. 1. Thus, for descriptions that refer to operations of the wearable device 10 and the external device 30 shown in FIG. 1, the descriptions may also be applied to the flowchart of FIG. 22A.

Comparing the flowchart of FIG. 22A with the flowchart of FIG. 4, a time for the wearable device 10 to generate the encryption key varies. In other words, in the flowchart of FIG. 22A, the wearable device 10 generates the encryption key after the external device 30 executes a program. According to an exemplary embodiment, the program refers to a program that is used by the external device 30 so as to execute the content.

In operation 2210, the wearable device 10 and the external device 30 are connected to each other. According to an exemplary embodiment, the connection indicates that a data exchange is possible therebetween. For example, the wearable device 10 and the external device 30 may be connected to each other by using a wireless or wired communication method, and examples of the wireless and wired communication methods are described above with reference to FIG. 1.

In operation 2220, the wearable device 10 obtains user information. For example, the user information may be biological information of the user 20 or account information of the user 20.

In operation 2230, the wearable device 10 authenticates the user 20 by using the user information. For example, the wearable device 10 may authenticate the user 20 by determining whether the obtained user information matches with pre-stored user information.

The wearable device 10 may authenticate the user 20 just before the wearable device 10 generates the encryption key, or may authenticate the user 20 regardless of generation of the encryption key. That is, while the wearable device 10 generates the encryption key according to a result of the user authentication, if the encryption key has still not been generated, there is no time limit for the wearable device 10 to perform the user authentication.

In operation 2240, the external device 30 exits the program that executes the content. A time for the external device 30 to exit the program is not dependent on a time for the wearable device 10 to authenticate the user 20. In other words, the external device 30 may exit the program after the wearable device 10 authenticates the user 20, or the wearable device 10 may authenticate the user 20 after the external device 30 exits the program. Also, the external device 30 may execute the program anytime before the external device 30 exits the program.

In operation 2250, the external device 30 notifies the wearable device 10 that the program has been ended.

In operation 2260, the wearable device 10 generates the encryption key for encryption of the content. For example, the wearable device 10 may generate an encryption key used in a symmetric-key algorithm or may generate an encryption key used in an asymmetric-key algorithm. Referring to FIG. 22A, when the wearable device 10 receives notification about the ended program from the external device 30, the wearable device 10 automatically generates the encryption key without receiving input from the user 20, but one or more exemplary embodiments are not limited thereto. That is, the wearable device 10 may generate the encryption key according to selection of the user 20. According to an exemplary embodiment, the selection of the user 20 refers to the user 20 selecting whether to encrypt the content (e.g., whether to generate the encryption key).

In operation 2270, the wearable device 10 stores the encryption key. The wearable device 10 may not separately store but may immediately delete the generated encryption key.

In operation 2280, the wearable device 10 transmits the encryption key to the external device 30.

In operation 2290, the external device 30 stores the content. That is, the external device 30 stores the content that is executed by the program. The stored content may be non-encrypted content.

In operation 2295, the external device 30 encrypts the content by using the encryption key. For example, the external device 30 may encrypt the content by using the symmetric-key algorithm or the asymmetric-key algorithm. Also, the external device 30 may store encrypted content.

In operations 2290 through 2295, the external device 30 stores non-encrypted original content and then encrypts the original content. Afterward, the external device 30 may store the encrypted content. In other words, the non-encrypted original content and the encrypted content may be stored in the external device 30.

The external device 30 may encrypt the content and then may store the encrypted content. In other words, operation 2290 and operation 2295 may be switched.

Hereinafter, an example in which the wearable device 10 generates an encryption key when the external device 30 exits a program is described in detail with reference to FIG. 22B.

Figure 22B:
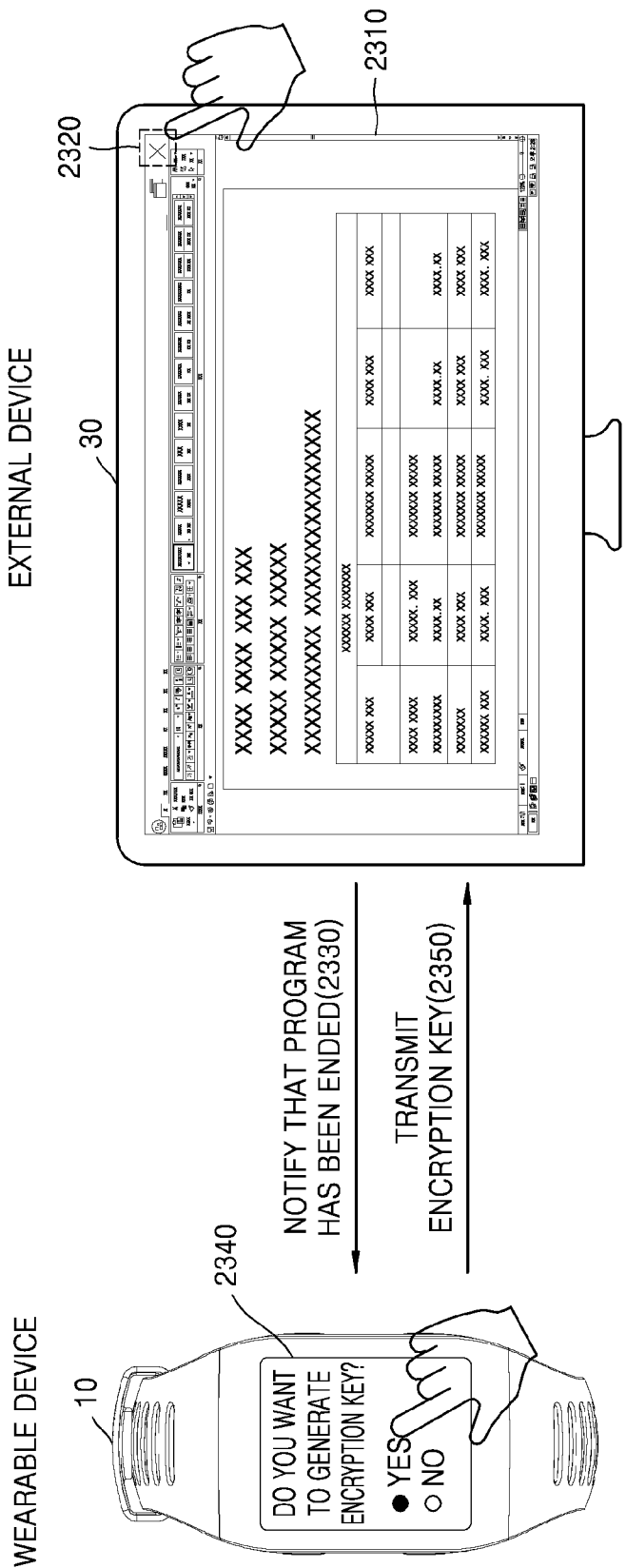
FIG. 22B illustrates an example in which the wearable device generates the encryption key when the external device exits the program, according to an exemplary embodiment.

FIG. 22B illustrates the example in which the wearable device 10 generates the encryption key when the external device 30 exits the program, according to an exemplary embodiment.

First, the external device 30 exits the program. For example, if content is a document file, the external device 30 may exit a document file executing program. According to an exemplary embodiment, the document file executing program may indicate, but is not limited to, MS-Office word, Google DOCS, or the like.

When the user 20 selects an object 2320 that is displayed on an execution screen 2310 of the program, the program may be ended. According to an exemplary embodiment, the object 2320 may include an icon, a pop-up window, or the like.

When the program is ended, the external device 30 notifies the wearable device 10 that the program has been ended in operation 2330.

When the notification is received from the external device 30, the wearable device 10 may output a pop-up window 2340 so as to ask the user 20 whether to generate an encryption key. When the wearable device 10 receives, via the user input unit 5310, user input requesting to generate the encryption key, the wearable device 10 generates the encryption key. Then, the wearable device 10 transmits the generated encryption key to the external device 30 in operation 2350.

Alternatively, the wearable device 10 may not ask the user 20 whether to generate the encryption key. In other words, if the wearable device 10 receives the notification about the end of the program from the external device 30, the wearable device 10 may immediately generate the encryption key and may transmit the generated encryption key to the external device 30.

Figure 23A:
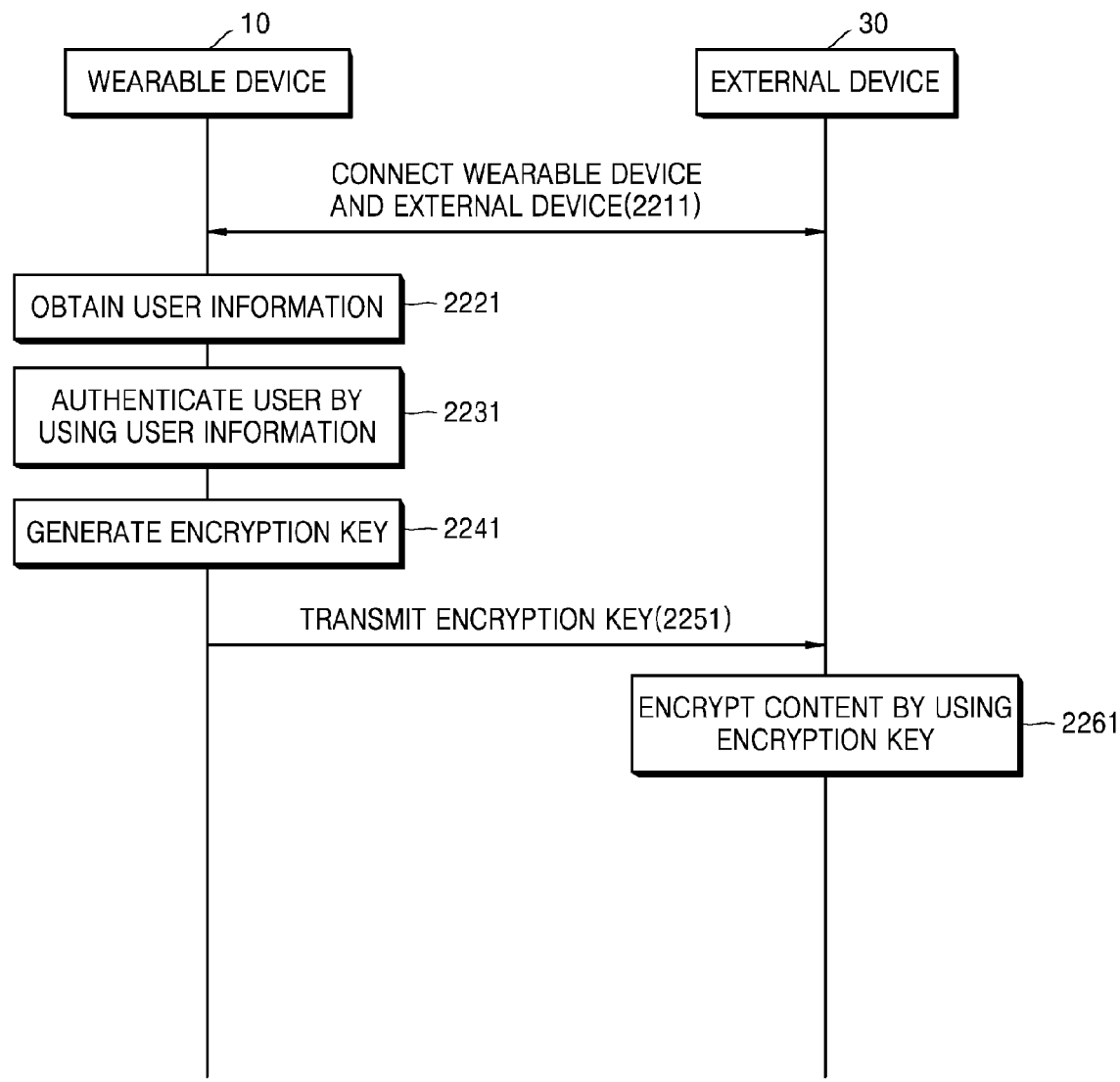
FIG. 23A is a flowchart illustrating an example in which the wearable device generates an encryption key and the external device encrypts content, according to another exemplary embodiment.

FIG. 23A is a flowchart illustrating an example in which the wearable device 10 generates an encryption key and the external device 30 encrypts content, according to another exemplary embodiment.

The exemplary embodiment of FIG. 23A includes operations that are processed in chronological order by the wearable device 10 and the external device 30 shown in FIG. 1. Thus, for descriptions that refer to operations of the wearable device 10 and the external device 30 shown in FIG. 1, the descriptions may also be applied to the flowchart of FIG. 23A.

In operation 2211, the wearable device 10 and the external device 30 are connected to each other. An example of the connection between the wearable device 10 and the external device 30 is described above with reference to operation 2210 shown in FIG. 22A.

In operation 2221, the wearable device 10 obtains user information. For example, the user information may be biological information of the user 20 or account information of the user 20.

In operation 2231, the wearable device 10 authenticates the user 20 by using the user information. An example in which the wearable device 10 authenticates the user 20 is described above with reference to operation 2230 in FIG. 22A.

In operation 2241, the wearable device 10 generates the encryption key for encryption of the content. An example in which the wearable device 10 generates the encryption key is described above with reference to operation 2260 in FIG. 22A.

In operation 2251, the wearable device 10 transmits the encryption key to the external device 30.

In operation 2261, the external device 30 encrypts the content by using the encryption key. In other words, the external device 30 may encrypt, by using the pre-transmitted encryption key, the content that is generated, is executed, is stored, or to be transmitted to another external apparatus after the encryption key is received. Hereinafter, an example in which the external device 30 encrypts content is described with reference to FIG. 23B.

Figure 23B:
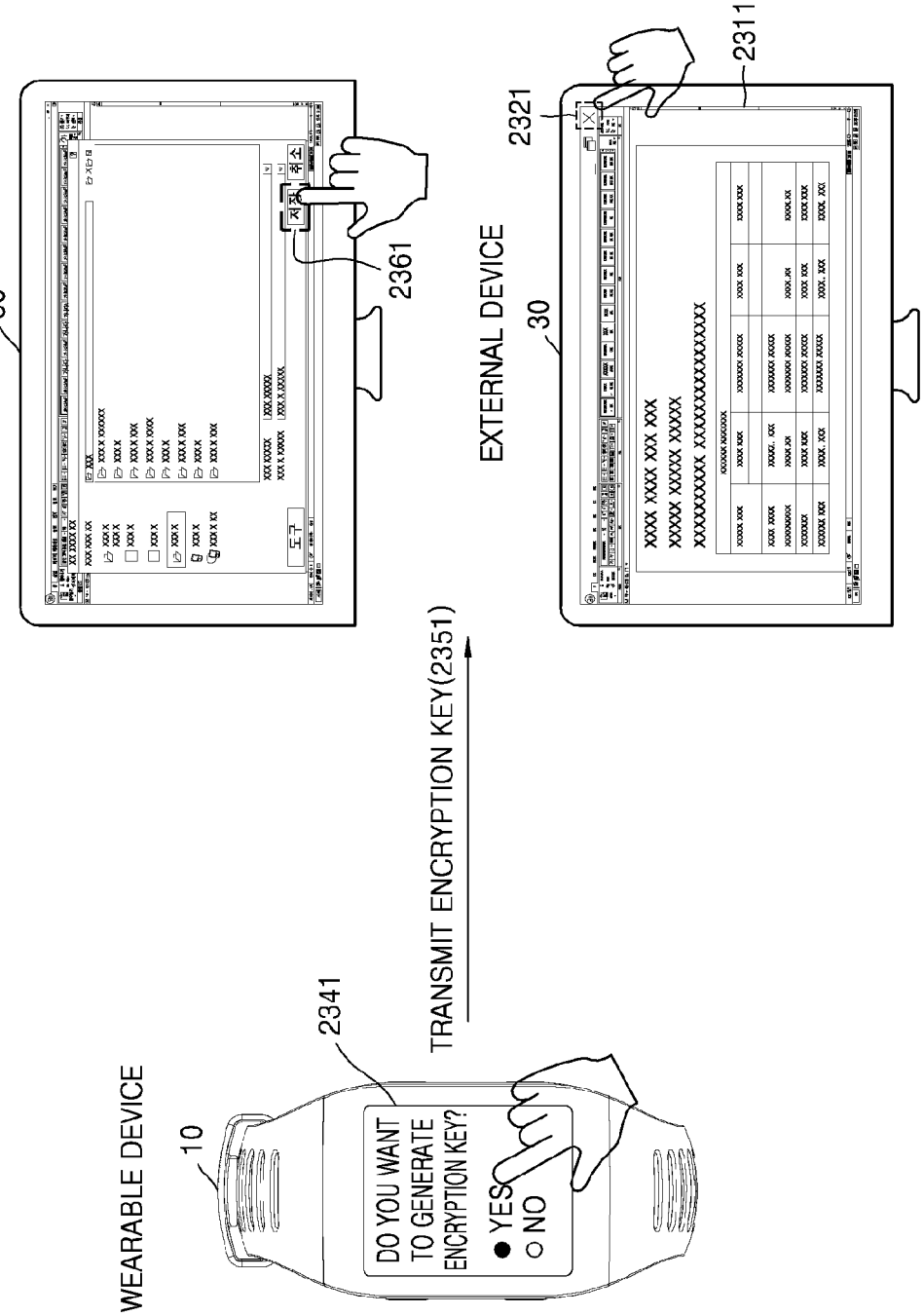
FIG. 23B illustrates an example in which the external device encrypts content by using a pre-received encryption key, according to an exemplary embodiment.

FIG. 23B illustrates an example in which the external device 30 encrypts content by using a pre-received encryption key, according to an exemplary embodiment.

Referring to FIG. 23B, after user authentication is completed, the wearable device 10 may output a pop-up window 2341 so as to ask the user 20 whether to generate an encryption key. When the wearable device 10 receives, via the user input unit 5310, user input requesting to generate the encryption key, the wearable device 10 generates an encryption key. Then, the wearable device 10 transmits the encryption key to the external device 30 in operation 2351.

Alternatively, the wearable device 10 may not ask the user 20 whether to generate the encryption key. In other words, if the wearable device 10 receives a notification about end of a program from the external device 30, the wearable device 10 may immediately generate the encryption key and may transmit the generated encryption key to the external device 30.

The external device 30 may store the encryption key that is received from the wearable device 10, and may use the stored encryption key in encrypting content that is generated, executed, stored, or to be transmitted to another external apparatus after the encryption key is stored.

For example, when the external device 30 stores the content that is generated or is executed after the encryption key was transmitted to the external device 30 in operation 2361, the external device 30 may encrypt the content by using the encryption key that was received from the wearable device 10. According to an exemplary embodiment, the execution of the content includes reading or changing the content. As another example, when the external device 30 exits a program that is executed after the encryption key was transmitted to the external device 30 in operation 2321, the external device 30 may encrypt the content by using the encryption key that was received from the wearable device 10.

When the external device 30 transmits the content to another external apparatus after the encryption key was transmitted to the external device 30, the external device 30 may encrypt the content by using the encryption key that was received from the wearable device 10.

In another exemplary embodiment, when a program is executed in the external device 30 and the wearable device 10 receives a notification about the execution of the program, the wearable device 10 may generate an encryption key for encryption of content that is executed in the program. Afterward, when the external device 30 exits the program and transmits a notification about the end of the program to the wearable device 10, the wearable device 10 may transmit the generated encryption key to the external device 30. By doing so, the content that is executed in the program of the external device 30 may be encrypted.

In another exemplary embodiment, an encryption key may be generated by the wearable device 10 at a random point of time. In a case where the encryption key was already generated by the wearable device 10, if the wearable device 10 receives, from the external device 30, a pre-notification related to storage of content that is generated or is edited by the external device 30, the wearable device 10 may transmit the encryption key to the external device 30. Then, the external device 30 may encrypt the content by using the received encryption key and may store the encrypted content. Alternatively, in a case where the encryption key was already generated by the wearable device 10, if the wearable device 10 receives, from the external device 30, a pre-notification related to transmission of content to the cloud server, the wearable device 10 may transmit the encryption key to the external device 30. Then, the external device 30 may encrypt the content by using the received encryption key and may transmit the encrypted content to the cloud server.

Figure 24:
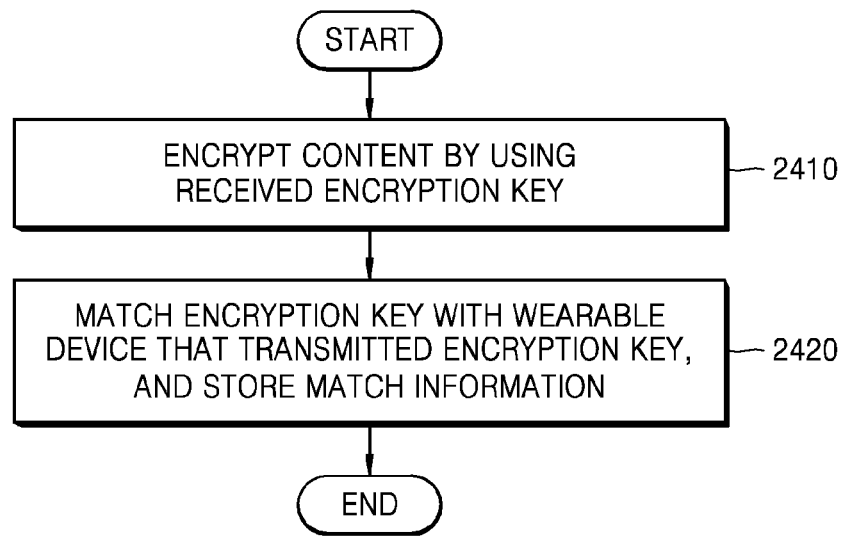
FIG. 24 is a flowchart illustrating an example in which the external device encrypts content, according to an exemplary embodiment.
Figure 25:
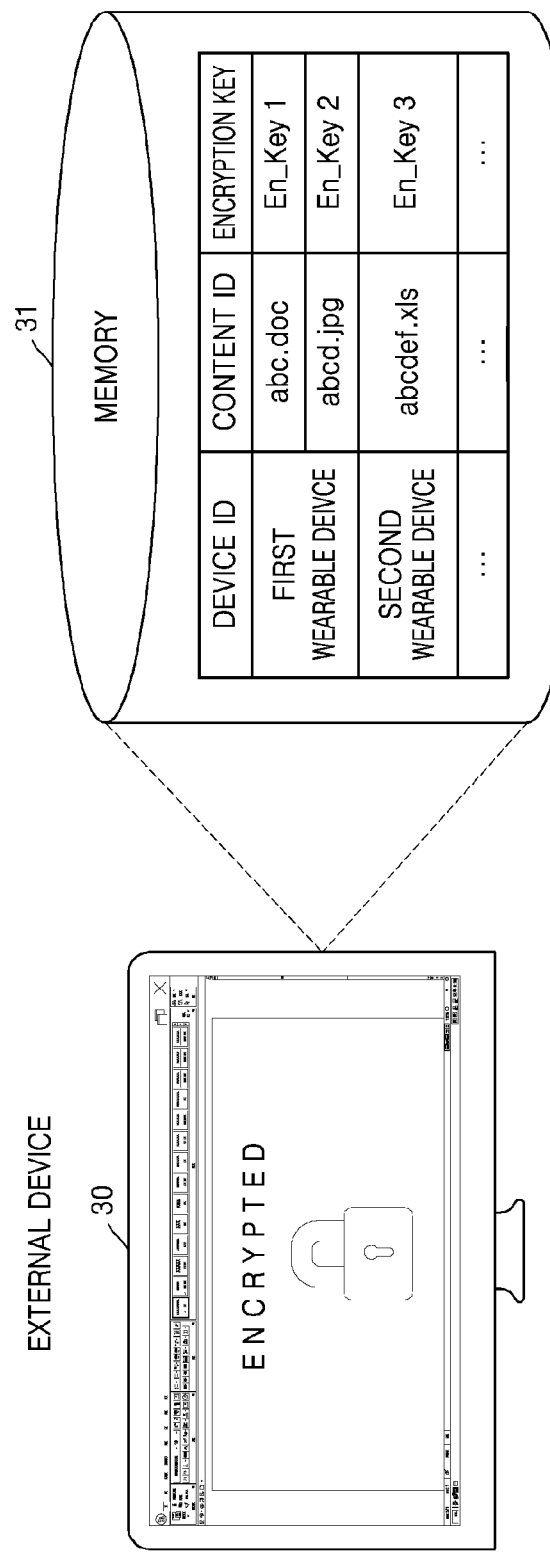
FIG. 25 illustrates an example in which the external device matches an encryption key with the wearable device, and stores match information, according to an exemplary embodiment.
Figure 26:
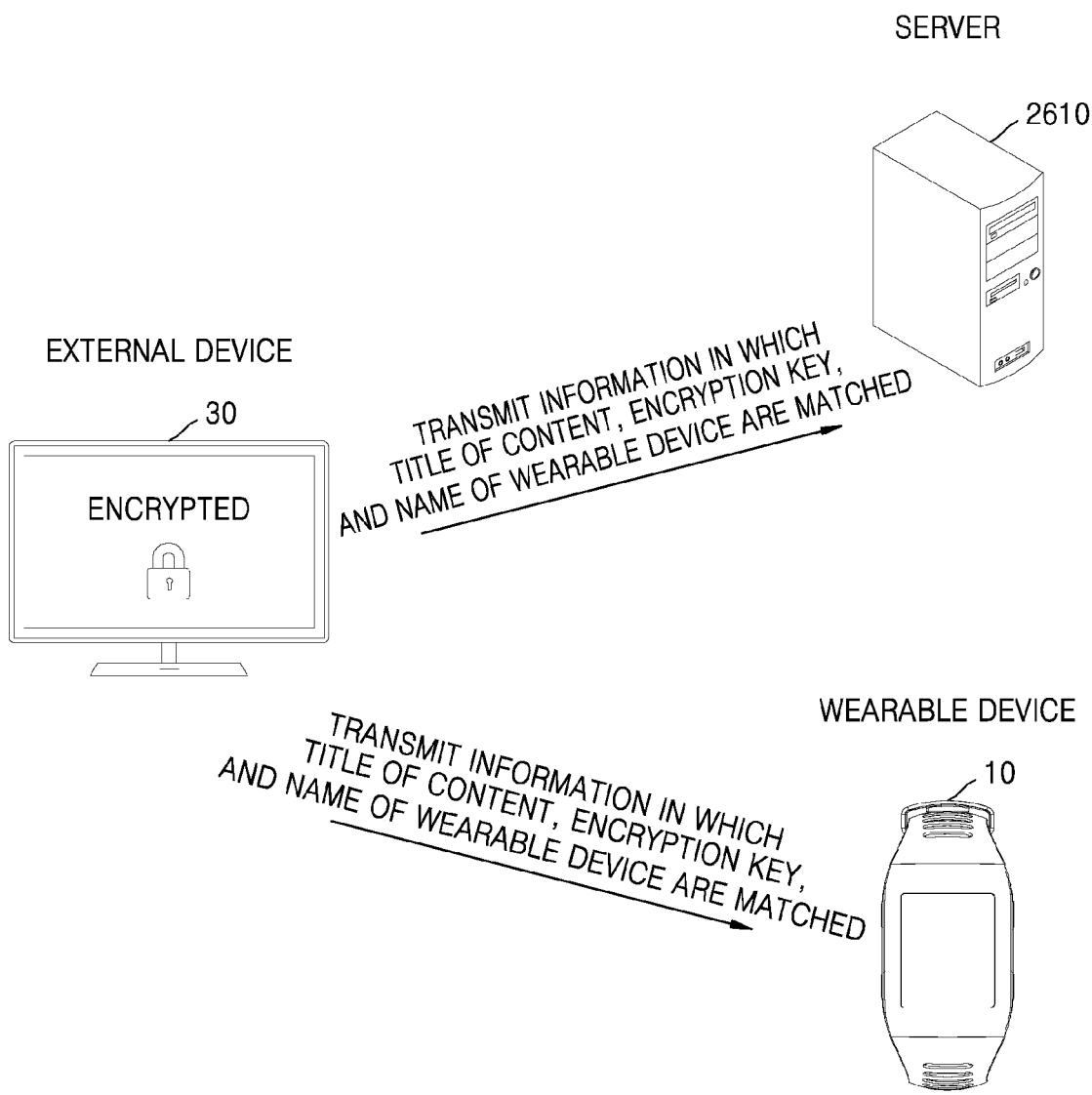
FIG. 26 illustrates an example in which the external device transmits match information to a server or the wearable device, according to an exemplary embodiment.

Hereinafter, FIGS. 24 through 26 illustrate examples in which the external device 30 encrypts content, wherein the examples are described with reference to operation 490 of FIG. 4, operation 2095 of FIG. 20, operation 2295 of FIG. 22A, and operation 2261 of FIG. 23A.

FIG. 24 is a flowchart illustrating an example in which the external device 30 encrypts content, according to an exemplary embodiment.

The exemplary embodiment of FIG. 24 includes operations that are processed in chronological order by the external device 30 shown in FIG. 1. Thus, for descriptions that refer to the external device 30 shown in FIG. 1, the descriptions may also be applied to the flowchart of FIG. 24.

In operation 2410, the external device 30 encrypts content by using a received encryption key. For example, the external device 30 may encrypt the content by using a symmetric-key algorithm or an asymmetric-key algorithm.

The symmetric-key algorithm is an algorithm that performs encryption and decryption by using the same cryptographic keys. Thus, the external device 30 may encrypt the content and may decrypt encrypted content, by using the encryption key received from the wearable device 10.

The asymmetric-key algorithm is an algorithm that performs encryption and decryption by using encryption and decryption keys that are different from each other. Thus, the external device 30 may encrypt the content by using the encryption key received from the wearable device 10, and may decrypt the encrypted content only after the external device 30 receives a separate decryption key from the wearable device 10.

Details of the symmetric-key algorithm and the asymmetric-key algorithm are well known to one of ordinary skill in the art, and thus, detailed descriptions thereof are omitted hereinafter.

In operation 2420, the external device 30 matches the encryption key with the wearable device 10 that transmitted the encryption key, and stores match information. Hereinafter, an example in which the external device 30 matches an encryption key with the wearable device 10, and stores match information, is described with reference to FIG. 25.

FIG. 25 illustrates an example in which the external device 30 matches an encryption key with the wearable device 10, and stores match information, according to an exemplary embodiment.

FIG. 25 illustrates the external device 30 and an example of the memory 5370 included in the external device 30.

The external device 30 may encrypt content, may match an encryption key with a name of the wearable device 10, and may store the encryption key and the name. For example, if it is assumed that the external device 30 received an encryption key 'En_Key 1' from a first wearable device, and encrypted content 'abc.doc' by using the encryption key 'En_Key 1', the external device 30 may match the first wearable device with the encryption key 'En_Key 1' and the content 'abc.doc' and may store this information in a memory 31. Thus, even if the external device 30 receives encryption keys from different wearable devices, respectively, or receives encryption keys from one wearable device, the external device 30 may recognize which content was encrypted by using the encryption key received from a wearable device.

The external device 30 may transmit information to a server or a wearable device that transmitted an encryption key, wherein the information (e.g., the information in which a name of the wearable device, a title of content, and the encryption key are matched therein) is stored in the memory 31.

FIG. 26 illustrates an example in which the external device 30 transmits match information to a server 2610 or the wearable device 10, according to an exemplary embodiment.

Referring to FIG. 26, the external device 30 may transmit, to the server 2610 or the wearable device 10, information in which a title of content, an encryption key, and a name of the wearable device 10 are matched. According to an exemplary embodiment, the wearable device 10 that receives the information from the external device 30 is a subject that transmitted the encryption key to the external device 30.

The external device 30 may transmit the match information to the server 2610, and the server 2610 may transmit back the match information to the external device 30 according to a request from the external device 30.

Figure 27:
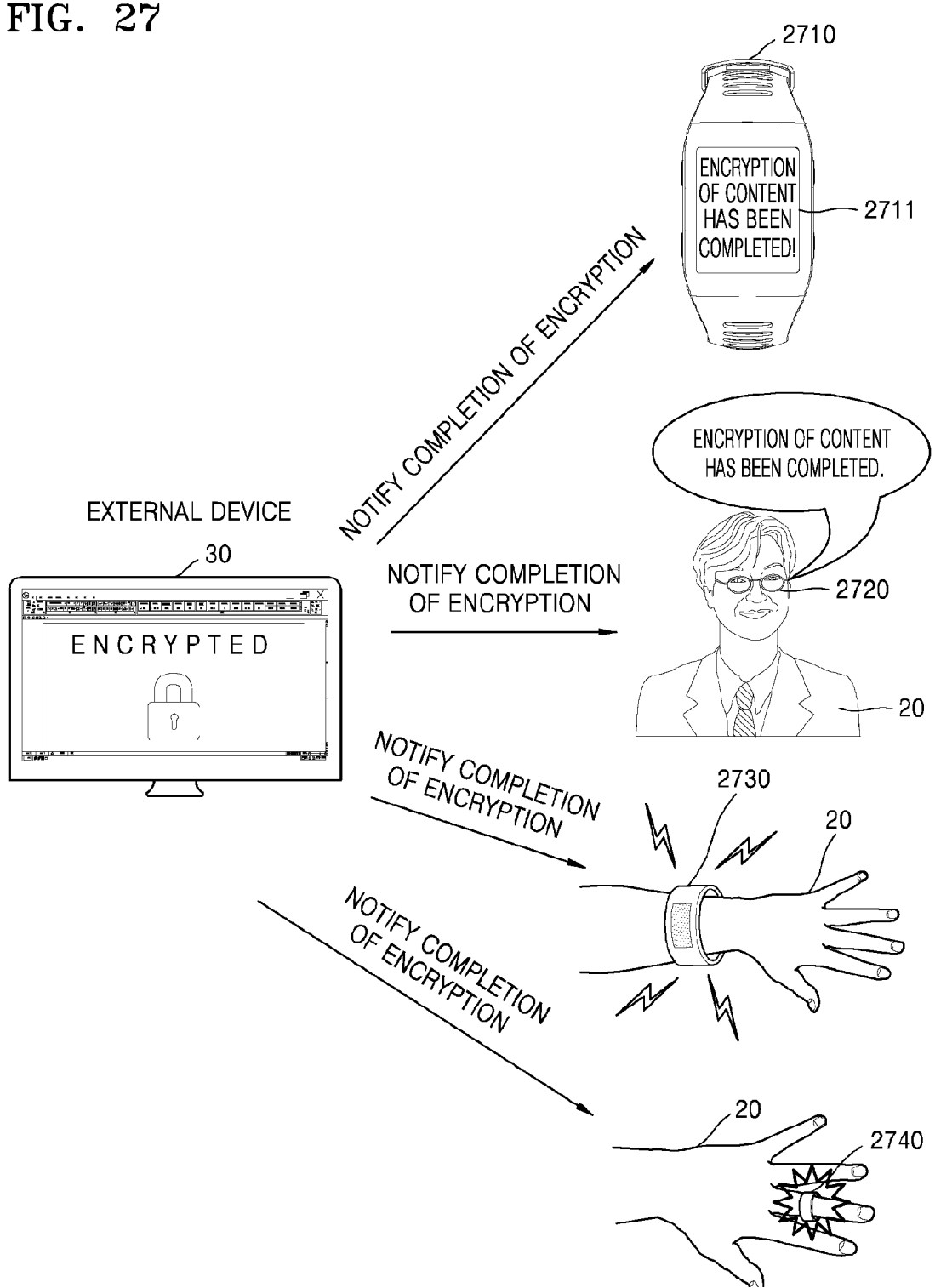
FIG. 27 illustrates an example in which a wearable device outputs an alarm when the external device has completed encryption of content, according to an exemplary embodiment.

FIG. 27 illustrates an example in which a wearable device outputs an alarm when the external device 30 has completed encryption of content, according to an exemplary embodiment.

FIG. 27 illustrates different cases in which alarms are output according to types of the wearable device. FIG. 27 illustrates a watch 2710, glasses 2720, a wristband 2730, and a ring 2740 as the types of the wearable device, but the types of the wearable device are not limited thereto. In other words, any type of wearable device that is attachable to a body of the user 20 may be used. Also, referring to FIG. 27, each of the wearable devices outputs one type of an alarm, but one or more exemplary embodiments are not limited thereto. That is, one wearable device may output various types of alarm.

When the external device 30 has completed encryption of the content, the external device 30 may notify the wearable devices 2710, 2720, 2730, and 2740 that the encryption of the content has been completed. Then, the wearable devices 2710, 2720, 2730, and 2740 output alarms, so that the user 20 may be notified that the encryption of the content has been completed.

For example, the wearable device 2710 may output, on a screen of the wearable device 2710, a pop-up window 2711 indicating that the encryption of the content has been completed. As another example, the wearable device 2720 may output, via a speaker of the wearable device 2720, audio indicating that the encryption of the content has been completed. As another example, the wearable device 2730 may generate a vibration by using a vibration motor, and thus, may notify the user 20 that the encryption of the content has been completed. As another example, the wearable device 2740 may emit light, and thus, may notify the user 20 that the encryption of the content has been completed.

As described above with reference to FIG. 1, the wearable device 10 may generate not only an encryption key but also may generate a decryption key. According to an exemplary embodiment, the decryption key is used in decryption of content that was encrypted by using the encryption key generated by the wearable device 10.

Hereinafter, examples in which the wearable device 10 generates a decryption key and the external device 30 decrypts content are described with reference to FIGS. 28 through 40.

Figure 28:
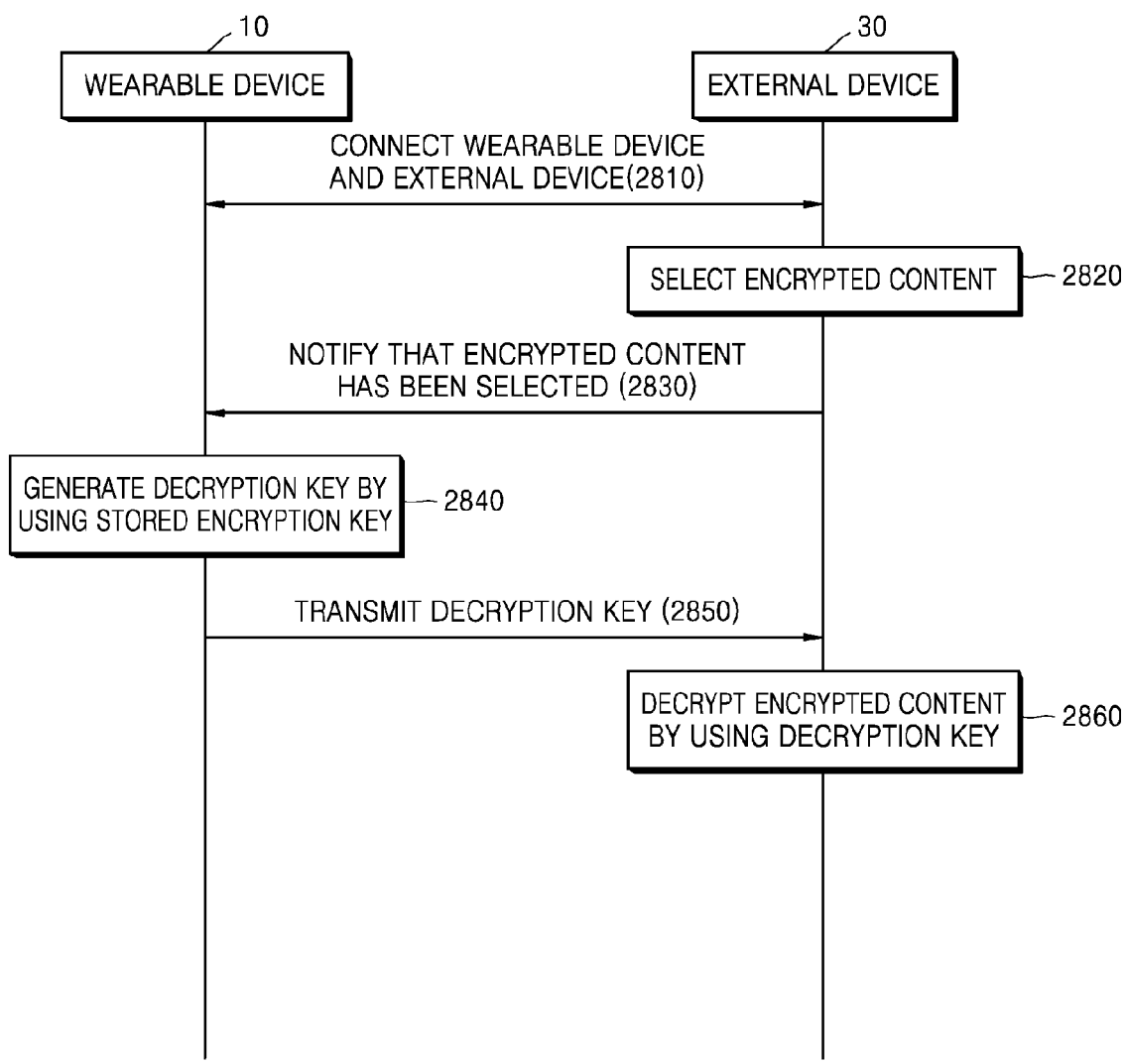
FIG. 28 is a flowchart illustrating an example in which the wearable device generates a decryption key and the external device decrypts content, according to an exemplary embodiment.

FIG. 28 is a flowchart illustrating an example in which the wearable device 10 generates a decryption key and the external device 30 decrypts content, according to an exemplary embodiment.

The exemplary embodiment of FIG. 28 includes operations that are processed in chronological order by the wearable device 10 and the external device 30 shown in FIG. 1. Thus, for descriptions that refer to operations of the wearable device 10 and the external device 30 shown in FIG. 1, the descriptions may also be applied to the flowchart of FIG. 28.

In operation 2810, the wearable device 10 and the external device 30 are connected to each other. According to an exemplary embodiment, the connection refers to a connection by which data exchange is possible therebetween. For example, the wearable device 10 and the external device 30 may be connected to each other by using a wireless or wired communication method, and examples of the wireless and wired communication methods are described above with reference to FIG. 1.

If a plurality of devices are connectable to the wearable device 10, the wearable device 10 may select one of the plurality of devices and may maintain a connection with the selected device. Examples in which the wearable device 10 and the external device 30 are connected to each other are described above with reference to FIGS. 4 through 7.

In operation 2820, the external device 30 selects encrypted content. In other words, the external device 30 selects an encryption target content from among a plurality of encrypted content stored in the external device 30. For example, the external device 30 may receive user input requesting to execute the encrypted content, and may select the encrypted content according to the user input.

In operation 2830, the external device 30 notifies the wearable device 10 that the encrypted content has been selected.

In operation 2840, the wearable device 10 generates a decryption key by using a stored encryption key. For example, the wearable device 10 may generate an encryption key and may store the generated encryption key in the memory 5370. As another example, when the wearable device 10 receives the notification described in operation 2830, the wearable device 10 may also receive an encryption key from the external device 30.

In operation 2850, the wearable device 10 transmits the decryption key to the external device 30.

In operation 2860, the external device 30 decrypts the encrypted content by using the decryption key.

Referring to FIG. 28, the external device 30 decrypts the encrypted content by using the decryption key that is received from the wearable device 10, but the external device 30 may decrypt the encrypted content by using an encryption key that was previously transmitted from the wearable device 10 to the external device 30. For example, when the external device 30 decrypts content by using a symmetric-key algorithm, the external device 30 may decrypt the content by using an encryption key that was previously received from the wearable device 10. In this case, the wearable device 10 may not transmit a decryption key to the external device 30 but may transmit, to the external device 30, a signal so as to allow decryption of the content.

Hereinafter, the flowchart of FIG. 28 is described in detail with reference to FIGS. 29 and 30.

Figure 29:
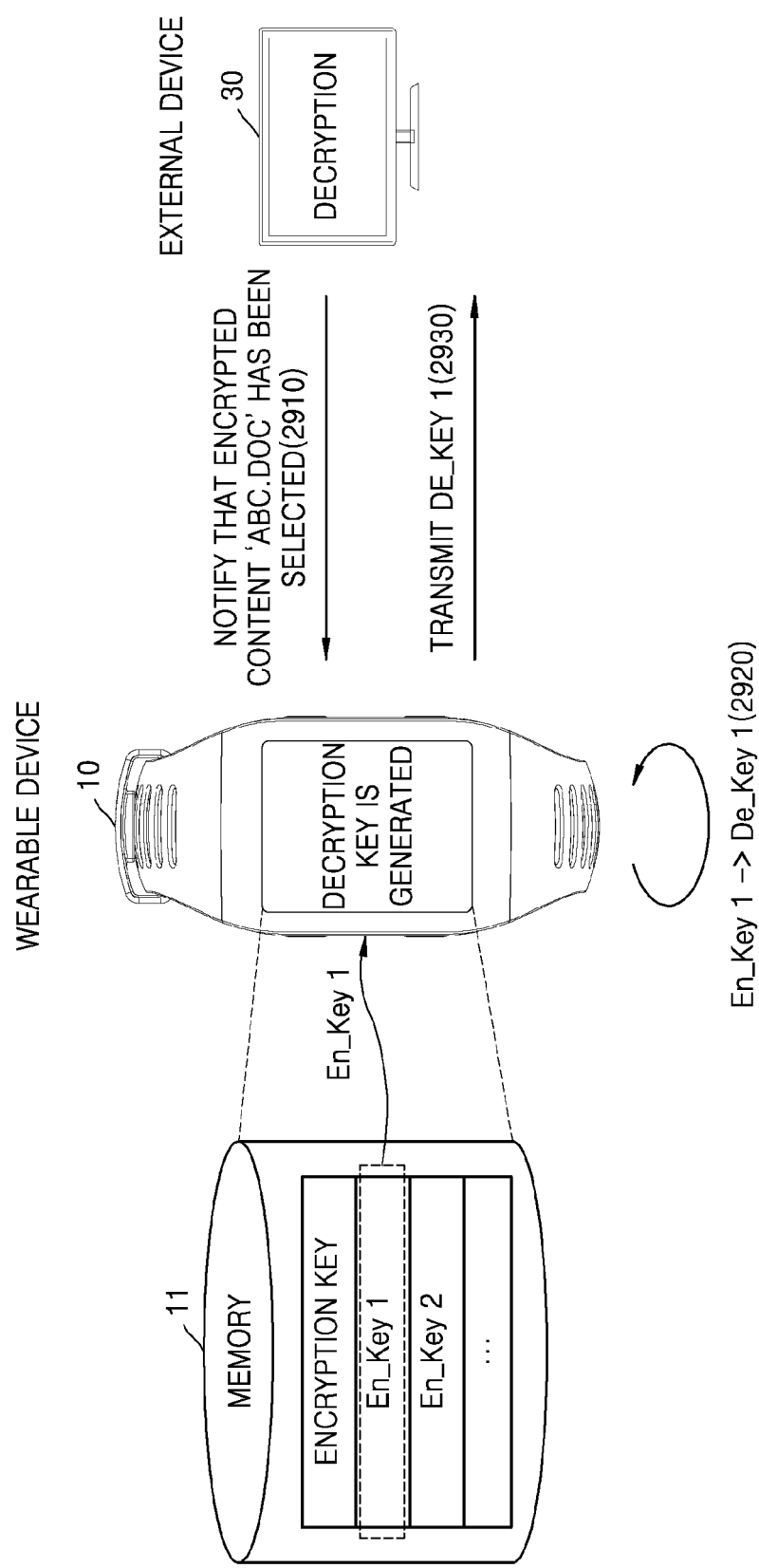
FIGS. 29 and 30 illustrate examples in which the wearable device generates a decryption key and transmits the decryption key to the external device, according to exemplary embodiments.
Figure 30:
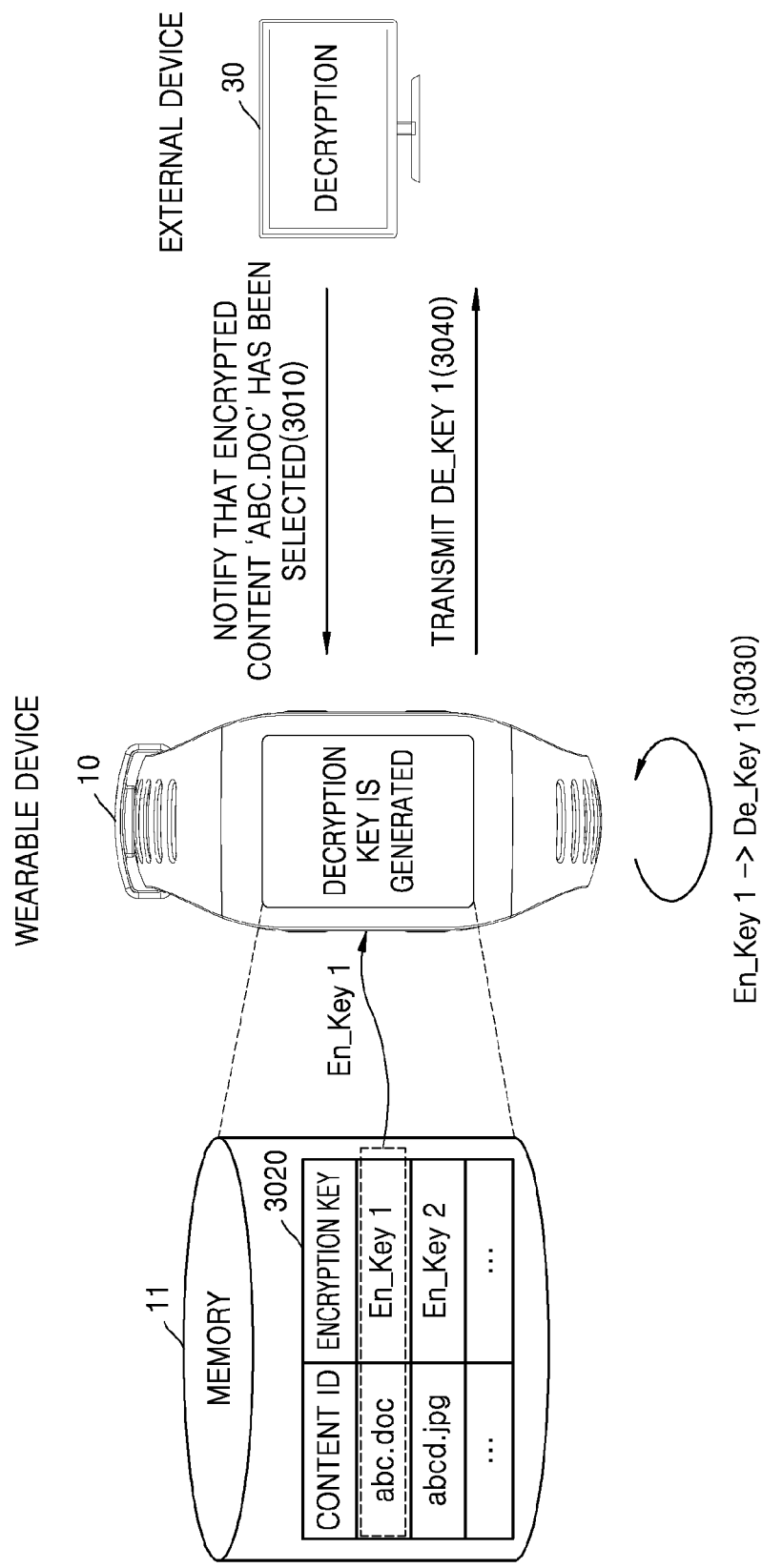

FIGS. 29 and 30 illustrate examples in which the wearable device 10 generates a decryption key and transmits the decryption key to the external device 30, according to exemplary embodiments.

Referring to FIG. 29, first, the external device 30 notifies the wearable device 10 that encrypted content has been selected. For example, when the user 20 requests the external device 30 to execute content 'abc.doc' that is encrypted content, the external device 30 notifies the wearable device 10 that the encrypted content 'abc.doc' has been selected in operation 2910. According to an exemplary embodiment, execution of content refers to when the user 20 executes the content so as to read, to edit, or to delete the content.

When the notification is received from the external device 30, the wearable device 10 reads an encryption key En_Key 1 stored in the memory 11. In this example, the read encryption key En_Key 1 refers to an encryption key that was used so as to encrypt the content 'abc.doc'.

The wearable device 10 generates a decryption key De_Key 1 by using the read encryption key En_Key 1 in operation 2920. A method performed by the wearable device 10 to generate the decryption key De_Key 1 is well known to one of ordinary skill in the art, thus, detailed descriptions thereof are omitted hereinafter.

The wearable device 10 transmits the decryption key De_Key 1 to the external device 30 in operation 2930. The external device 30 decrypts the encrypted content 'abc.doc' by using the decryption key De_Key 1, and executes decrypted content 'abc.doc'.

If the user 20 does not wear the wearable device 10, the wearable device 10 may use a preset password (e.g., the password that was used in the user authentication). For example, based on a user input of inputting the preset password, the wearable device 10 may obtain a decryption key stored in the memory 5370, and may decrypt content by using the obtained decryption key.

Referring to FIG. 30, as described above with reference to FIG. 29, the external device 30 notifies the wearable device 10 that the encrypted content has been selected in operation 3010, and the wearable device 10 generates the decryption key De_Key 1 by using the encryption key En_Key 1 read from the memory 11 in operation 3030. Then, the wearable device 10 transmits the decryption key De_Key 1 to the external device 30 in operation 3040, and the external device 30 decrypts the encrypted content by using the decryption key De_Key 1.

However, the wearable device 10 shown in FIG. 30 may match a title of content with an encryption key and may store the matched information in the memory 11. For example, when it is assumed that the encryption key En_Key 1 was used in encrypting the content 'abc.doc', the wearable device 10 may match the encryption key En_Key 1 with the content 'abc.doc' and may store the matched information. Therefore, the wearable device 10 may easily recognize content to be decrypted, and an encryption key that was used in encrypting the content.

Figure 31:
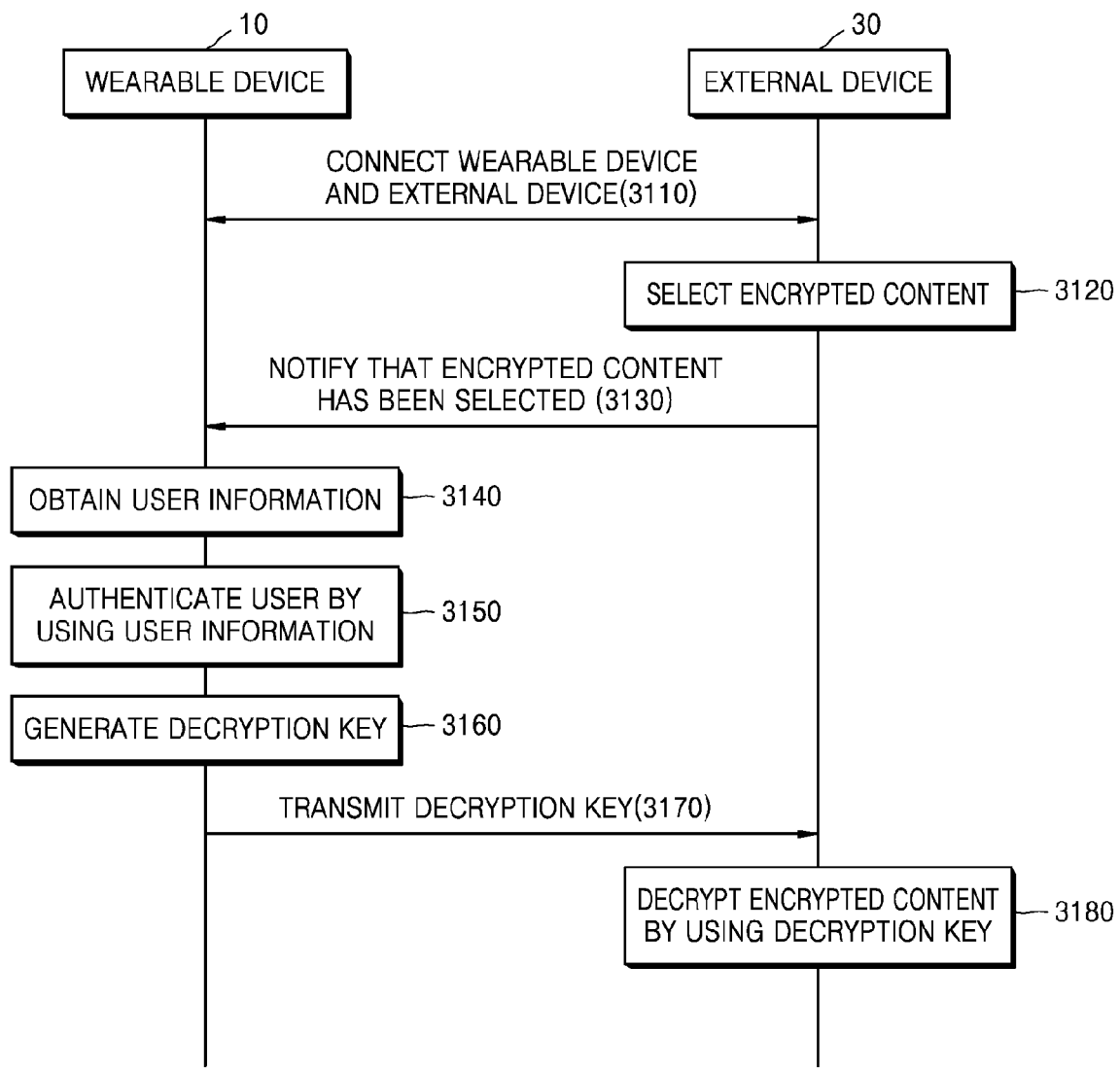
FIG. 31 is a flowchart illustrating an example in which the wearable device generates a decryption key and transmits the decryption key to the external device, according to another exemplary embodiment.

FIG. 31 is a flowchart illustrating an example in which the wearable device 10 generates a decryption key and transmits the decryption key to the external device 30, according to another exemplary embodiment.

The exemplary embodiment of FIG. 31 includes operations that are processed in chronological order by the wearable device 10 and the external device 30 shown in FIG. 1. Thus, for descriptions that refer to operations of the wearable device 10 and the external device 30 shown in FIG. 1, the descriptions may also be applied to the flowchart of FIG. 31.

Operations 3110 through 3130, and 3160 through 3180 in FIG. 31 are the same as operations 2810 through 2860 in FIG. 28, and thus, detailed descriptions thereof are omitted here.

In operation 3140, the wearable device 10 obtains user information. Then, in operation 3150, the wearable device 10 authenticates the user 20 by using the user information.

For example, the user information may be biological information of the user 20 or account information of the user 20. Alternatively, the wearable device 10 may authenticate the user 20 by determining whether the obtained user information matches with pre-stored user information.

Hereinafter, examples in which the wearable device 10 obtains user information and authenticates a user are described with reference to FIGS. 32 through 37.

Figure 32:
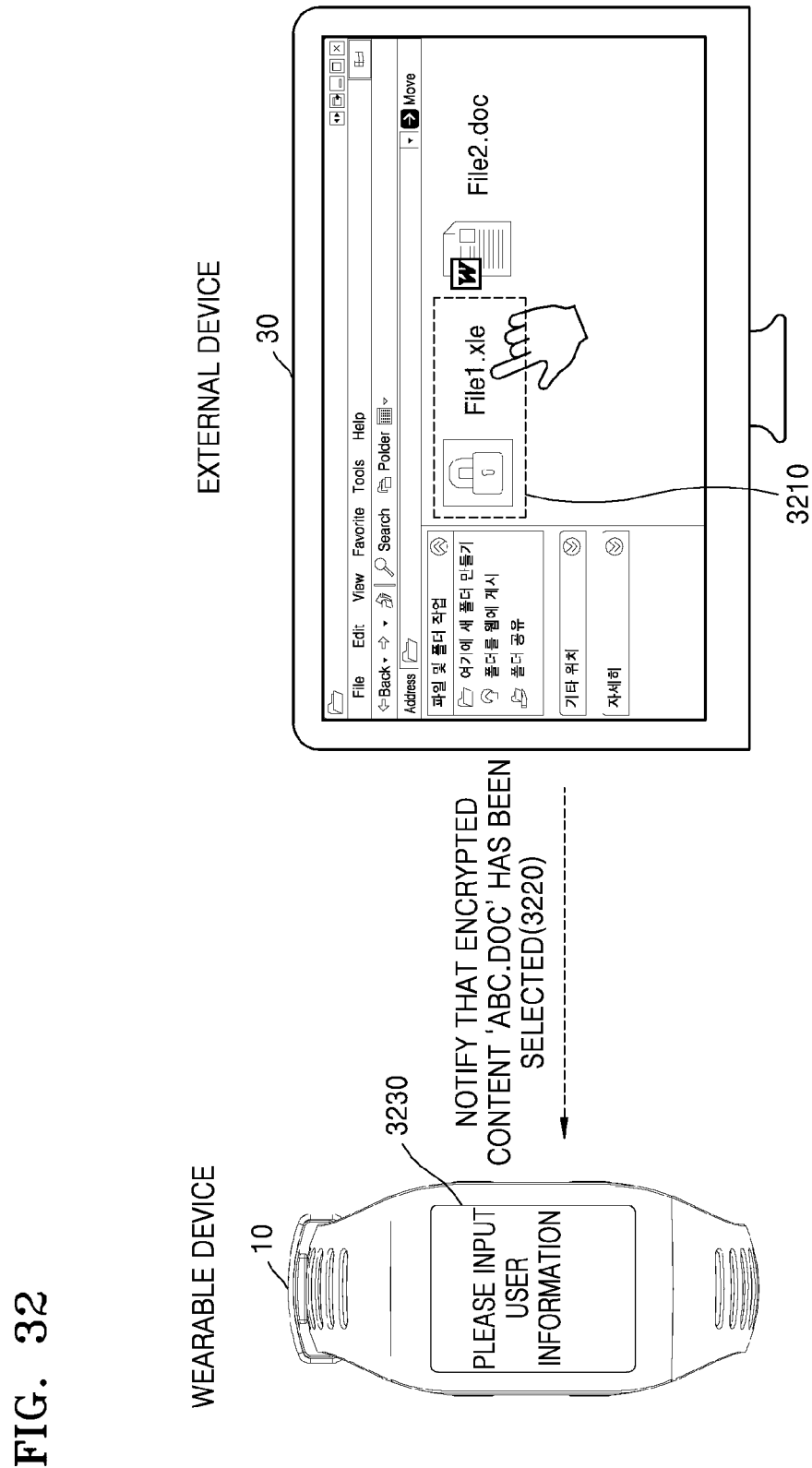
FIG. 32 illustrates an example in which the wearable device obtains user information so as to generate a decryption key, according to an exemplary embodiment.

FIG. 32 illustrates an example in which the wearable device 10 obtains user information so as to generate a decryption key, according to an exemplary embodiment.

First, the external device 30 selects encrypted content. In other words, the external device 30 selects decryption target content from among a plurality of encrypted content stored in the external device 30. For example, the external device 30 may receive user input selecting an object 3210 that indicates the encrypted content, and may select the encrypted content according to the user input. When the encrypted content is selected, the external device 30 notifies the wearable device 10 that the encrypted content has been selected in operation 3220.

When the wearable device 10 receives the notification from the external device 30, the wearable device 10 requests the user 20 to input the user information. For example, the wearable device 10 may output a pop-up window 3230 so as to request the user 20 to input the user information.

Figure 33:
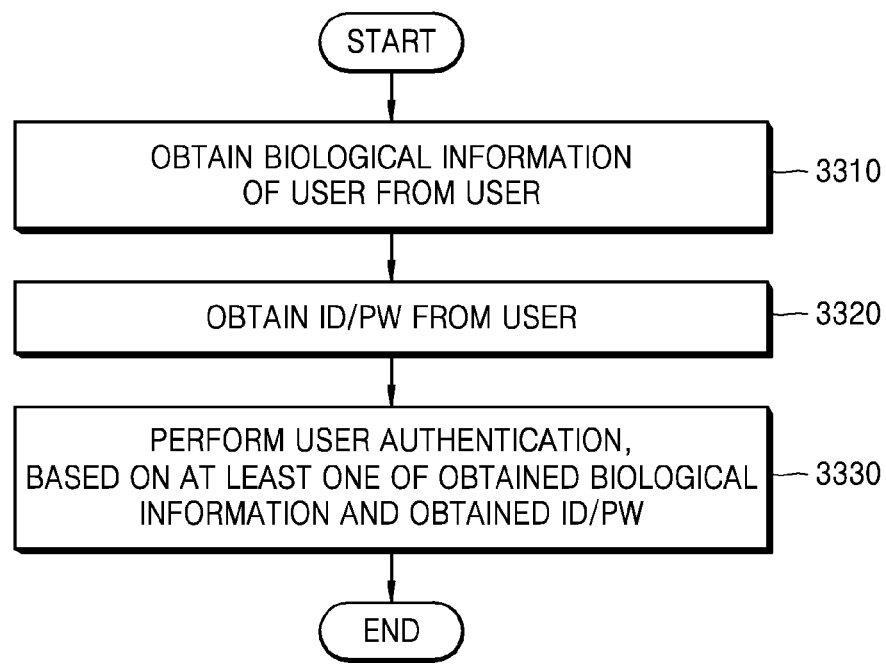
FIG. 33 is a flowchart illustrating an example in which the wearable device authenticates the user so as to generate a decryption key, according to an exemplary embodiment.

FIG. 33 is a flowchart illustrating an example in which the wearable device 10 authenticates the user 20 so as to generate a decryption key, according to an exemplary embodiment.

The exemplary embodiment of FIG. 33 includes operations that are processed in chronological order by the wearable device 10 shown in FIG. 1. Thus, for descriptions that refer to operations of the wearable device 10 shown in FIG. 1, the descriptions may also be applied to the flowchart of FIG. 33.

In operation 3310, the wearable device 10 obtains biological information from the user 20.

In operation 3320, the wearable device 10 obtains an ID and password from the user 20.

In operation 3330, the wearable device 10 performs user authentication, based on at least one of the obtained biological information and the obtained ID and password. That is, the wearable device 10 may perform the user authentication by using the biological information or by using the ID and password. Alternatively, the wearable device 10 may perform the user authentication by using all of the biological information and the ID and password.

The wearable device 10 may authenticate the user 20 just before the wearable device 10 generates the decryption key, or may authenticate the user 20 regardless of the generation of the decryption key. In other words, while the wearable device 10 generates the encryption key according to a result of the user authentication, if the encryption key has still not been generated, there is no time limit for the wearable device 10 to perform the user authentication.

For example, the wearable device 10 may perform the user authentication before the wearable device 10 generates and transmits the decryption key to the external device 30. Alternatively, when a program that provides content is executed or is ended in the external device 30, the wearable device 10 may automatically perform the user authentication within a preset time period. Alternatively, when the wearable device 10 is connected with the external device 30 for communication, the wearable device 10 may automatically perform the user authentication within a preset time period. Alternatively, when the wearable device 10 determines that a distance between the wearable device 10 and the external device 30 is equal to or less than a predetermined distance, the wearable device 10 may automatically perform the user authentication within a preset time period.

As described above, if the user authentication is performed before the decryption key is transmitted to the external device 30, the user 20 may feel that a content decryption time is decreased.

Figure 34:
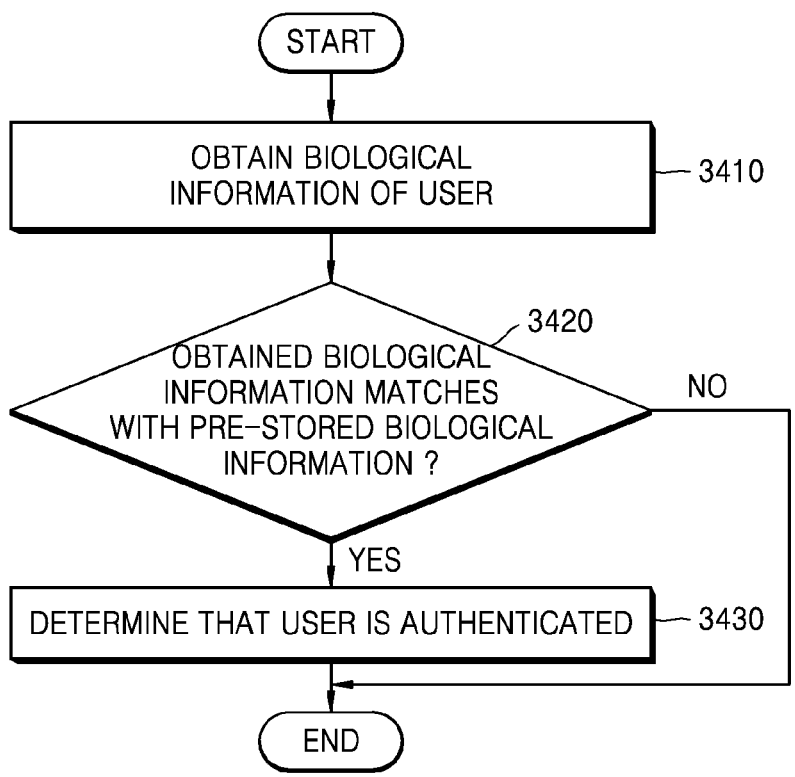
FIG. 34 is a flowchart illustrating an example in which the wearable device authenticates the user by using biological information of the user so as to generate a decryption key, according to an exemplary embodiment.

FIG. 34 is a flowchart illustrating an example in which the wearable device 10 authenticates the user 20 by using biological information of the user 20 so as to generate a decryption key, according to an exemplary embodiment.

In operation 3410, the wearable device 10 obtains the biological information of the user 20. Here, the biological information may refer to information about at least one of a fingerprint, an iris, a retina, a vein, a skeletal part, and the face of the user 20. For example, the wearable device 10 may obtain information about the fingerprint, the vein, or the skeletal part of the user 20 by using the sensor included in the sensing unit 5350, and may obtain information about the iris, the retina, or the face of the user 20 by using the camera included in the A/V input unit 5360.

In operation 3420, the wearable device 10 determines whether the biological information matches with pre-stored biological information. In other words, the wearable device 10 may store biological information of the user 20 in the memory 5370, and then may determine whether biological information, which is obtained from the user 20, matches the biological information stored in the memory 5370.

When the wearable device 10 determines that the obtained biological information matches the pre-stored biological information, the wearable device 10 proceeds to operation 3430, and if not, the wearable device 10 ends a procedure.

In operation 3430, the wearable device 10 determines that the user 20 is authenticated.

Figure 35:
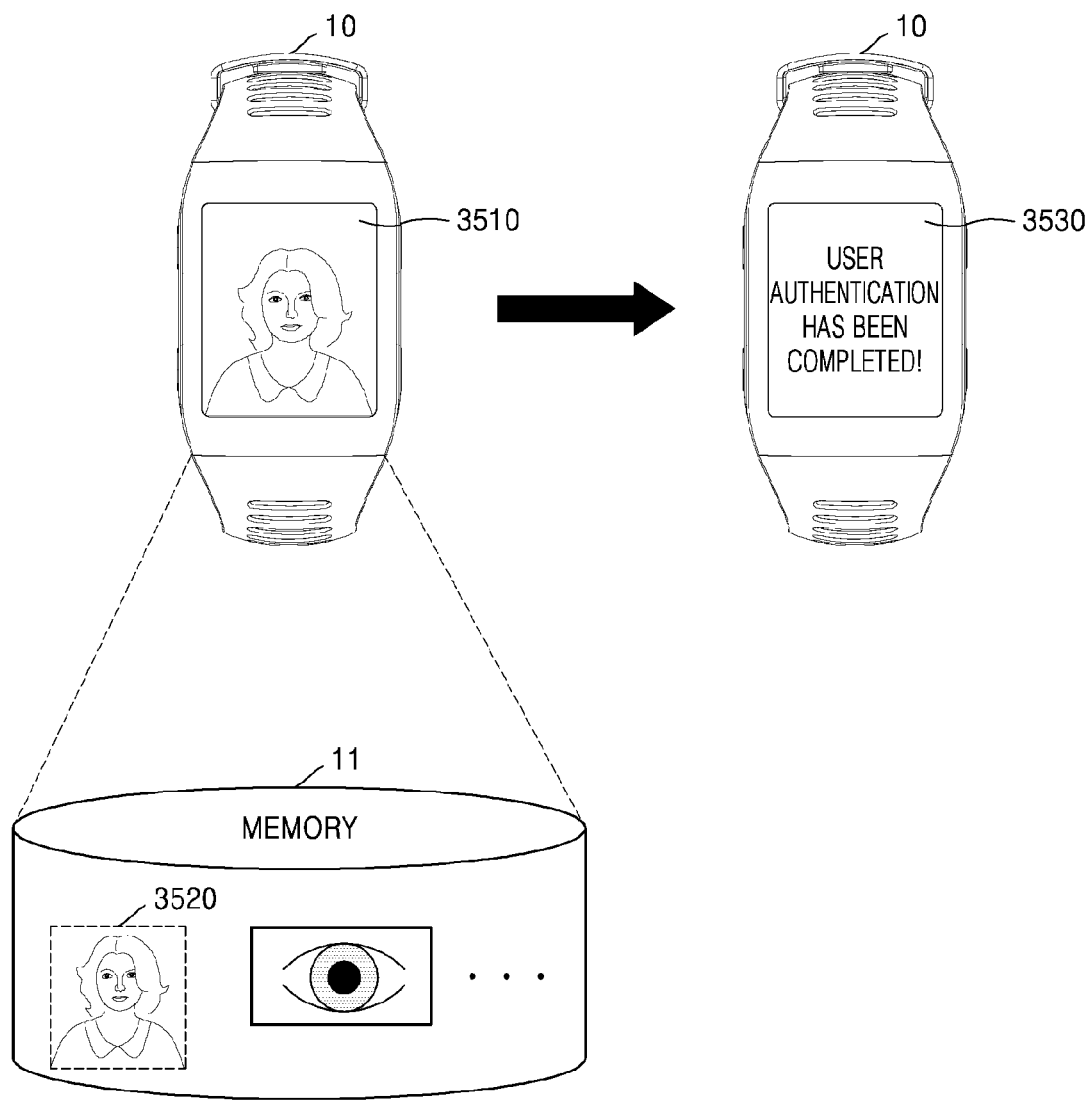
FIG. 35 illustrates an example in which the wearable device authenticates the user by using face information of the user, according to an exemplary embodiment.

FIG. 35 illustrates an example in which the wearable device 10 authenticates the user 20 by using face information of the user 20, according to an exemplary embodiment.

The example in which the wearable device 10 authenticates the user 20 by using biological information of the user 20 is not limited to the exemplary embodiment of FIG. 35. In other words, the wearable device 10 may authenticate the user 20 by using methods with reference to the examples of FIGS. 11 through 13. Also, the wearable device 10 may obtain fingerprint information of the user 20 by using a sensor, and may authenticate the user 20 by comparing the fingerprint information with pre-stored fingerprint information of the user 20.

The wearable device 10 obtains the face information of the user 20. For example, the wearable device 10 may obtain a face image 3510 of the user 20 by using the camera arranged at the wearable device 10.

The wearable device 10 searches for, from user information in a memory 11, an image 3520 of the user 20 that corresponds to the face image 3510. According to an exemplary embodiment, the image 3520 includes information related to positions of eyes, a nose, and a mouth, a face contour, or other facial information, that is shown in the face image 3510.

The wearable device 10 extracts a characteristic from the face image 3510, and extracts a characteristic from the image 3520 stored in the memory 11. Then, the wearable device 10 searches for the image 3520 of the user 20 that corresponds to the face image 3510 and is from among a plurality of pieces of information stored in the memory 11, while the wearable device 10 compares the extracted characteristics. Alternatively, the wearable device 10 may previously convert a facial characteristic of the user 20 into data, may store the data, and may compare the stored data with the characteristic that is extracted from the face image 3510.

As a result of the search, if the image 3520 that corresponds to the face image 3510 is stored in the memory 11 (or alternatively, if data that corresponds to the characteristic extracted from the face image 3510 is stored in the memory 11), the wearable device 10 determines that the user 20 is authenticated. In this case, the wearable device 10 may output a pop-up window 3530 indicating that user authentication has been completed.

Figure 36:
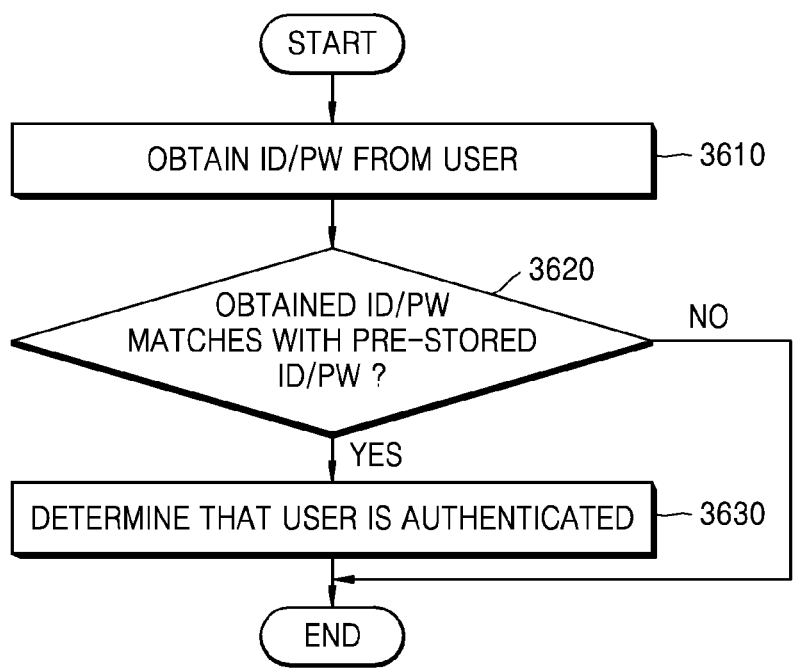
FIG. 36 is a flowchart illustrating an example in which the wearable device authenticates the user by using account information of the user so as to generate a decryption key, according to an exemplary embodiment.

FIG. 36 is a flowchart illustrating an example in which the wearable device 10 authenticates the user 20 by using account information of the user 20 so as to generate a decryption key, according to an exemplary embodiment.

In operation 3610, the wearable device 10 obtains the account information of the user 20. According to an exemplary embodiment, the account information may include a unique ID and password of the user 20. For example, the wearable device 10 may obtain the ID and password from the user 20 via the user input unit 5310.

In operation 3620, the wearable device 10 determines whether the obtained account information matches pre-stored information. That is, the wearable device 10 may store the ID and password of the user 20 in the memory 5370, and may determine whether an ID and password obtained later from the user 20 match the ID and password stored in the memory 5370.

If the wearable device 10 determines that the obtained account information matches the pre-stored information, the wearable device 10 proceeds to operation 3630, and if not, the wearable device 10 ends a procedure.

In operation 3630, the wearable device 10 determines that the user 20 is authenticated.

Figure 37:
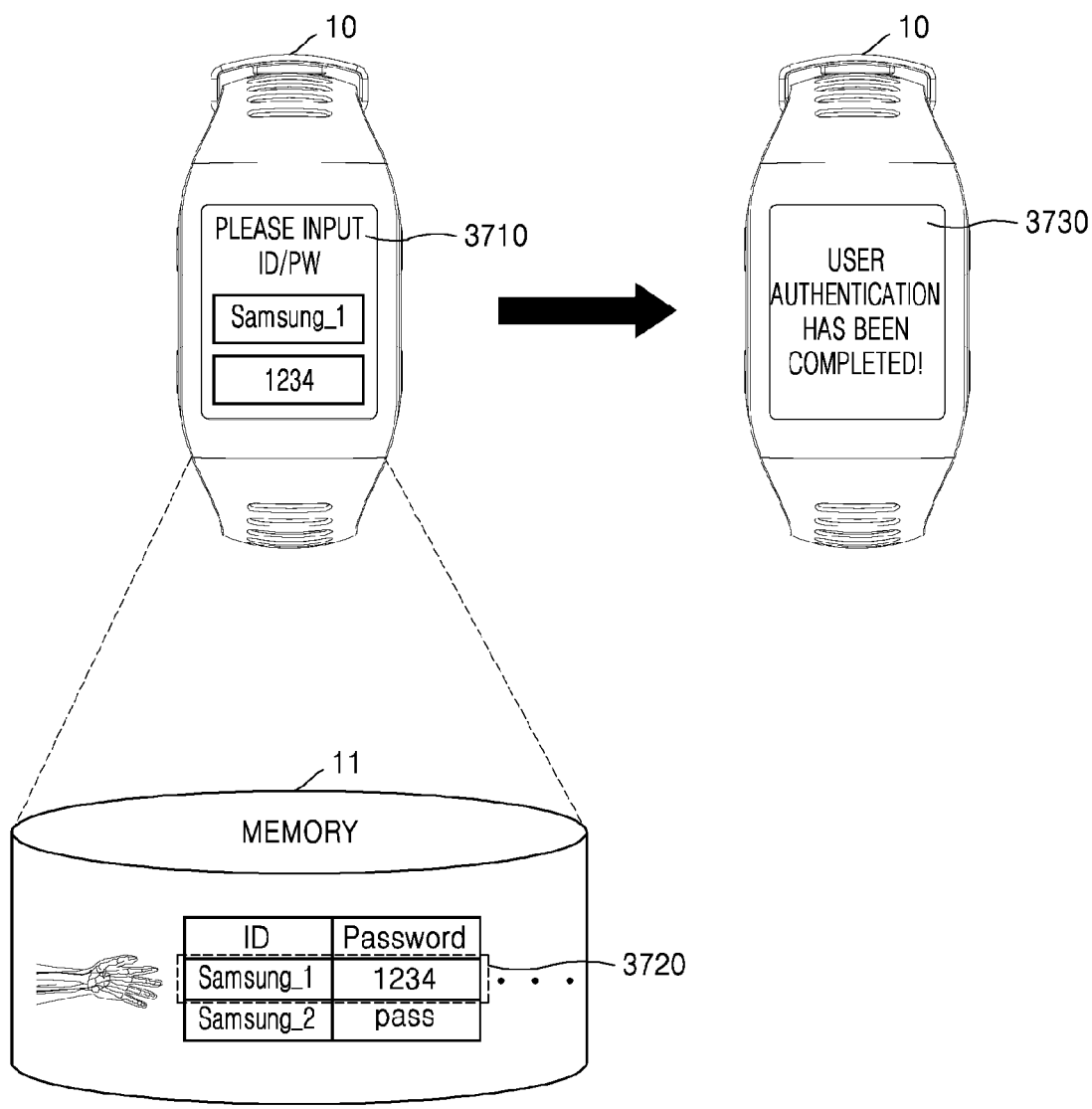
FIG. 37 illustrates an example in which the wearable device authenticates the user by using an ID and password of the user, according to an exemplary embodiment.

FIG. 37 illustrates an example in which the wearable device 10 authenticates the user 20 by using an ID and password of the user 20, according to an exemplary embodiment.

The wearable device 10 outputs a pop-up window 3710 to the user 20 so as to request the user 20 to input an ID and password, and the user 20 inputs an ID 'Samsung_1' and password '1234' via the user input unit 5310.

The wearable device 10 compares the ID 'Samsung_1' and password '1234', which are input by the user 20, with an ID and password 3720 stored in the memory 11. If the wearable device 10 determines that the input ID and password match with the stored ID and password 3720, the wearable device 10 determines that the user 20 is authenticated. In this case, the wearable device 10 may output a pop-up window 3730 indicating that the user authentication has been completed.

Figure 38:
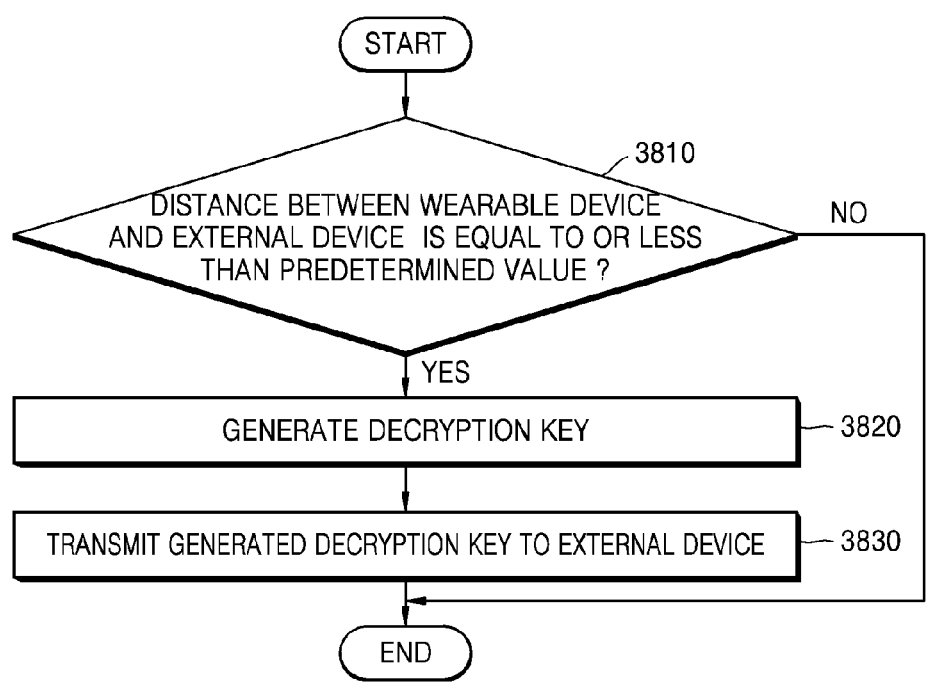
FIG. 38 is a flowchart of an example in which the wearable device generates a decryption key and transmits the generated decryption key to the external device, according to an exemplary embodiment.

FIG. 38 is a flowchart of an example in which the wearable device 10 generates a decryption key and transmits the generated decryption key to the external device 30, according to an exemplary embodiment.

In operation 3820, the wearable device 10 determines whether a distance between the wearable device 10 and the external device 30 is equal to or less than a predetermined value. In other words, the wearable device 10 calculates the distance between the wearable device 10 and the external device 30, and determines whether the distance is equal to or less than the predetermined value.

When the user 20 executes content by using the external device 30, in general, the user 20 and the external device 30 are adjacent to each other by having a small distance therebetween. Thus, a distance between the user 20 and the external device 30 may be a standard by which the user 20 determines whether to execute the content by using the external device 30.

Since the wearable device 10 according to the present exemplary embodiment may obtain biological information so as to perform user authentication, in this case, it is assumed that the user 20 currently wears the wearable device 10. Therefore, if the distance between the wearable device 10 and the external device 30 is equal to or less than the predetermined value, the user 20 and the external device 30 may be located adjacent to each other.

Accordingly, by determining whether the distance between the wearable device 10 and the external device 30 is equal to or less than the predetermined value, it is possible to prevent the decryption key from being generated by another person other than the user 20.

In operation 3820, the wearable device 10 generates the decryption key. Afterward, in operation 3830, the wearable device 10 transmits the decryption key to the external device 30.

Hereinafter, the exemplary embodiment of FIG. 38 is described in detail with reference to FIG. 39.

Figure 39:
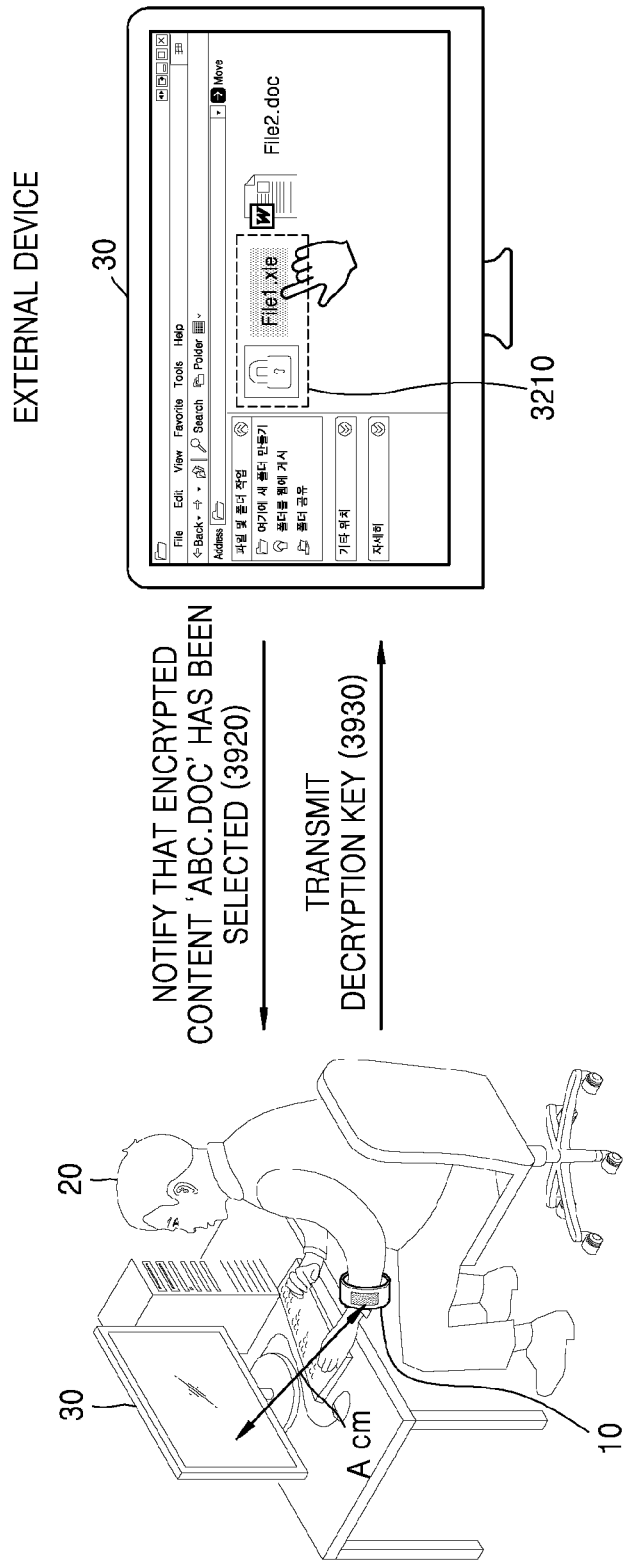
FIG. 39 illustrates an example of a condition by which the wearable device generates a decryption key, according to an exemplary embodiment.

FIG. 39 illustrates an example of a condition by which the wearable device 10 generates a decryption key, according to an exemplary embodiment.

First, the external device 30 selects encrypted content. In other words, the external device 30 selects decryption target content from among a plurality of encrypted content stored in the external device 30. For example, the external device 30 may receive user input selecting an object 3910 that indicates the encrypted content, and may select the encrypted content according to the user input. When the encrypted content is selected, the external device 30 notifies the wearable device 10 that the encrypted content has been selected in operation 3920.

When the notification is received from the external device 30, the wearable device 10 calculates a distance between the wearable device 10 and the external device 30. For example, the wearable device 10 may output a specific signal, may receive a signal that is the specific signal reflected from the external device 30, and may calculate the distance between the wearable device 10 and the external device 30 by using the received signal. According to an exemplary embodiment, the example in which the wearable device 10 calculates the distance between the wearable device 10 and the external device 30 is described above with reference to FIG. 19.

Afterward, the wearable device 10 determines whether the calculated distance is equal to or less than a predetermined value. For example, when it is assumed that the distance between the wearable device 10 and the external device 30 is A cm, the wearable device 10 determines whether A cm is equal to or less than the predetermined value.

If the wearable device 10 determines that A cm is equal to or less than the predetermined value, the wearable device 10 generates the decryption key, and transmits the decryption key to the external device 30 in operation 3930.

Alternatively, the wearable device 10 may not calculate the distance between the wearable device 10 and the external device 30. In other words, if the wearable device 10 receives the notification about selection of the encrypted content from the external device 30, the wearable device 10 may immediately generate the decryption key and may transmit the decryption key to the external device 30.

Figure 40:
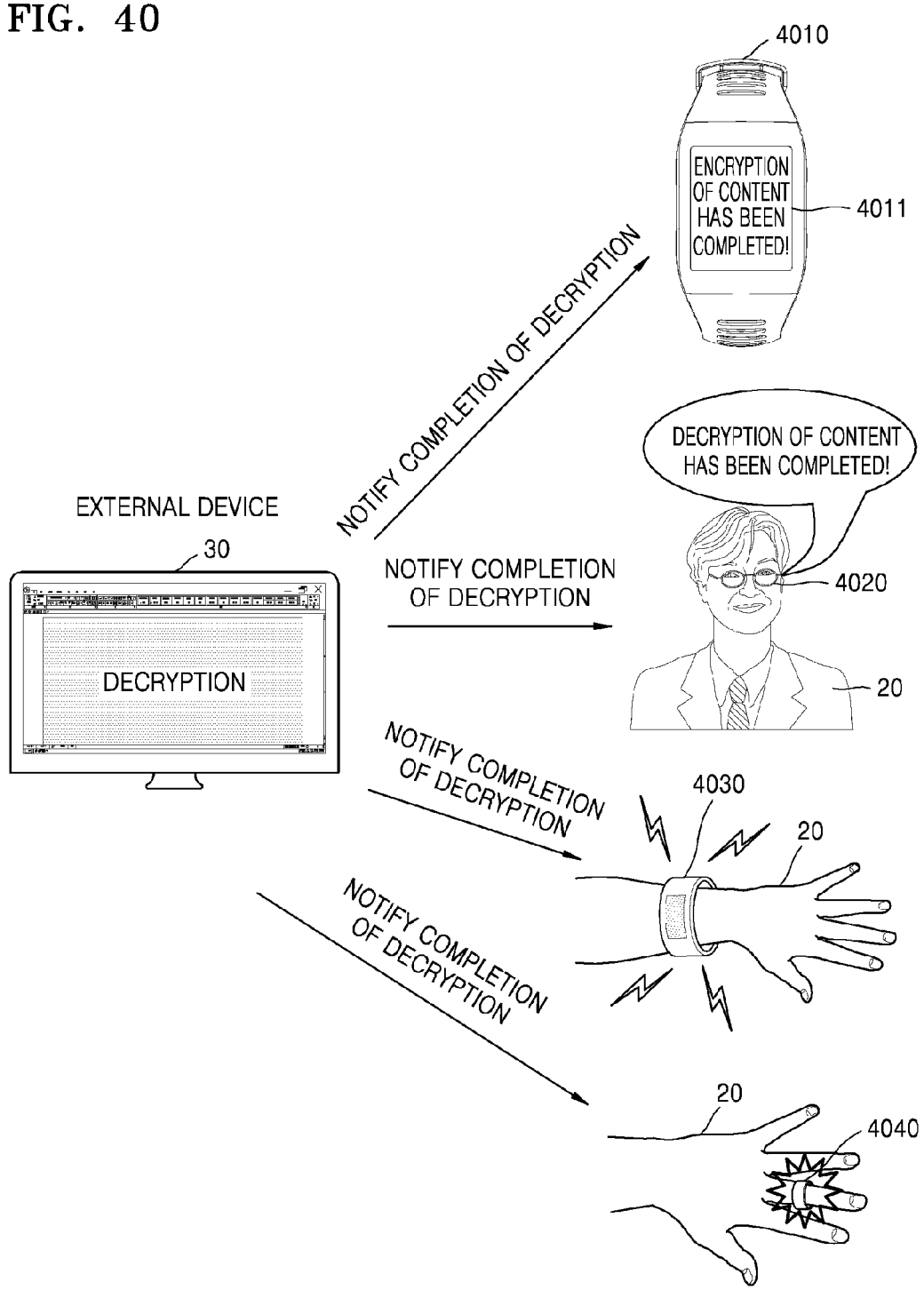
FIG. 40 illustrates an example in which a wearable device outputs an alarm when the external device has completed decryption of content, according to an exemplary embodiment.

FIG. 40 illustrates an example in which a wearable device outputs an alarm when the external device 30 has completed decryption of content, according to an exemplary embodiment.

FIG. 40 illustrates different cases in which alarms are output according to types of the wearable device. FIG. 40 illustrates a watch 4010, glasses 4020, a wristband 4030, and a ring 4040 as the types of the wearable device, but the types of the wearable device are not limited thereto. In other words, any type of the wearable device that is attachable to a body of the user 20 may be used. Also, referring to FIG. 40, each of the wearable devices outputs one type of an alarm, but one or more exemplary embodiments are not limited thereto. That is, one wearable device may output various types of alarm.

When the external device 30 has completed the decryption of the content, the external device 30 may notify the wearable devices 4010, 4020, 4030, and 4040 that the decryption of the content has been completed. Then, the wearable devices 4010, 4020, 4030, and 4040 output alarms, so that the user 20 may be notified that the decryption of the content has been completed.

For example, the wearable device 4010 may output, on a screen of the wearable device 4010, a pop-up window 4011 indicating that the decryption of the content has been completed. As another example, the wearable device 4020 may output, via a speaker of the wearable device 4020, audio indicating that the decryption of the content has been completed. As another example, the wearable device 4030 may generate a vibration by using a vibration motor, and thus, may notify the user 20 that the decryption of the content has been completed. As another example, the wearable device 4040 may emit light, and thus, may notify the user 20 that the decryption of the content has been completed.

Figure 41:
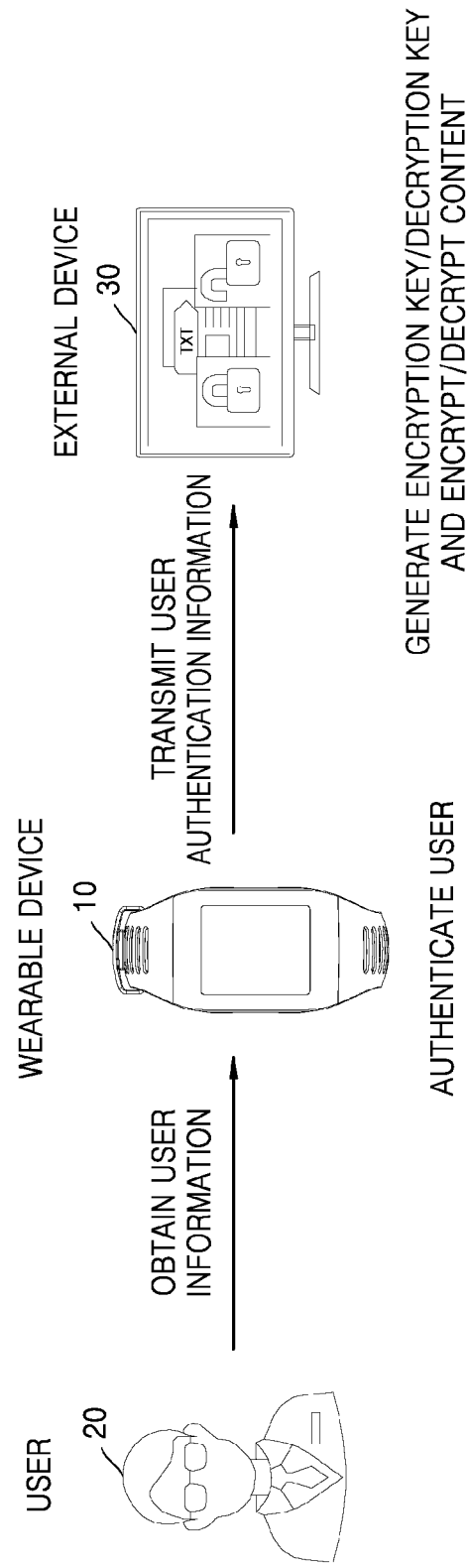
FIG. 41 illustrates an example in which the external device generates an encryption key or a decryption key, according to an exemplary embodiment.

FIG. 41 illustrates an example in which the external device 30 generates an encryption key or a decryption key, according to an exemplary embodiment.

Referring to FIGS. 1 through 40, the wearable device 10 authenticates the user 20 based on user information, and generates an encryption key or a decryption key, based on a result of user authentication. Then, the external device 30 encrypts or decrypts content. However, the wearable device 10 may perform only the user authentication, and the external device 30 may generate the encryption key or the decryption key based on the result of user authentication and may encrypt or may decrypt the content.

Referring to FIG. 41, the wearable device 10 obtains user information from the user 20, and performs the user authentication by using the user information. Afterward, the wearable device 10 transmits information about the user authentication to the external device 30.

When the notification about the user authentication is received from the wearable device 10, the external device 30 generates an encryption key for encryption of content, and encrypts the content by using the encryption key. Hereinafter, examples in which the external device 30 generates an encryption key and encrypts content by using the encryption key are described with reference to FIGS. 42 through 45.

Also, when the notification about the user authentication is received from the wearable device 10, the external device 30 generates a decryption key for decryption of content, and decrypts the content by using the decryption key. Hereinafter, examples in which the external device 30 generates a decryption key and decrypts content by using the decryption key are described with reference to FIGS. 46 and 47.

Figure 42:
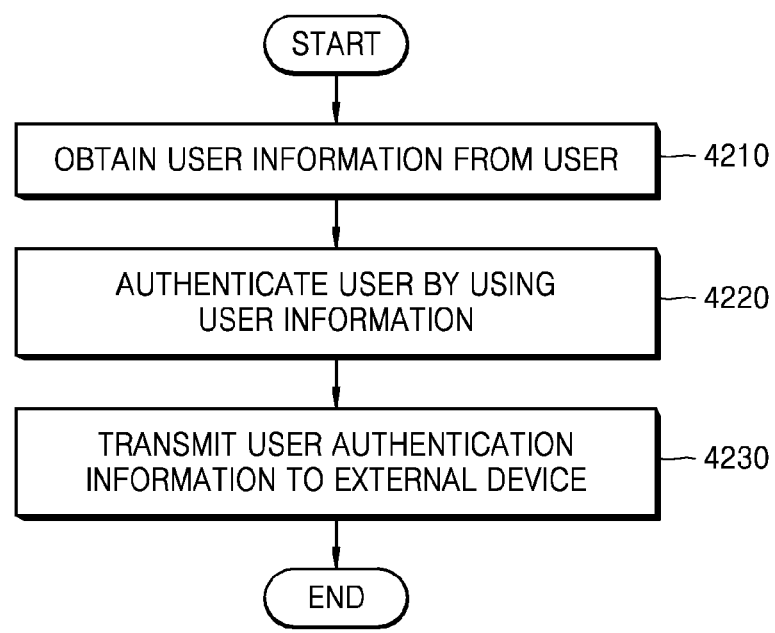
FIG. 42 is a flowchart illustrating an example in which the wearable device performs user authentication, and transmits a result of the user authentication to the external device, according to an exemplary embodiment.

FIG. 42 is a flowchart illustrating an example in which the wearable device 10 performs user authentication, and transmits a result of the user authentication to the external device 10, according to an exemplary embodiment.

In operation 4210, the wearable device 10 obtains user information from the user 20.

The user information refers to information required for the wearable device 10 to identify the user 20 (e.g., to authenticate the user 20). For example, the user information may be biological information of the user 20 or account information of the user 20. The example in which the wearable device 10 obtains the user information is described above with reference to FIG. 1.

In operation 4220, the wearable device 10 authenticates the user 20, based on the user information. For example, the wearable device 10 may authenticate the user 20 by comparing input user information with pre-stored user information. The example in which the wearable device 10 authenticates the user 20 is described above with reference to FIG. 1.

In operation 4230, the wearable device 10 transmits user authentication information to the external device 30. According to an exemplary embodiment, the user authentication information refers to information indicating whether the user 20 has been authenticated.

Figure 43:
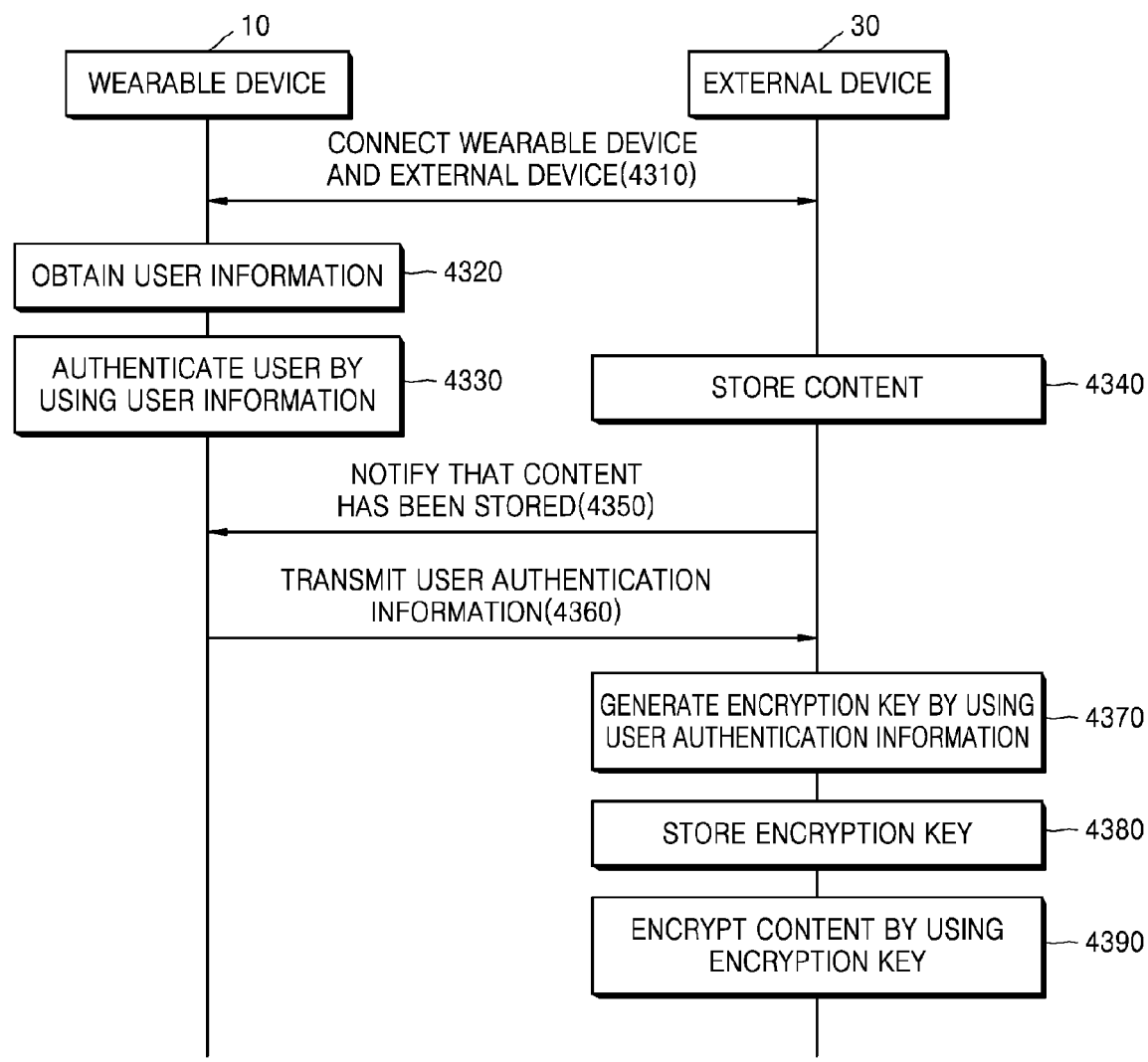
FIG. 43 is a flowchart illustrating an example in which the external device encrypts content by using a user authentication result that is received from the wearable device, according to an exemplary embodiment.

FIG. 43 is a flowchart illustrating an example in which the external device 30 encrypts content by using a user authentication result that is received from the wearable device 10, according to an exemplary embodiment.

The exemplary embodiment of FIG. 43 includes operations that are processed in chronological order by the wearable device 10 and the external device 30 shown in FIG. 41. Thus, for descriptions that refer to operations of the wearable device 10 and the external device 30 shown in FIG. 1, the descriptions may also be applied to the flowchart of FIG. 43.

Referring to FIG. 43, the external device 30 notifies the wearable device 10 that content has been stored, and afterward, the wearable device 10 transmits user authentication information to the external device 30.

Operations 4310 through 4350 in FIG. 43 are same as operations 410 through 450 in FIG. 4, and thus, detailed descriptions about operations 4310 through 4350 are omitted here.

In operation 4360, the wearable device 10 transmits user authentication information to the external device 30. In other words, the wearable device 10 transmits, to the external device 30, information indicating whether a subject that provided user information is the user 20.

In operations 4370 through 4390, the external device 30 generates an encryption key according to a result of user authentication, and encrypts content by using the encryption key. In operations 4370 and 4380, a method of generating and storing the encryption key, the method performed by the external device 30, is the same as a method of generating and storing an encryption key, the method performed by the wearable device 10 in operations 460 and 470 of FIG. 4. Also, operation 4390 of FIG. 43 is same as operation 490 of FIG. 4. Therefore, detailed descriptions about operations 4370 through 4390 are omitted here.

Figure 44:
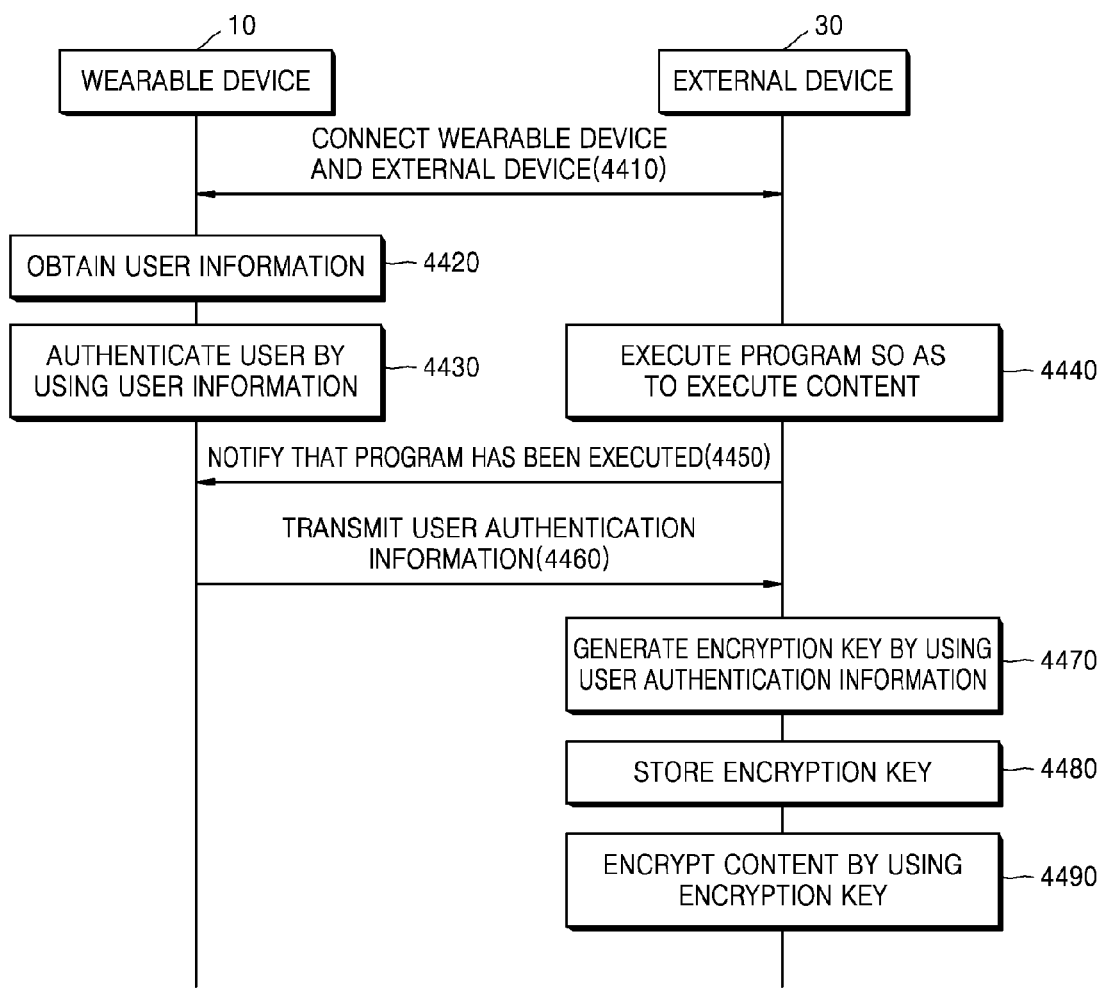
FIG. 44 is a flowchart illustrating an example in which the external device encrypts content by using a user authentication result that is received from the wearable device, according to another exemplary embodiment.

FIG. 44 is a flowchart illustrating an example in which the external device 30 encrypts content by using a user authentication result that is received from the wearable device 10, according to another exemplary embodiment.

The exemplary embodiment of FIG. 44 includes operations that are processed in chronological order by the wearable device 10 and the external device 30 shown in FIG. 41. Thus, for descriptions that refer to operations of the wearable device 10 and the external device 30 shown in FIG. 1, the descriptions may also be applied to the flowchart of FIG. 44.

Referring to FIG. 44, the external device 30 notifies the wearable device 10 that a program has been executed, and afterward, the wearable device 10 transmits user authentication information to the external device 30. According to an exemplary embodiment, the program refers to a program that is used by the external device 30 so as to execute content. For example, according to types of the content, the program may be a Microsoft word program, a Microsoft Excel program, a Microsoft PowerPoint program, a photo executing program, an image executing program, a video executing program, a music executing program, or the like.

Operations 4410 through 4450 in FIG. 44 are the same as operations 2010 through 2050 in FIG. 20, and thus, detailed descriptions about operations 4410 through 4450 are omitted here.

In operation 4460, the wearable device 10 transmits the user authentication information to the external device 30. In other words, the wearable device 10 transmits, to the external device 30, information indicating whether a subject that provided user information is the user 20.

In operations 4470 through 4490, the external device 30 generates an encryption key according to a result of user authentication, and encrypts content by using the encryption key. In operations 4470 and 4480, a method of generating and storing the encryption key, the method performed by the external device 30, is the same as a method of generating and storing an encryption key, the method performed by the wearable device 10 in operations 2060 and 2070 of FIG. 20. Also, operation 4490 of FIG. 44 is same as operation 2095 of FIG. 20. Therefore, detailed descriptions about operations 4470 through 4490 are omitted here.

Figure 45:
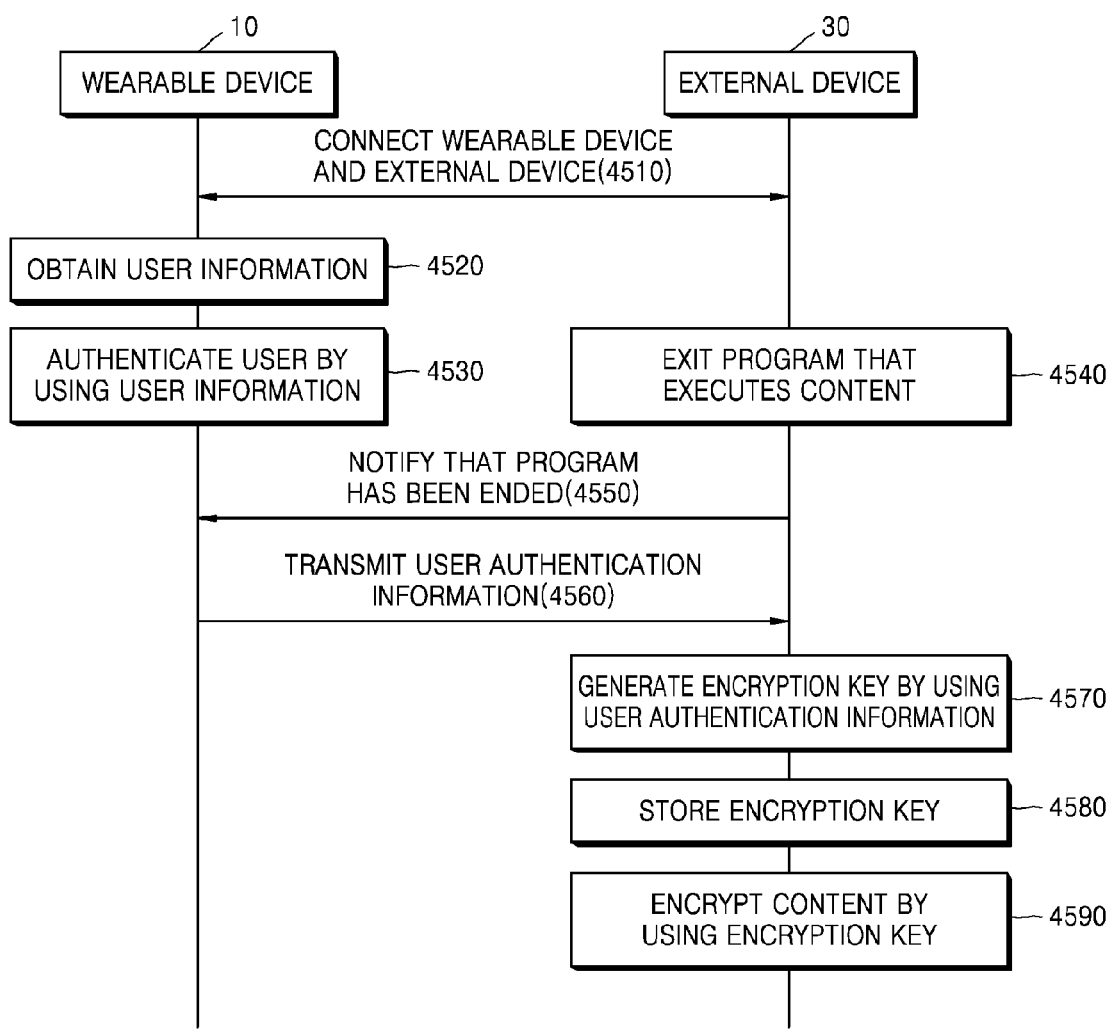
FIG. 45 is a flowchart illustrating an example in which the external device encrypts content by using a user authentication result that is received from the wearable device, according to another exemplary embodiment.

FIG. 45 is a flowchart illustrating an example in which the external device 30 encrypts content by using a user authentication result that is received from the wearable device 10, according to another exemplary embodiment.

The exemplary embodiment of FIG. 45 includes operations that are processed in chronological order by the wearable device 10 and the external device 30 shown in FIG. 41. Thus, for descriptions that refer to operations of the wearable device 10 and the external device 30 shown in FIG. 1, the descriptions may also be applied to the flowchart of FIG. 45.

Referring to FIG. 45, the external device 30 notifies the wearable device 10 that a program has been ended, and afterward, the wearable device 10 transmits user authentication information to the external device 30. According to an exemplary embodiment, the program refers to a program that is used by the external device 30 so as to execute content.

Operations 4510 through 4550 in FIG. 45 are the same as operations 2210 through 2250 in FIG. 22, and thus, detailed descriptions about operations 4510 through 4550 are omitted here.

In operation 4560, the wearable device 10 transmits the user authentication information to the external device 30. In other words, the wearable device 10 transmits, to the external device 30, information indicating whether a subject that provided user information is the user 20.

In operations 4570 through 4590, the external device 30 generates an encryption key according to a result of user authentication, and encrypts content by using the encryption key. In operations 4570 and 4580, a method of generating and storing the encryption key, the method performed by the external device 30, is the same as a method of generating and storing an encryption key, the method performed by the wearable device 10 in operations 2260 and 2270 of FIG. 22. Also, operation 4590 of FIG. 45 is the same as operation 2295 of FIG. 22. Therefore, detailed descriptions about operations 4570 through 4590 are omitted here.

Figure 46:
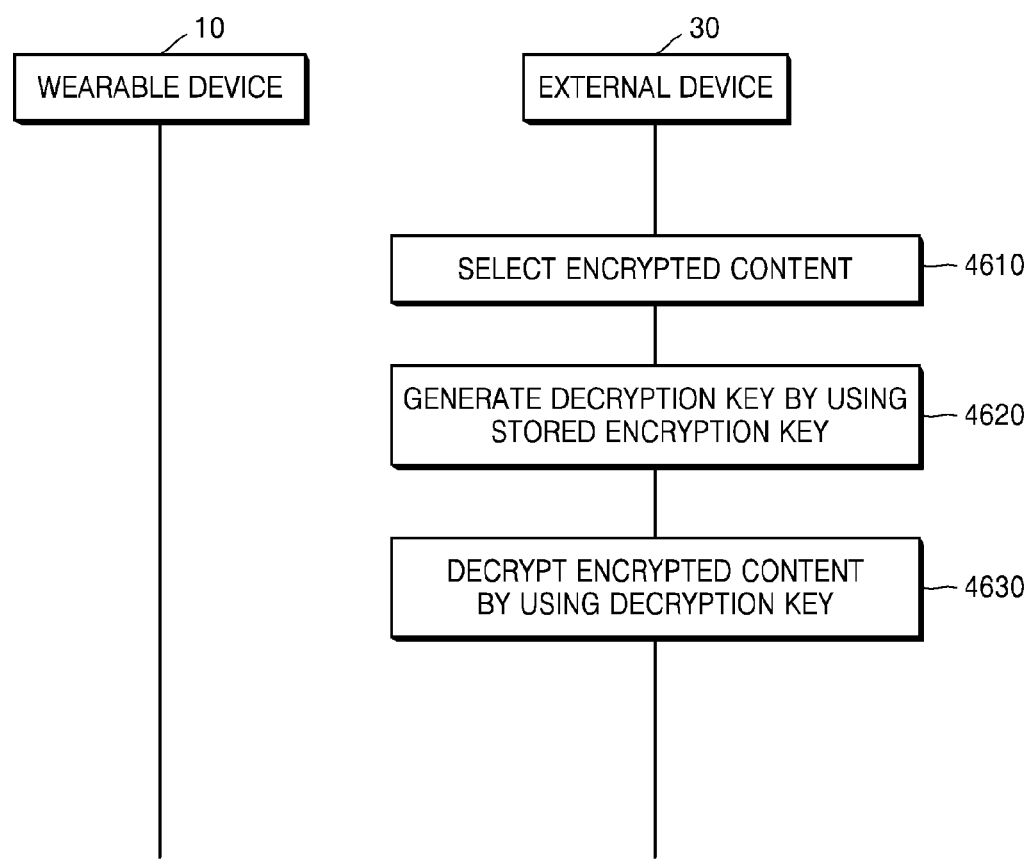
FIG. 46 is a flowchart illustrating an example in which the external device generates a decryption key and decrypts content, according to an exemplary embodiment.

FIG. 46 is a flowchart illustrating an example in which the external device 30 generates a decryption key and decrypts content, according to an exemplary embodiment.

The exemplary embodiment of FIG. 46 includes operations that are processed in chronological order by the wearable device 10 shown in FIG. 41. Thus, for descriptions that refer to operations of the wearable device 10 shown in FIG. 1, the descriptions may also be applied to the flowchart of FIG. 46.

Referring to FIG. 46, the external device 30 decrypts selected content without separately transmitting notification to the wearable device 10. That is, when the content is selected by the user 20, the external device 30 generates a decryption key, and decrypts the selected content by using the decryption key. According to an exemplary embodiment, the selected content refers to encrypted content.

Operations 4610 through 4630 in FIG. 46 are same as operations 2820 through 2860 in FIG. 28, and thus, detailed descriptions about operations 4610 through 4630 are omitted here.

In operation 4620, the external device 30 generates a decryption key by using a stored encryption key. For example, the external device 30 may generate the decryption key, and may store the decryption key in the memory 5370.

Figure 47:
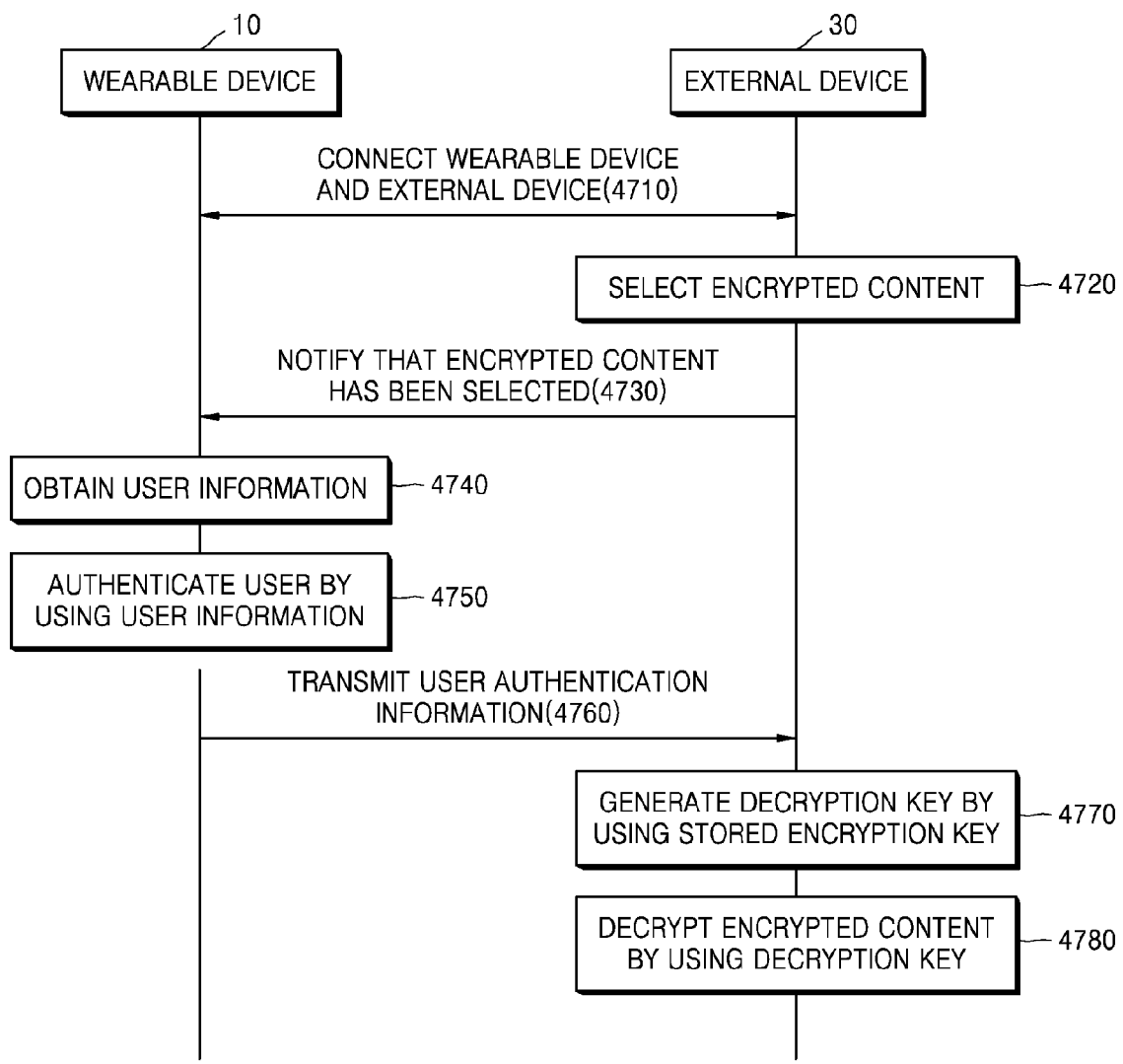
FIG. 47 is a flowchart illustrating an example in which the external device generates a decryption key and decrypts content, according to another exemplary embodiment.

FIG. 47 is a flowchart illustrating an example in which the external device 30 generates a decryption key and decrypts content, according to another exemplary embodiment.

The exemplary embodiment of FIG. 47 includes operations that are processed in chronological order by the wearable device 10 shown in FIG. 1. Thus, for descriptions that refer to operations of the wearable device 10 shown in FIG. 41, the descriptions may also be applied to the flowchart of FIG. 47.

Referring to FIG. 47, the external device 30 generates a decryption key after the external device 30 receives user authentication information from the wearable device 20. As described above with reference to FIG. 46, the external device 30 decrypts the selected content without separately transmitting the notification to the wearable device 10. However, in the present exemplary embodiment of FIG. 47, the external device 30 decrypts the content when the external device 30 notifies the wearable device 10 that content has been selected and then receives the user authentication information from the wearable device 20.

Operations 4710 through 4750 in FIG. 47 are same as operations 3110 through 3150 in FIG. 31, and thus, detailed descriptions about operations 4710 through 4750 are omitted here.

In operation 4760, the wearable device 10 transmits user authentication information to the external device 30. According to an exemplary embodiment, the user authentication information refers to information indicating whether a subject that provided user information is the user 20.

In operation 4770, the external device 30 generates the decryption key by using a stored encryption key. In other words, if the subject that provided user information is the user 20, the external device 30 generates the decryption key.

Operation 4780 of FIG. 47 is same as operation 3180 of FIG. 31. Thus, detailed descriptions about operation 4780 are omitted here.

Figure 48:
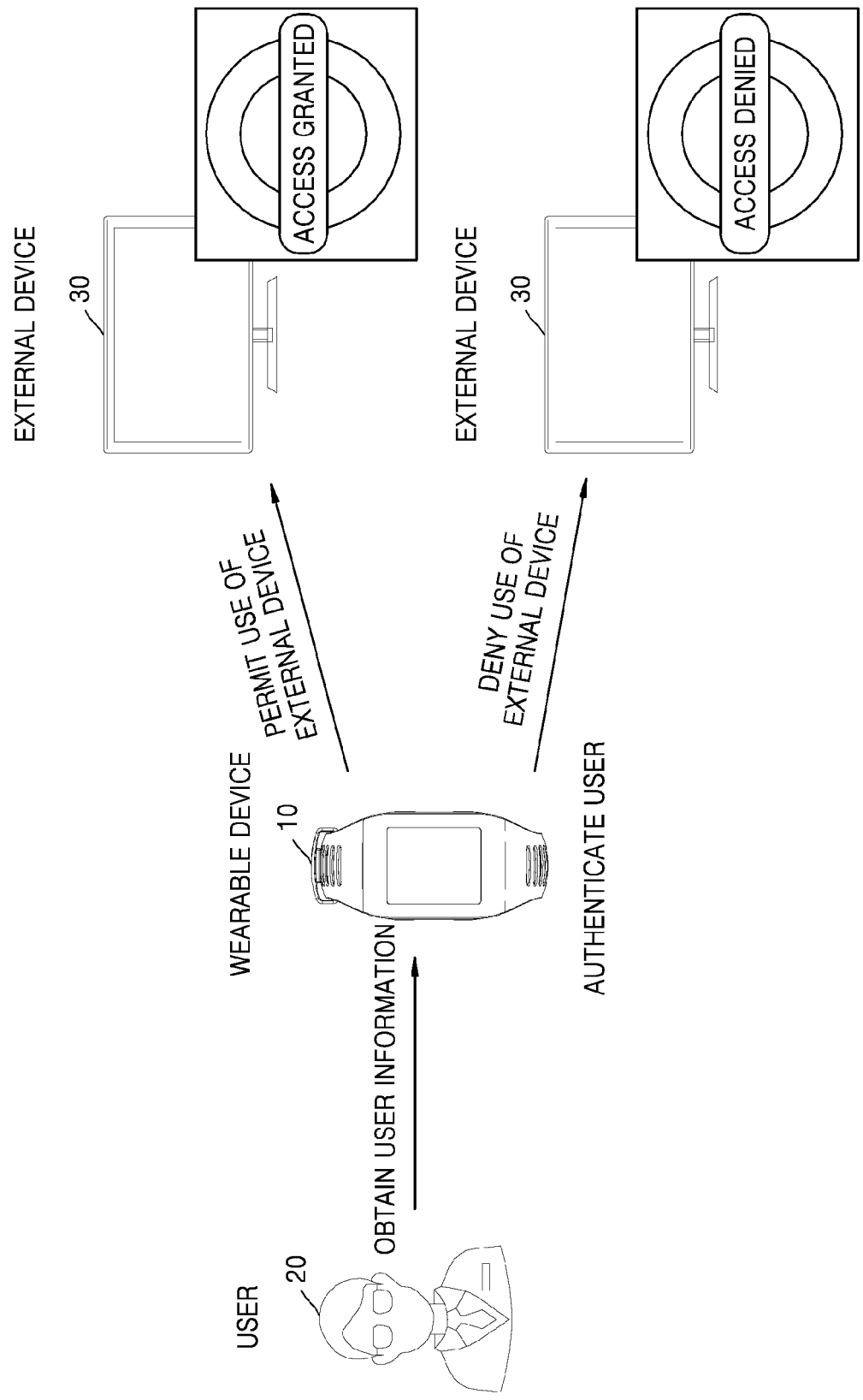
FIG. 48 illustrates an example in which the wearable device sets access rights to the external device, according to an exemplary embodiment.

FIG. 48 illustrates an example in which the wearable device 10 sets access rights to the external device 30, according to an exemplary embodiment.

As described above with reference to FIGS. 1 through 47, the wearable device 10 may determine whether to encrypt or to decrypt content that is stored in the external device 30. In other words, the wearable device 10 may allow the content to be encrypted or decrypted only when the user 20 currently wears the wearable device 10. Accordingly, the user 20 may execute the content only when the user 20 currently wears the wearable device 10.

Referring to FIG. 48, the wearable device 10 may assign the user 20 access rights to the external device 30. In other words, the wearable device 10 may determine whether to permit the user 20 to access the external device 30. For example, according to a result of user authentication, the wearable device 10 may activate the external device 30 so as to make the user 20 operate the external device 30. If the wearable device 10 determines that an accessing subject is not the user 20, the wearable device 10 may deactivate the external device 30. Accordingly, only the user 20 may use the external device 30.

Hereinafter, examples in which the wearable device 10 assigns the user 20 access rights to the external device 30 are described with reference to FIGS. 49 through 52.

Figure 49:
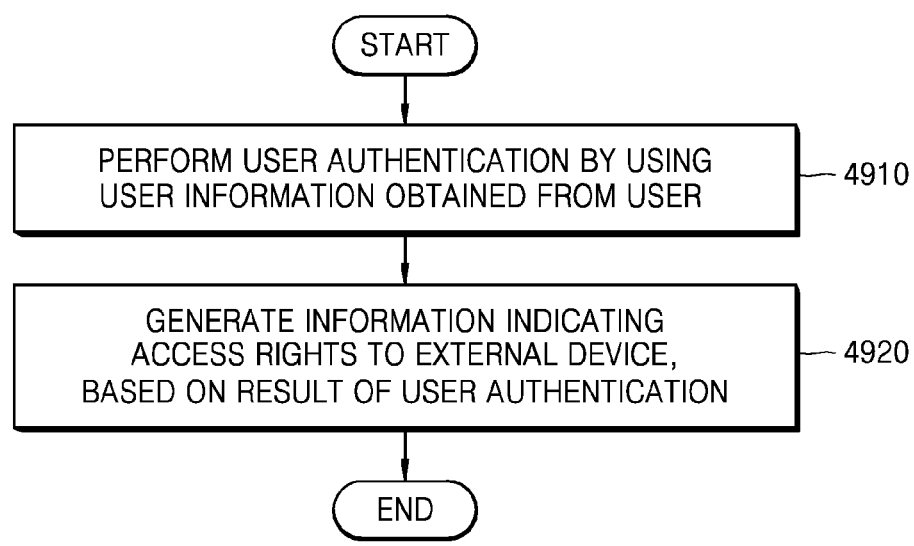
FIG. 49 is a flowchart illustrating an example in which the wearable device sets access rights to the external device.

FIG. 49 is a flowchart illustrating an example in which the wearable device 10 sets access rights to the external device 30.

The exemplary embodiment of FIG. 49 includes operations that are processed in chronological order by the wearable device 10 shown in FIG. 48. Thus, for descriptions that refer to operations of the wearable device 10 shown in FIG. 1, the descriptions may also be applied to the flowchart of FIG. 49.

Referring to operation 4910, the wearable device 10 performs user authentication by using user information obtained from the user 20. The wearable device 10 may perform the user authentication by comparing input user information with pre-stored user information. According to an exemplary embodiment, the user information may be biological information of the user 20 or account information of the user 20.

In operation 4920, the wearable device 10 generates information indicating access rights to the external device 30, based on a result of the user authentication. Afterward, the wearable device 10 transmits the information to the external device 30.

Hereinafter, the exemplary embodiment of FIG. 49 is described in detail with reference to FIG. 50.

Figure 50:
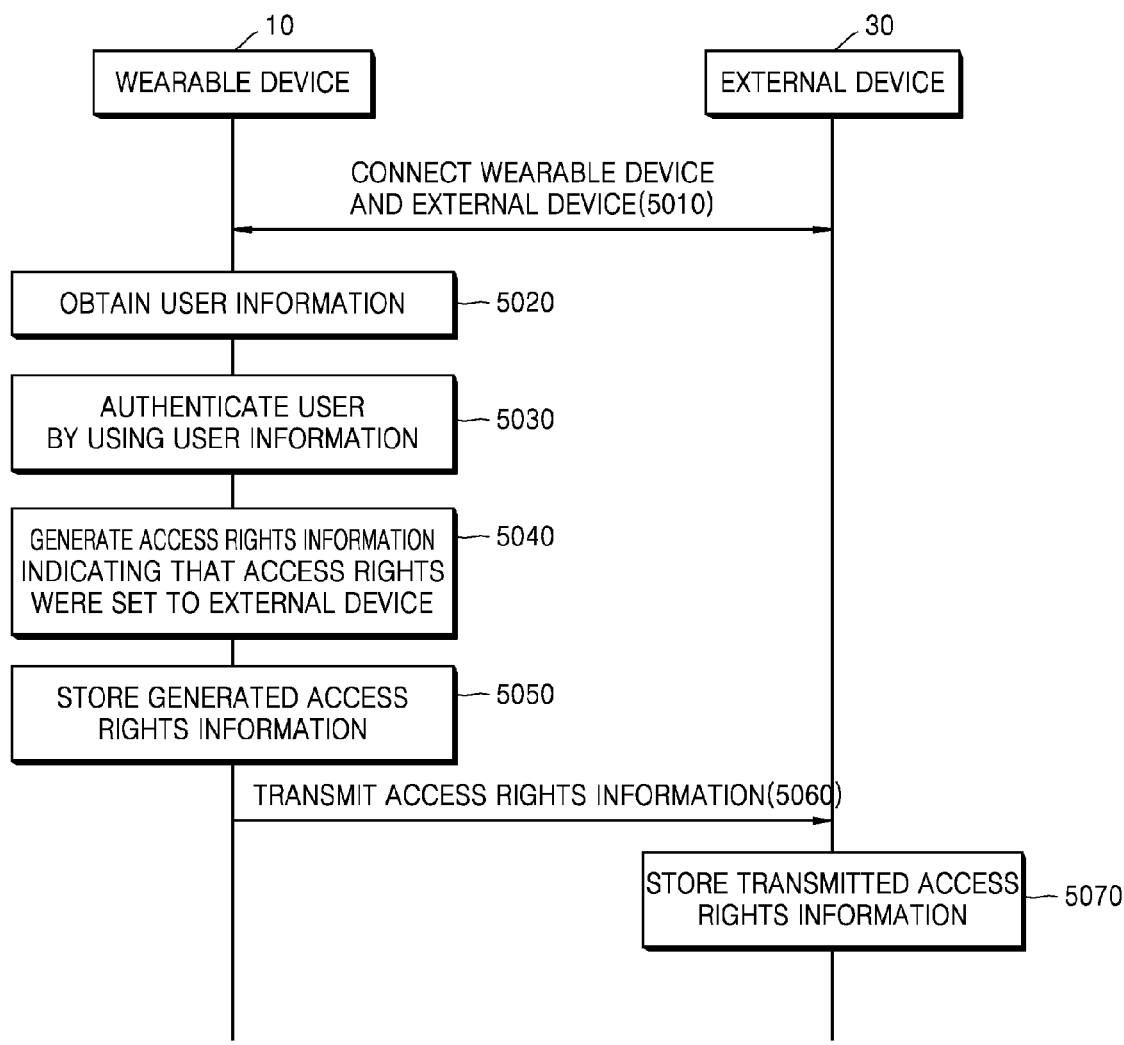
FIG. 50 is a flowchart illustrating an example in which the wearable device sets access rights to the external device, based on a result of user authentication, according to an exemplary embodiment.

FIG. 50 is a flowchart illustrating an example in which the wearable device 10 sets access rights to the external device 30, based on a result of user authentication, according to an exemplary embodiment.

The exemplary embodiment of FIG. 50 includes operations that are processed in chronological order by the wearable device 10 and the external device 30 shown in FIG. 48. Thus, for descriptions that refer to operations of the wearable device 10 and the external device 30 shown in FIG. 1, the descriptions may also be applied to the flowchart of FIG. 50.

In operation 5010, the wearable device 10 and the external device 30 are connected to each other. According to an exemplary embodiment, the connection refers to a connection by which a data exchange is possible therebetween. For example, the wearable device 10 and the external device 30 may be connected to each other by using a wireless or wired communication method, and examples of the wireless and wired communication methods are described above with reference to FIG. 1.

If a plurality of devices are connectable to the wearable device 10, the wearable device 10 may select one of the plurality of devices and may maintain a connection with the selected device. The example in which the wearable device 10 maintains a connection with one of the plurality of devices is described with reference to FIGS. 5 through 7.

In operation 5020, the wearable device 10 obtains user information. According to an exemplary embodiment, the user information may be biological information of the user 20 or account information of the user 20.

In operation 5030, the wearable device 10 authenticates the user 20, based on the user information. For example, the wearable device 10 may authenticate the user 20 by comparing the user information with pre-registered information. The examples in which the wearable device 10 authenticates the user 20 are described above with reference to FIGS. 8 through 15.

In operation 5040, the wearable device 10 generates access rights information indicating that access rights were set to the external device 30. According to an exemplary embodiment, the access rights information activates the external device 30 so as to allow the user 20 to use the external device 30. In other words, when the user authentication is failed, the access rights information deactivates the external device.

For example, the access rights information may be a key value that activates the external device 30. A format of the key value is not limited. The external device 30 may be activated only when the key value is transmitted from the wearable device 10.

In operation 5050, the wearable device 10 stores the access rights information. Although not illustrated in FIG. 50, the wearable device 10 may not separately store the access rights information but may immediately delete the access rights information.

In operation 5060, the wearable device 10 transmits the access rights information to the external device 30.

In operation 5070, the external device 30 stores the access rights information.

According to the exemplary embodiment of FIG. 50, the access rights information is stored in the external device 30. Therefore, afterward, only the user 20 who has passed through the user authentication via the wearable device 10 may use the external device 30.

Hereinafter, with reference to FIG. 51, an example is described in which, when the user 20 who currently wears the wearable device 10 attempts to use the external device 30, the wearable device 10 determines whether to activate the external device 30.

Figure 51:
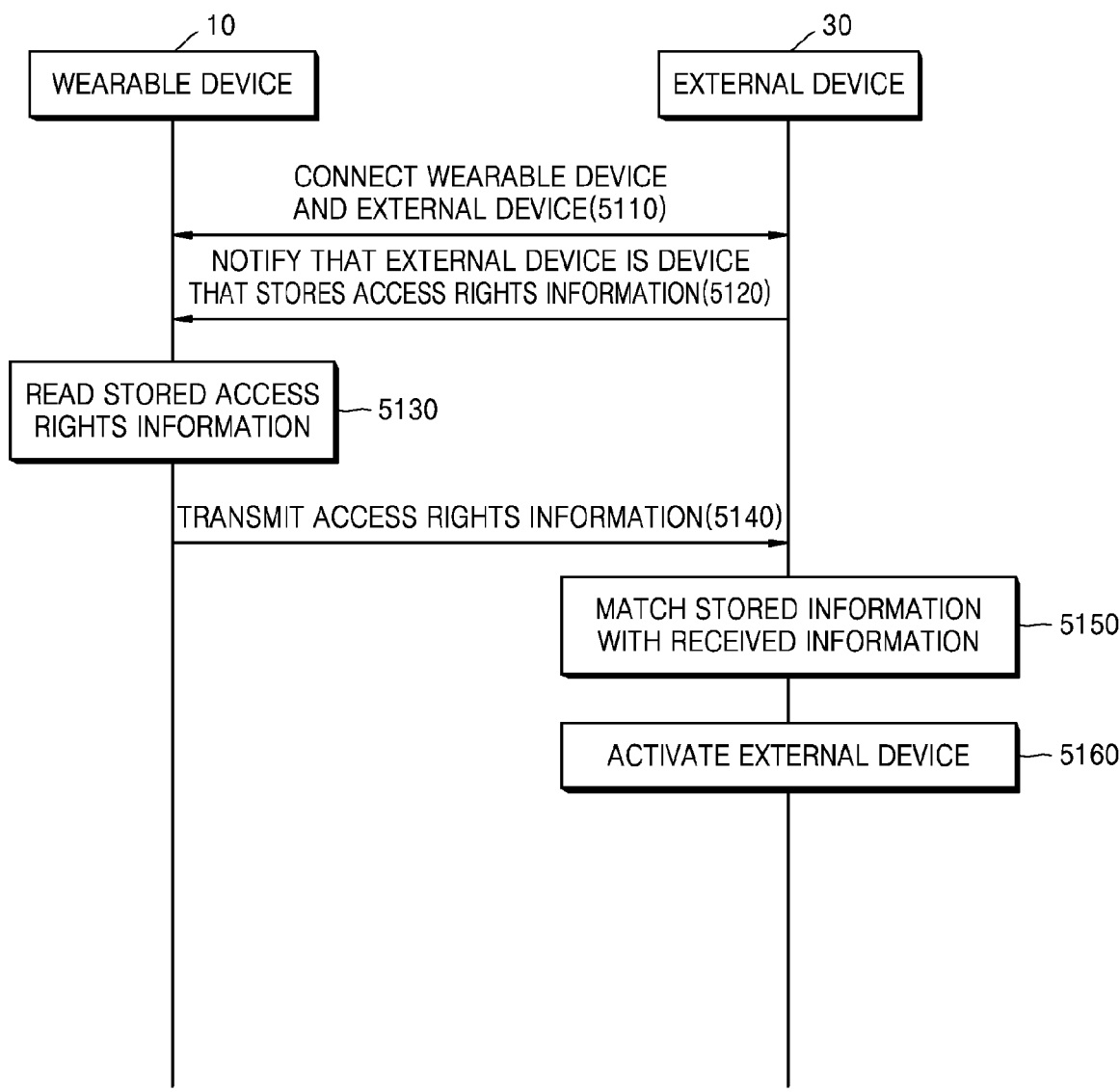
FIG. 51 is a flowchart illustrating an example in which the wearable device determines whether to activate the external device to which access rights have been set, according to an exemplary embodiment.

FIG. 51 is a flowchart illustrating an example in which the wearable device 10 determines whether to activate the external device 30 to which access rights have been set, according to an exemplary embodiment.

The exemplary embodiment of FIG. 51 includes operations that are processed in chronological order by the wearable device 10 and the external device 30 shown in FIG. 48. Thus, for descriptions that refer to operations of the wearable device 10 and the external device 30 shown in FIG. 1, the descriptions may also be applied to the flowchart of FIG. 51.

In operation 5110, the wearable device 10 and the external device 30 are connected to each other. The example in which the wearable device 10 and the external device 30 are connected to each other is described above with reference to operation 5010 of FIG. 50, and thus, detailed descriptions thereof are omitted here.

In operation 5120, the external device 30 notifies the wearable device 10 that the external device 30 is a device that stores access rights information. For example, when the user 20 attempts to use the external device 30, the external device 30 may notify the wearable device 10 that the external device 30 is the device that stores the access rights information. According to an exemplary embodiment, the expression that the user 20 attempts to use the external device 30 may refer to a situation where the user 20 inputs a command via the user input unit 5310 of the external device 30, may refer to a situation where the user 20 approaches the external device 30 so that a distance between the user 20 and the external device 30 is equal to or less than a predetermined distance, or may refer to many other types of situations where the user 20 attempts to use the external device 30.

In operation 5130, the wearable device 10 reads the access rights information. According to the aforementioned operation 5050 in FIG. 50, the wearable device 10 may generate and may store the access rights information. Therefore, when a notification according to operation 5120 is transmitted from the external device 30, the wearable device 10 may read the stored access rights information.

In operation 5140, the wearable device 10 transmits the access rights information to the external device 30.

In operation 5150, the external device 30 matches stored information with received information. For example, when it is assumed that the access rights information is a key value, the external device 30 may determine whether the key value transmitted from the wearable device 10 matches with a key value stored in the external device 30.

In operation 5160, the external device 30 is activated according to a result of the match performed in operation 5150. For example, when the access rights information is the key value, and if the key value transmitted from the wearable device 10 matches with the key value stored in the external device 30 as determined according to the result of the match performed in operation 5150, the external device 30 is activated. Therefore, the user 20 may use the external device 30.

Before operation 5130 is performed, the wearable device 10 may perform user authentication. In other words, when the notification according to operation 5120 is received, the wearable device 10 may obtain user information from the user 20, and may perform the user authentication based on the obtained user information. Then, the wearable device 10 may read the access rights information, according to a result of the user authentication.

Figure 52:
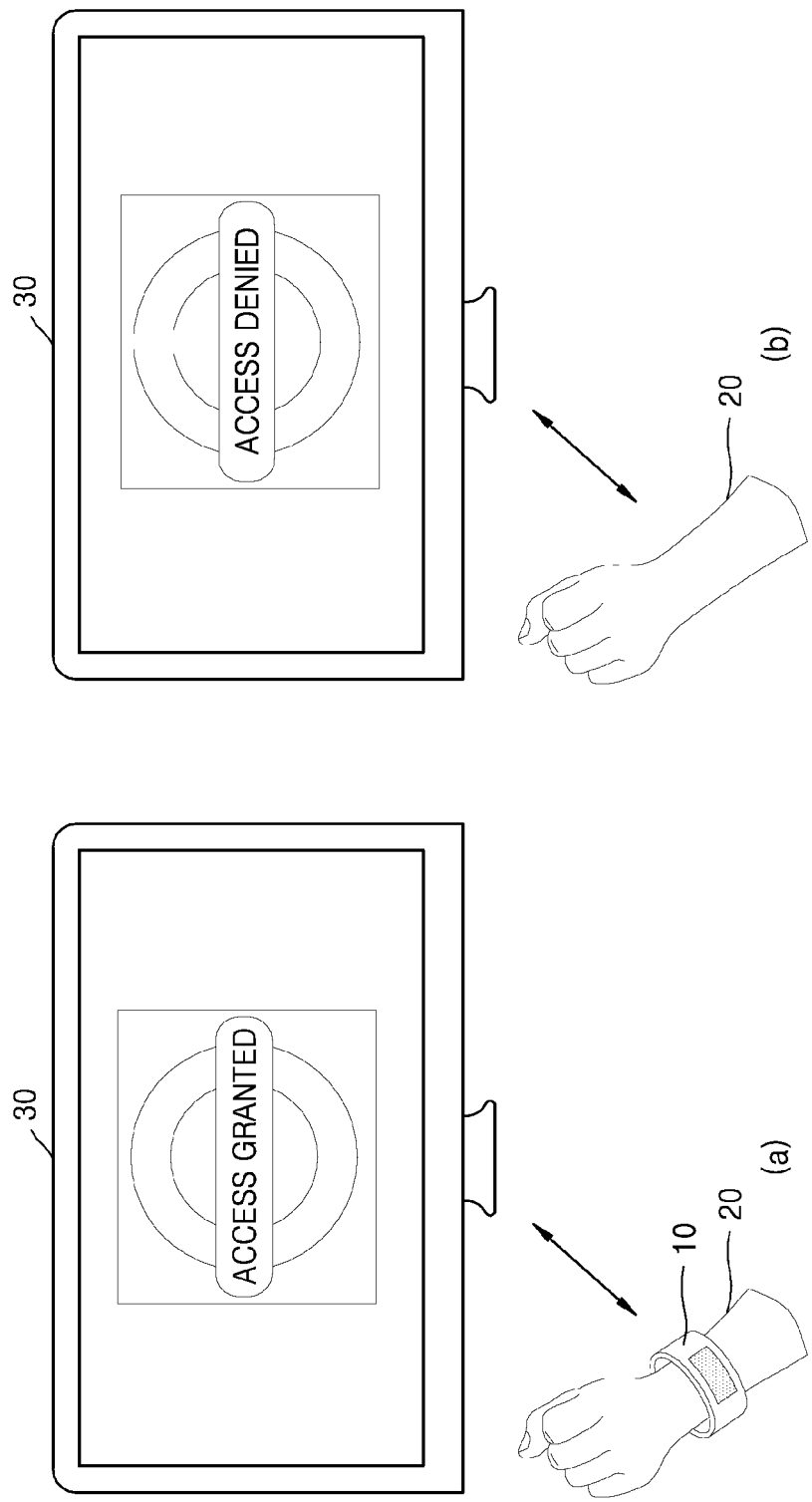
FIG. 52 illustrates examples (a) and (b) in which a determination is made as to whether it is possible for the user to use the external device according to whether the user currently wears the wearable device, according to an exemplary embodiment.

FIG. 52 illustrates examples (a) and (b) in which whether it is possible for the user 20 to use the external device 30 is determined according to whether the user 20 currently wears the wearable device 10, according to an exemplary embodiment.

Referring to the example (a), the user 20 currently wears the wearable device 10. Therefore, the external device 30 may be activated, and the user 20 may use the external device 30.

Referring to the example (b), the user 20 does not currently wear the wearable device 10. Therefore, the external device 30 may be deactivated, and the user 20 cannot user the external device 30.

The one or more exemplary embodiments can be written as computer programs and can be implemented in general-use digital computers that execute the programs using a computer-readable recording medium.

The methods may be performed by executing instructions included in at least one program from among programs that are recorded to a computer-readable recording medium. When the instructions are executed in a computer, the at least one program may perform a function that corresponds to the instructions. Examples of the instructions include not only machine codes generated by a compiler but also include codes to be executed in the computer by using an interpreter. In the one or more exemplary embodiments, the computer may include a processor, and the computer-readable recording medium may include a memory.

In addition, a data structure used in the one or more exemplary embodiments can be written in a computer-readable recording medium using various devices. Examples of the computer-readable recording medium include magnetic storage media (e.g., ROM, RAM, USB, floppy disks, hard disks, etc.), optical recording media (e.g., CD-ROMs, or DVDs), etc.

FIGS. 53 and 54 illustrate structures of examples of the wearable device 10 or the external device 30, according to exemplary embodiments.

A device 5300 shown in FIGS. 53 and 54 may correspond to the wearable device 10 or the external device 30 that is described above with reference to FIGS. 1 through 52.

Referring to FIG. 53, the device 5300 according to the present exemplary embodiment may include the user information obtainer 5380, an output unit 5320 (e.g., outputter), a controller 5330 (also referred to as 'processor 5330'), and a communication unit 5340 (e.g., communicator). Also, the user information obtainer 5380 shown in FIG. 53 may include the user input unit 5310 (e.g., user inputter), the sensing unit 5350 (e.g., sensor), and the A/V input unit 5360 (e.g., A/V inputter).

The user information obtainer 5380 obtains user information from the user 20. According to an exemplary embodiment, the user information may be biological information of the user 20 or account information of the user 20. The user information obtainer 5380 may obtain the account information of the user 20 via the user input unit 5310. Examples of the user input unit 5310 may include a key pad, a dome switch, a touch pad, a jog wheel, a jog switch, or the like, and an ID and password that are input by the user 20 by using the user input unit 5310 may be obtained as the user information.

The user information obtainer 5380 may obtain the biological information of the user 20 by using the sensing unit 5350 or the A/V input unit 5360. For example, the wearable device 10 may obtain information about a fingerprint, a vein, or a skeletal part of the user 20 by using the sensor included in the sensing unit 5350, and may obtain information about an iris, a retina, or the face of the user 20 by using the camera included in the A/V input unit 5360.

Referring to FIG. 53, the user information obtainer 5380 includes the user input unit 5310, the sensing unit 5350, and the A/V input unit 5360, but one or more exemplary embodiments are not limited thereto. For example, each of the user input unit 5310, the sensing unit 5350, and the A/V input unit 5360 of the user information obtainer 5380 shown in FIG. 53 may be a separate element in the device 5300. However, not all elements shown in FIG. 53 are necessary elements of the wearable device 10 or the external device 30. That is, the wearable device 10 or the external device 30 may be embodied with more or less elements than the elements shown in FIG. 53.

For example, referring to FIG. 54, the device 5300 according to the present exemplary embodiment may further include the memory 5370 as well as the user input unit 5310, the output unit 5320, the controller 5330, the communication unit 5340, the sensing unit 5350, and the A/V input unit 5360.

Also, referring to FIG. 53, the user information obtainer 5380 includes the user input unit 5310, the sensing unit 5350, and the A/V input unit 5360, but one or more exemplary embodiments are not limited thereto.

The user input unit 5310 may be a unit by which the user 20 inputs data so as to control the device 5300. For example, the user input unit 5310 may include a key pad, a dome switch, a touch pad (a touch capacitive-type touch pad, a pressure resistive-type touch pad, an infrared beam sensing-type touch pad, a surface acoustic wave-type touch pad, an integral strain gauge-type touch pad, a piezoelectric effect-type touch pad, or the like), a jog wheel, a jog switch, etc., but one or more exemplary embodiments are not limited thereto.

For example, the user input unit 5310 may receive the user information (e.g., the account information of the user 20). Also, the user input unit 5310 may receive user input selecting one of a plurality of devices. Also, the user input unit 5310 may receive a user input of requesting the device 5300 to generate an encryption key or a decryption key.

Also, the user input unit 5310 may receive user input requesting the device 5300 to store content. Also, the user input unit 5310 may receive user input requesting the device 5300 to execute a program, may receive a user input requesting the device 5300 to exit the program, or may receive user input selecting encrypted content.

The output unit 5320 may output an audio signal, a video signal, or a vibration signal and may include a display unit 5321 (e.g., display), a sound output unit 5322 (e.g., sound outputter), a vibration motor 5323, or the like.

The display unit 5321 displays and outputs information that is processed in the device 5300. For example, the display unit 5321 may display a user interface for the user 20 to select a virtual image, a user interface for the user 20 to set an operation of the virtual image, and a user interface for the user 20 to purchase an item of the virtual image.

When the display unit 5321 and a touch pad form a mutual layer structure and then are formed as a touch screen, the display unit 5321 may be used as both an output device and input device. The display unit 5321 may include at least one of a liquid crystal display (LCD), a thin film transistor-liquid crystal display (TFT-LCD), an organic light-emitting diode (OLED) display, a flexible display, a three-dimensional (3D) display, and an electrophoretic display. Also, according to a type of the device 5300, the device 5300 may include at least two display units 5321. According to an exemplary embodiment, the at least two display units 5321 may be disposed to face each other by using a hinge.

The sound output unit 5322 may output audio data that is received from the communication unit 5340 or is stored in the memory 5370. The sound output unit 5322 may also output a sound signal (e.g., a call signal receiving sound, a message receiving sound, a notifying sound, or the like) related to capabilities performed by the device 5300. The sound output unit 5322 may include a speaker, a buzzer, or the like.

The vibration motor 5323 may output a vibration signal. For example, the vibration motor 5323 may output the vibration signal that corresponds to an output of the audio data (e.g., the call signal receiving sound, the message receiving sound, or the like) or video data. Also, when a touch is input to the touch screen, the vibration motor 5323 may output a vibration signal.

The controller 5330 may generally control all operations of the device 5300. For example, the controller 5330 may control the user input unit 5310, the output unit 5320, the sensing unit 5350, the communication unit 5340, the A/V input unit 5360, etc. by executing programs stored in the memory 5370.

For example, the controller 5330 may authenticate the user 20 based on the user information, and when the user 20 is authenticated, the controller 5330 may generate the encryption key or the decryption key. Also, the controller 5330 may calculate a distance between the wearable device 10 and the external device 30, and when the distance is equal to or less than a predetermine value, the controller 5330 may generate the encryption key or the decryption key.

The controller 5330 may generate the encryption key after a notification indicating storage of content is received from the external device 30. Also, the controller 5330 may generate the encryption key after a notification indicating that a program for executing content has been executed is received from the external device 30. Also, the controller 5330 may generate the encryption key after a notification indicating that the program for executing content has been ended is received from the external device 30. Also, the controller 5330 may generate the decryption key after a notification indicating selection of encrypted content is received from the external device 30.

The controller 5330 may encrypt content by using the encryption key or may decrypt encrypted content by using the decryption key.

When the user 20 is authenticated, the controller 5330 may determine whether to allow the user 20 to access the external device 30. For example, the controller 5330 may generate access rights information indicating that the user 20 has access rights to use the external device 30. Also, the controller 5330 may activate the external device 30, based on the access rights information.

The sensing unit 5350 may sense a state of the device 5330 or a status around the device 5300 and may transfer sensed information to the controller 5330.

The sensing unit 5350 may include at least one selected from a magnetic sensor 5351, an acceleration sensor 5352, a temperature/humidity sensor 5353, an infrared sensor 5354, a gyroscope sensor 5355, a position sensor (e.g., GPS) 5356, an air pressure sensor 5357, a proximity sensor 5358 and an RGB sensor (i.e., a luminance sensor) 5359, but one or more exemplary embodiments are not limited thereto. Functions of the sensors may be intuitively deduced by one of ordinary skill in the art by based on the names of the sensors or other considerations, and thus, detailed descriptions thereof are omitted here.

The communication unit 5340 may include one or more elements allowing the device 5300 to communicate with another device or a server. For example, the communication unit 5340 may include a short-range communication unit 5341 (e.g., short-range communicator), a mobile communication unit 5342 (e.g., mobile communicator), and a broadcast receiving unit 5343 (e.g., broadcast receiver).

The short-range communication unit 5341 may include, but is not limited to including, a Bluetooth communication unit, a Bluetooth Low Energy (BLE) communication unit, a near field wireless communication unit, a wireless local area network (WLAN) communication unit, a ZigBee communication unit, an infrared Data Association (IrDA) communication unit, a Wi-Fi Direct (WFD) communication unit, an UWB communication unit, or an Ant+ communication unit.

The mobile communication unit 5342 exchanges a wireless signal with at least one selected from a base station, an external terminal, and a server on a mobile communication network. The wireless signal may include various types of data according to communication in regard to a sound call signal, a video call signal, or a text/multimedia message.

The broadcast receiving unit 5343 receives a broadcast signal and/or information related to broadcast from the outside through a broadcast channel. The broadcast channel may include a satellite channel and a ground wave channel. According to an exemplary embodiment, the device 5300 may not include the broadcast receiving unit 5343.

The A/V input unit 5360 may receive an input of an audio signal or a video signal and may include a camera 5361 and a microphone 5362. The camera 5361 may obtain an image frame such as a still image or a moving picture via an image sensor during a video call mode or an image-capturing mode. An image that is captured via the image sensor may be processed by the controller 5330 or a separate image processing unit.

The image frame that is processed by the camera 5361 may be stored in the memory 5370 or may be transmitted to an external source via the communication unit 5340. According to a configuration of the device 5300, two or more cameras 5361 may be arranged.

The microphone 5362 receives an external sound signal as an input and processes the received sound signal into electrical voice data. For example, the microphone 5362 may receive a sound signal from an external device or a speaker. In order to remove noise that occurs while the sound signal is externally input, the microphone 5362 may use various noise removing algorithms.

The memory 5370 may store a program for processing and controlling the controller 5330, and a plurality of pieces of data that are input to the device 5300 or output from the device 5300.

The memory 5370 may include a storage medium of at least one type selected from a flash memory, a hard disk, a multimedia card type memory, a card type memory such as an SD or XD card memory, random access memory (RAM), static random access memory (SRAM), read-only memory (ROM), electrically erasable programmable read-only memory (EEPROM), programmable read-only memory (PROM), a magnetic memory, a magnetic disc, and an optical disc.

The programs stored in the memory 5370 may be classified into a plurality of modules according to their functions, for example, a user interface (UI) module 5371, a touch screen module 5372, an alarm module 5373, etc.

The UI module 5371 may provide a specialized UI or a graphical user interface (GUI) in connection with the device 5300 for each application. The touch screen module 5372 may detect a user's touch gesture on a touch screen and transmit information related to the touch gesture to the controller 5330. In another exemplary embodiment, the touch screen module 5372 may recognize and analyze a touch code. The touch screen module 5372 may be configured by using additional hardware including a controller.

Various sensors may be arranged in or near the touch screen so as to detect a touch or a proximate touch on the touch sensor. An example of the sensor to detect the touch on the touch screen may include a tactile sensor. The tactile sensor detects a contact of a specific object at least as sensitively as a person can detect. The tactile sensor may detect various types of information such as the roughness of a contact surface, the hardness of the contact object, the temperature of a contact point, or the like.

An example of the sensor to detect the touch on the touch screen may include a proximity sensor.

The proximity sensor detects the existence of an object that approaches a predetermined detection surface or exists nearby by using a force of an electro-magnetic field or an infrared ray, instead of a mechanical contact. Examples of the proximity sensor include a transmission-type photoelectric sensor, a direction reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like. The touch gesture (e.g., an input) of the user may include a tap gesture, a touch & hold gesture, a double tap gesture, a drag gesture, a panning gesture, a flick gesture, a drag & drop gesture, a swipe gesture, or the like.

The alarm module 5373 may generate a signal for notifying the user 20 of an occurrence of an event in the device 5300. Examples of the event that occurs in the device 5300 may include a call signal reception, a message reception, a key signal input, schedule notification, or the like. The alarm module 5373 may output a video-format alarm signal via the display unit 5321, may output an audio-format alarm signal via the sound output unit 5322, or a vibration signal via the vibration motor 5323.

As described above, according to exemplary embodiments, since content is encrypted or is decrypted according to a result of user authentication, it is possible to prevent the content from being executed by another subject other than a user. Also, since the user does not have to encrypt or to decrypt each of the pieces of content, the user may easily manage the content.

Also, since the determination as to whether to activate an external device is determined according to the result of the user authentication, it is possible to prevent the external device from being used by another subject other than the user.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by one of ordinary skill in the art that various changes in form and details may be made therein without departing from the spirit and scope as defined by the following claims.

What is claimed is:

1. A wearable device comprising:
   a user information obtainer comprising a hardware sensor configured to obtain biological information of a user;
   a controller configured to selectively generate, in response to the user being authenticated based on the biological information, an encryption key to encrypt content of an external device; and
   a communicator configured to transmit the encryption key to the external device,
   wherein the controller is further configured to determine, using the biological information, whether the user is currently wearing the wearable device and generate, in response to determining that the user is currently wearing the wearable device, a decryption key to decrypt encrypted content.

2. The wearable device of claim 1, wherein the controller is further configured to calculate a distance between the wearable device and the external device, and in response to determining that the distance is equal to or less than a predetermined distance, generate the encryption key.

3. The wearable device of claim 1, wherein:
   the communicator is further configured to receive, from the external device, a notification indicating that the content is stored in the external device; and
   the controller is further configured to generate the encryption key in response to the notification being received.

4. The wearable device of claim 1, wherein:
   the communicator is configured to receive, from the external device, a notification indicating that a program for executing the content is executed in the external device; and
   the controller is further configured to generate the encryption key in response to the notification being received.

5. The wearable device of claim 1, wherein, in response to the user being authenticated, the controller is configured to determine whether to permit the user to access the external device.

6. The wearable device of claim 1, wherein the encryption key comprises an encryption key used in a symmetric-key algorithm, or comprises an encryption key used in an asymmetric-key algorithm.

7. The wearable device of claim 1, wherein the biological information comprises information about one of a fingerprint, an iris, a retina, a vein, a skeletal part, or a face of the user.

8. The wearable device of claim 1, wherein the controller is further configured to obtain account information of the user and to generate the encryption key based on the account information.

9. The wearable device of claim 1, further comprising a memory configured to store the encryption key.

10. A method of generating an encryption key and a decryption key, the method being performed by a wearable device comprising a hardware sensor and comprising:
    obtaining biological information of a user by using the hardware sensor;
    authenticating the user of the wearable device based on the biological information;
    selectively generating, in response to the user being authenticated by the authenticating, the encryption key to encrypt content in an external device;
    transmitting the encryption key to the external device;
    determining, using the biological information, whether the user is currently wearing the wearable device; and
    generating, in response to determining that the user is currently wearing the wearable device, the decryption key to decrypt encrypted content.

11. The method of claim 10, further comprising:
calculating a distance between the wearable device and the external device,
wherein the generating is performed when the distance is equal to or less than a predetermined distance.

12. The method of claim 10, further comprising:
receiving, from the external device, a notification indicating that the content is stored in the external device, and
performing the generating in response to receiving the notification.

13. The method of claim 10, further comprising:
receiving, from the external device, a notification indicating that a program for executing the content is executed in the external device, and
performing the generating in response to receiving the notification.

14. The method of claim 10, further comprising, in response to the user being authenticated by the authenticating, determining whether to permit the user to access the external device.

15. The method of claim 10, wherein the encryption key comprises an encryption key used in a symmetric-key algorithm, or comprises an encryption key used in an asymmetric-key algorithm.

16. The method of claim 10, wherein the biological information comprises information about one of a fingerprint, an iris, a retina, a vein, a skeletal part, or a face of the user.

17. The method of claim 10, further comprising obtaining account information of the user and generating the encryption key based on the account information.

18. A non-transitory computer-readable recording medium having recorded thereon a program for executing the method of claim 10, by using a computer.

* * * * *